United States Patent [19]

Shavit et al.

[11] Patent Number: 4,799,156
[45] Date of Patent: Jan. 17, 1989

[54] INTERACTIVE MARKET MANAGEMENT SYSTEM

[75] Inventors: Eyal Shavit, New York, N.Y.; Lester Teichner, Chicago, Ill.

[73] Assignee: Strategic Processing Corporation, New York, N.Y.

[21] Appl. No.: 914,172

[22] Filed: Oct. 1, 1986

[51] Int. Cl.⁴ ............................................. G06F 15/21
[52] U.S. Cl. ..................................... 364/401; 364/408
[58] Field of Search ................................ 364/400–408, 364/200 MS File, 900 MS File; 340/825.26, 825.27, 825.28

[56] References Cited

U.S. PATENT DOCUMENTS

| | | | |
|---|---|---|---|
| 3,573,747 | 4/1971 | Adams et al. | 340/825.27 X |
| 3,688,276 | 8/1972 | Quinn | 364/200 |
| 4,186,438 | 1/1980 | Benson et al. | 364/200 |
| 4,346,442 | 8/1982 | Musmanno | 364/408 |
| 4,376,978 | 3/1983 | Musmanno | 364/408 |
| 4,449,186 | 5/1984 | Kelly et al. | 364/900 X |
| 4,674,044 | 6/1987 | Kalmus et al. | 364/408 |
| 4,677,552 | 6/1987 | Sibley, Jr. | 364/408 |
| 4,694,397 | 9/1987 | Grant et al. | 364/408 |

FOREIGN PATENT DOCUMENTS 1489572  10/1977  United Kingdom ................ 364/408

OTHER PUBLICATIONS

Electronic Data Interchange.
United States Electronic Data Interchange (EDI) Standards, The Electronic Data Interchange Association, 1985.
Networking: Japan's Latest Computer Craze, Fortune, July 7, 1986.

*Primary Examiner*—Jerry Smith
*Assistant Examiner*—Allen MacDonald
*Attorney, Agent, or Firm*—Welsh & Katz, Ltd.

[57] ABSTRACT

A system for interactive on-line electronic communications and processing of business transactions between a plurality of different types of independent users including at least a plurality of sellers, and a plurality of buyers, as well as financial institutions, and freight service providers. Each user can communicate with the system from remote terminals adapted to access communication links and the system may include remote terminals adapted for storage of a remote data base. The system includes a data base which contains user information. The data base is accessed via a validation procedure to permit business transactions in an interactive on-line mode between users during interactive business transaction sessions wherein one party to the transaction is specifically selected by the other party. The system permits concurrent interactive business transaction sessions between different users.

43 Claims, 31 Drawing Sheets

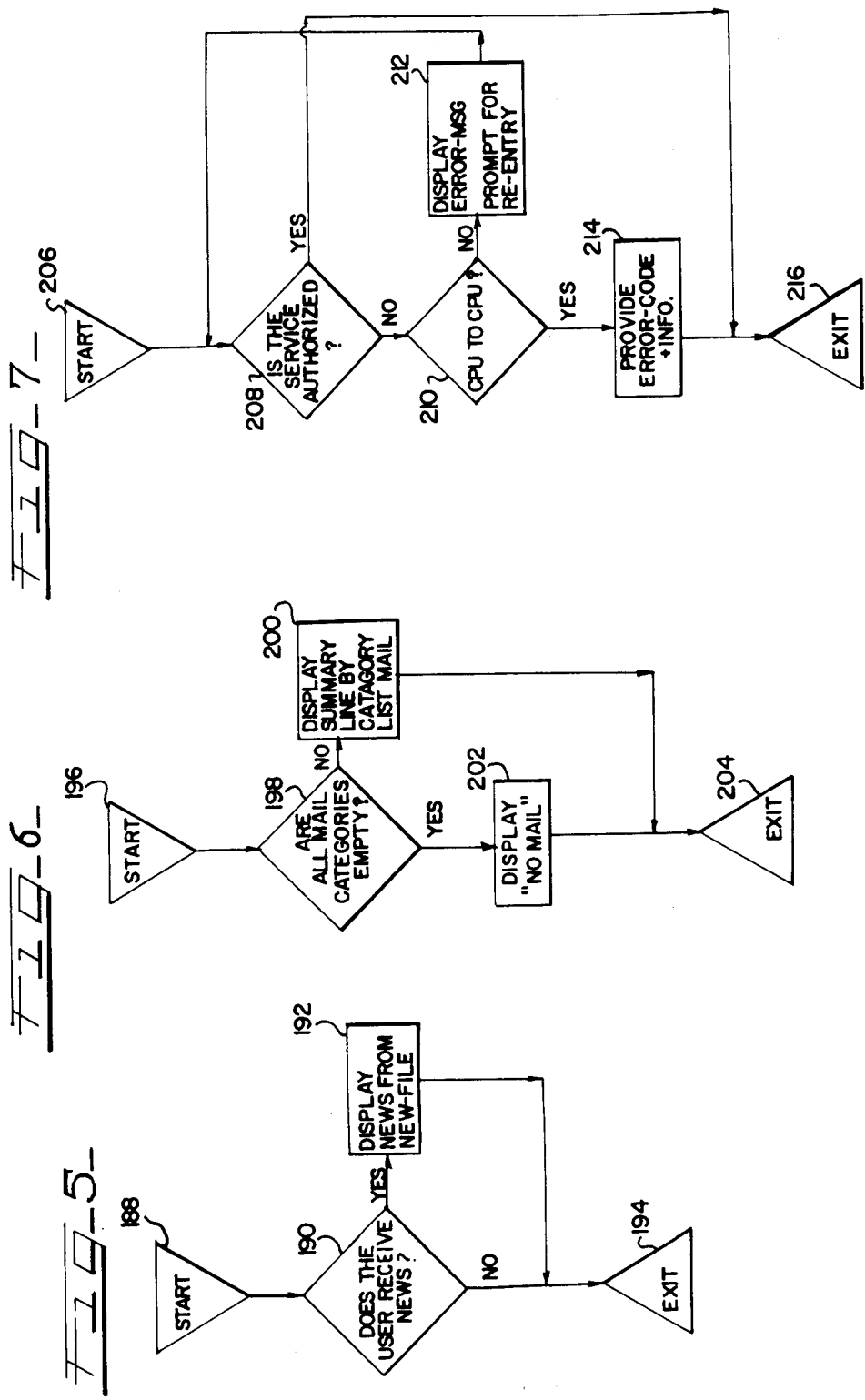

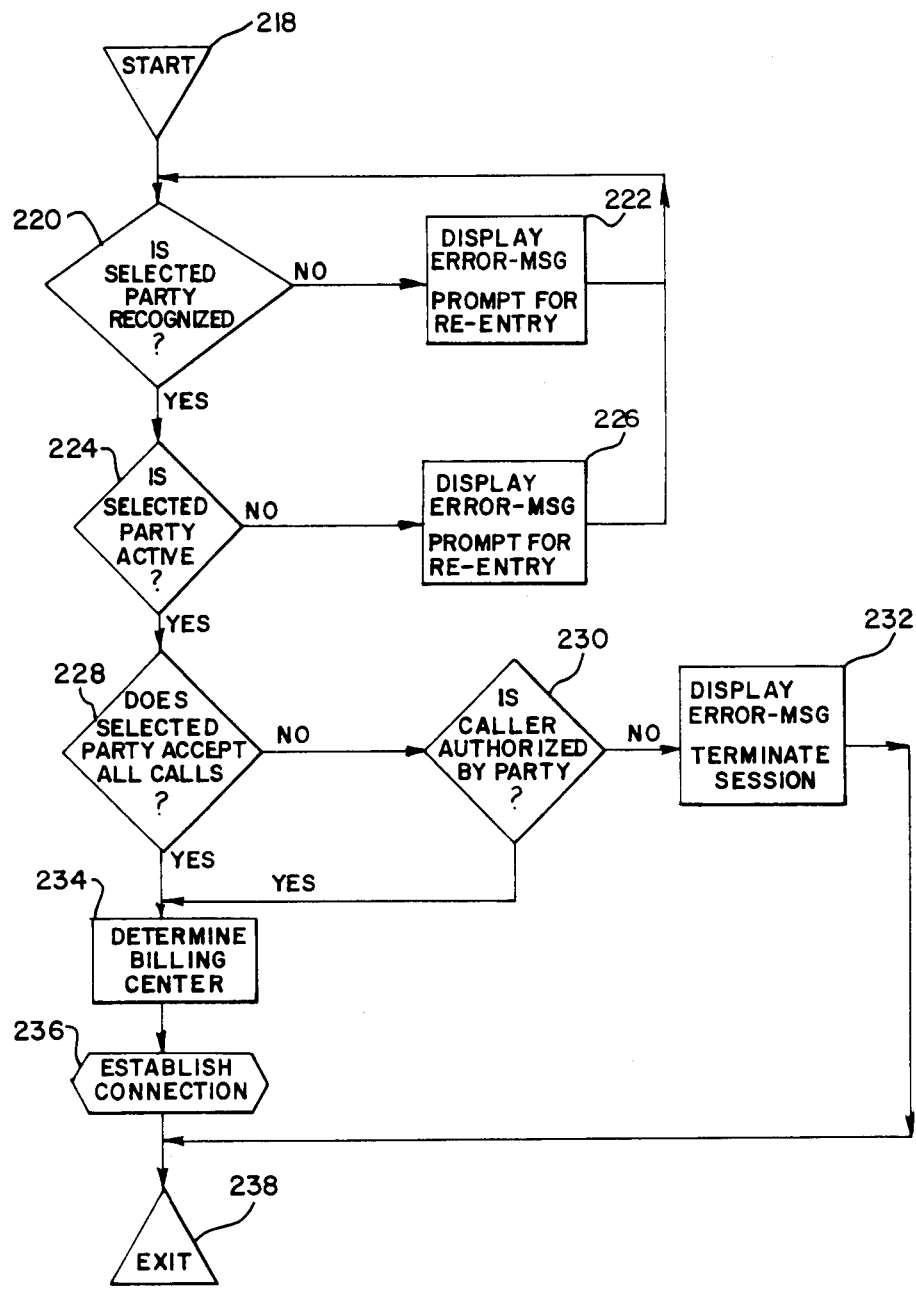

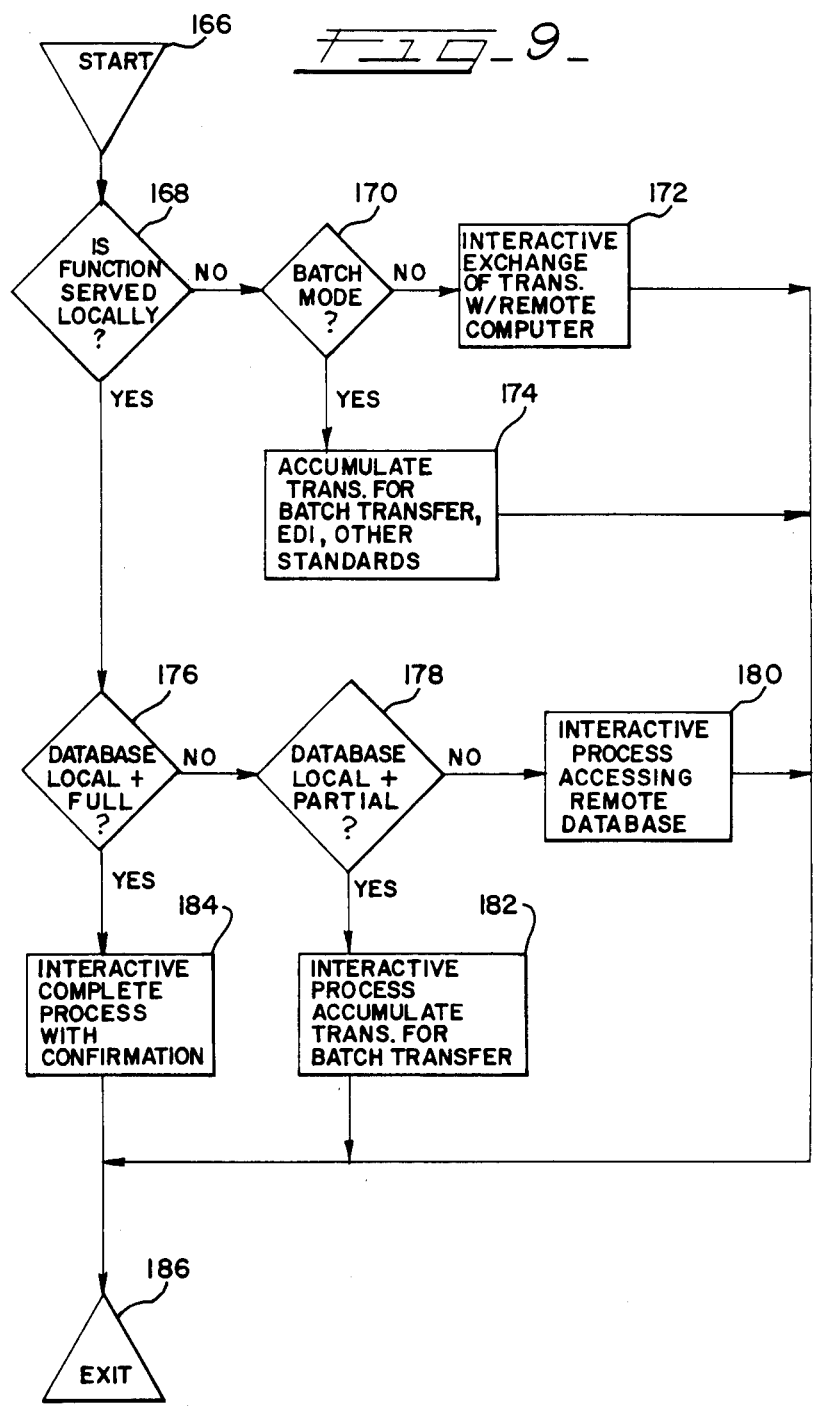

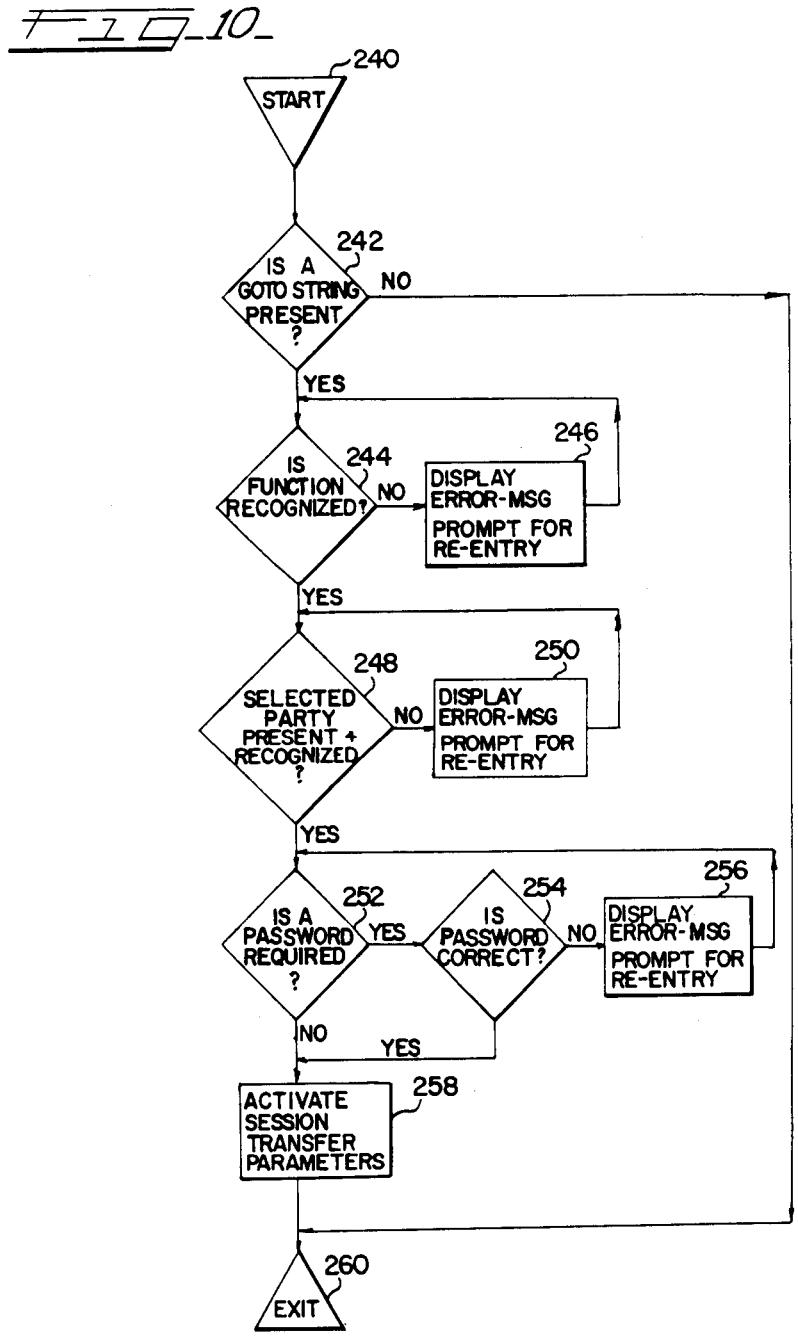

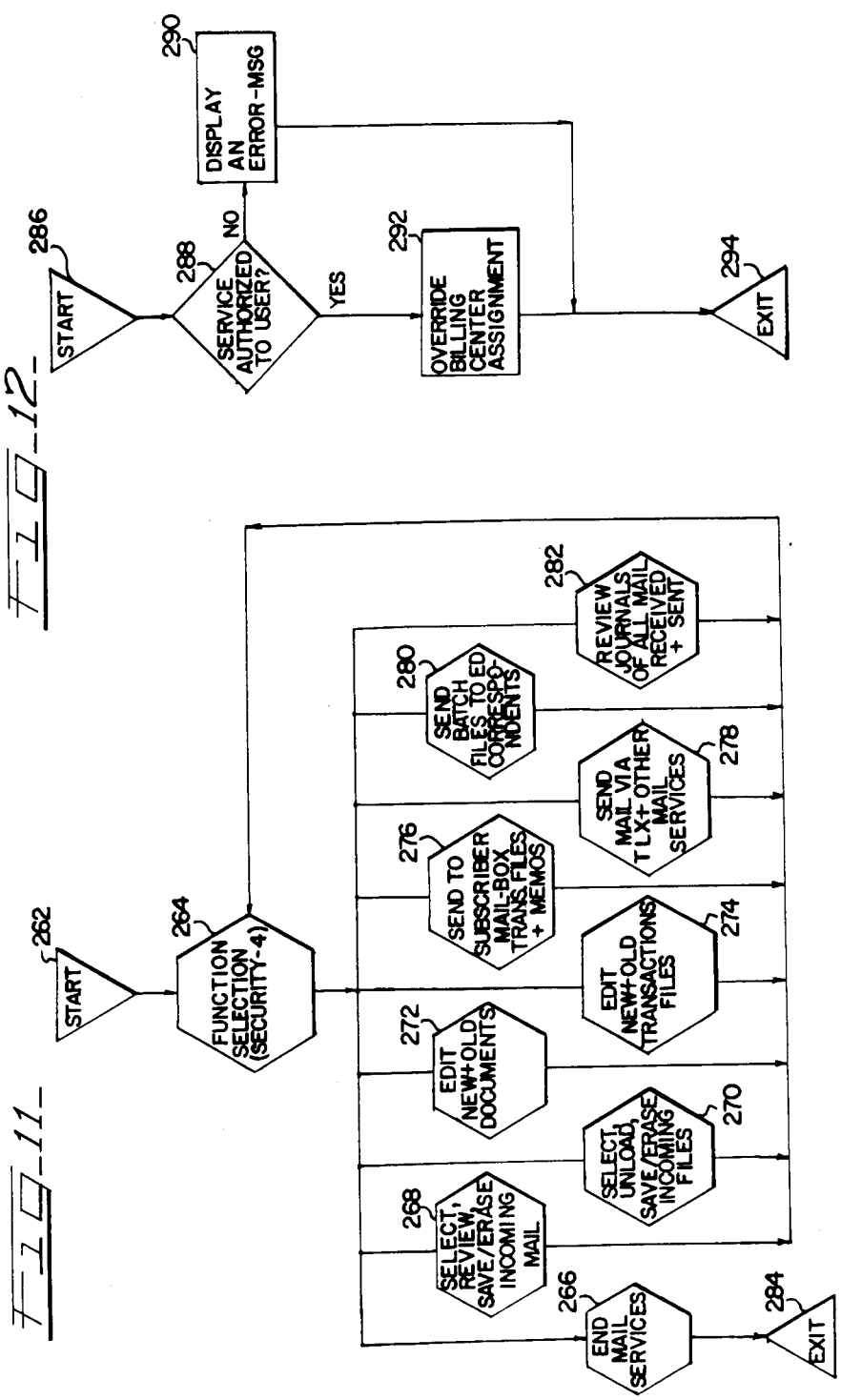

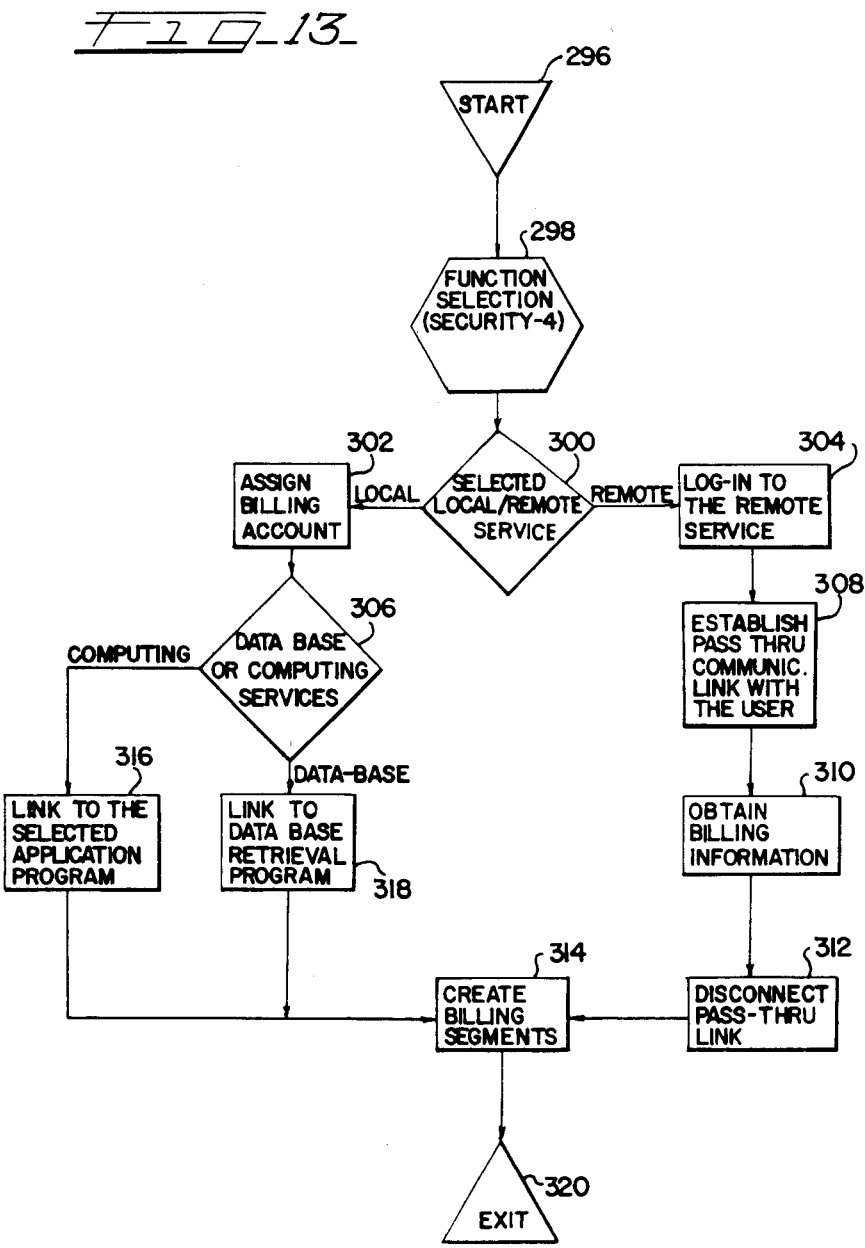

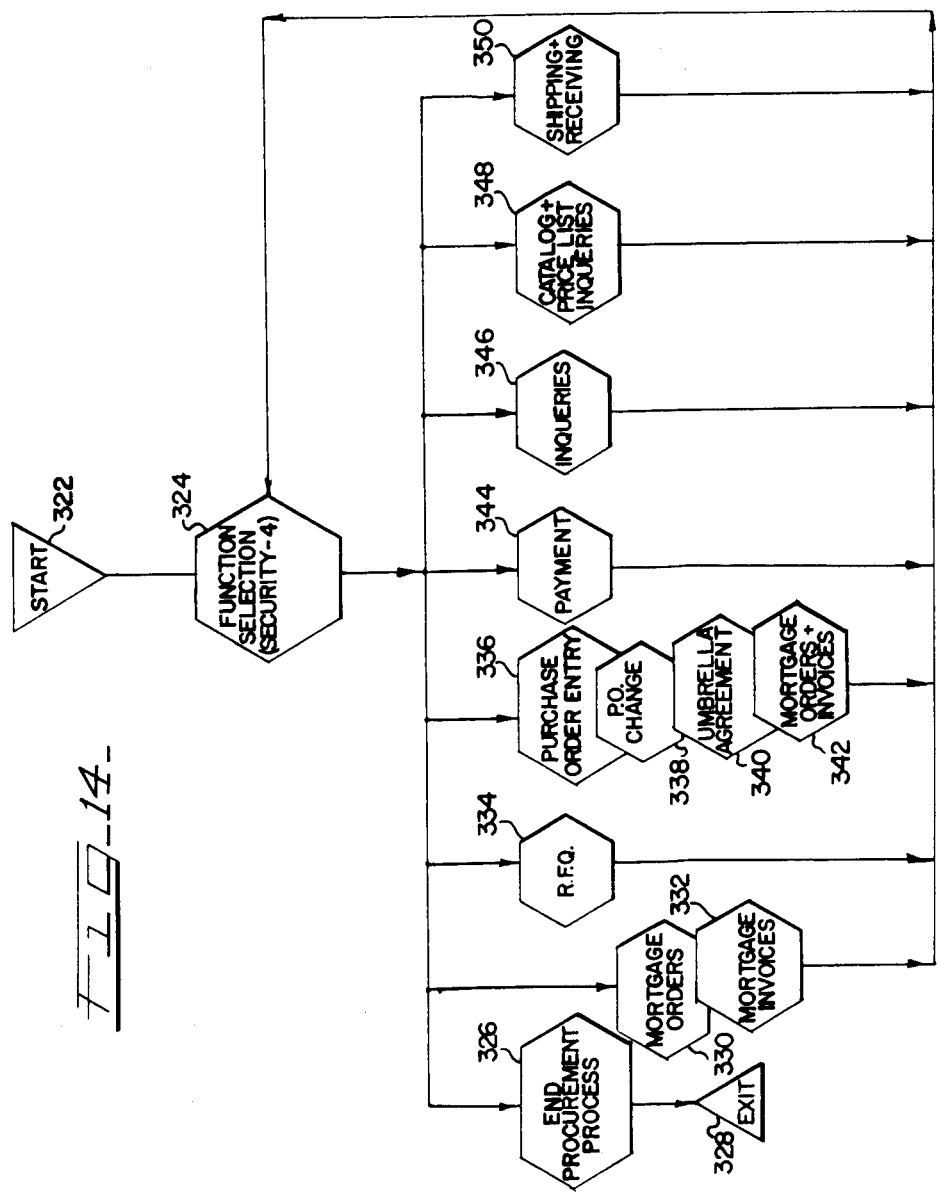

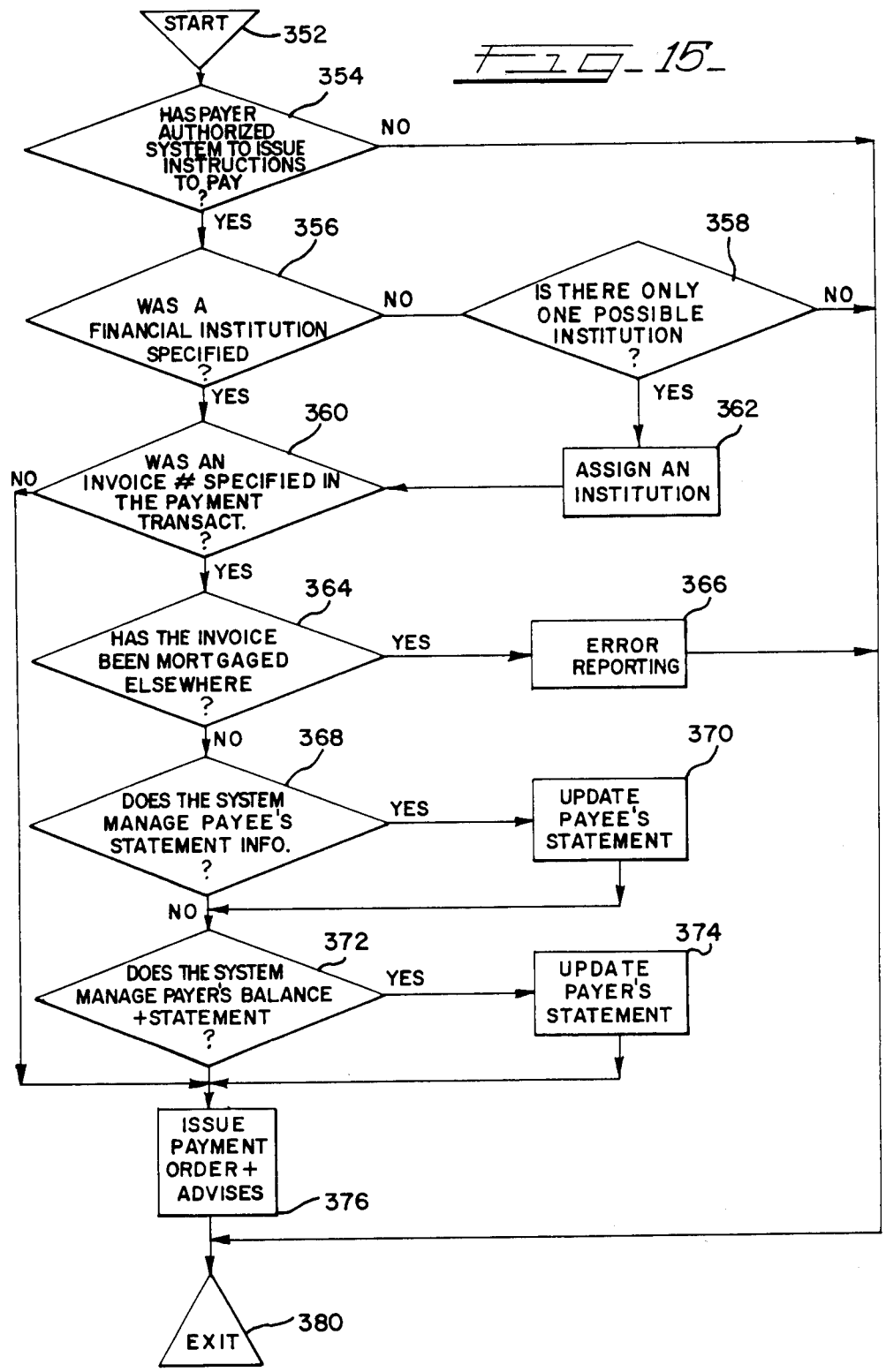

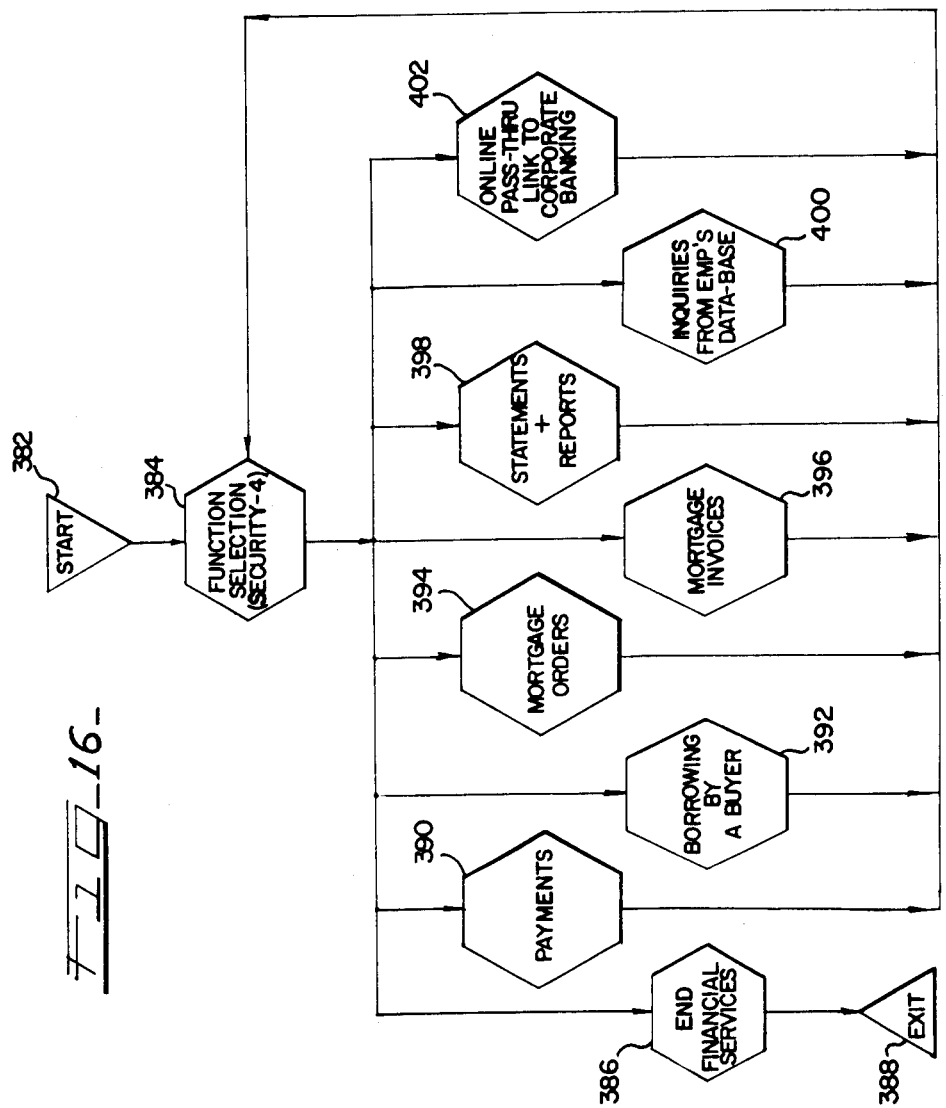

FIG_23

FIG_28

FIG-30-

INTERACTIVE MARKET MANAGEMENT SYSTEM

This invention relates generally to the field of automated business, data processing, and data communications systems, and more particularly to a system for interactive communications and processing of business transactions between a plurality of types of users within at least one industry including buyers, wholesalers, distributors, suppliers, agents, and financial and freight carrier services.

The modern business marketplace is consistently growing in complexity thereby generating a need for businesses to achieve new levels of efficiency to maintain a competitive advantage as well as to take advantage of opportunities presented by the marketplace growth and complexity. Thus, for example, data processing and other computer functions are becoming widely utilized in modern business with most businesses having installed on-site computer facilities to aid in business operations (e.g., accounting, scheduling, payroll, etc.).

In addition, electronic data communications systems and networks have provided improvements over existing business communication links. As a result, recent efforts have been made to provide computer to computer data exchange standards within a particular market. Such standards employ standardized information structure, standardized communication protocols, and special interface programs to facilitate the interlinking of on-site computer systems and terminals. These standards permit what amounts to an electronic mail system within a single industry to accommodate two-way transactions such as sending purchase orders, purchase order acknowledgements, etc. Software systems have been proposed for translating a company's internal data to conform to standard communication standards for transmission and for reconfiguring received data to internal formats. This software permits wider use of the communications standards. These systems, nevertheless, are limited to direct two-way communications between two parties.

Additional efforts to provide interlinking services between computer systems within a given industry have involved the development of some compatibly standards between otherwise incompatible data processing and communication equipment. In addition, third party service providers have started what are commonly known as "value added networks" based on packet switching technology, in which many otherwise incompatible users may "dial-up" a local access phone number to get on the network, which itself provides some compatibility conversions, and thereby provides access to a particular set of software services. In addition, some manufacturers have developed dedicated private networks in which they give their customers or suppliers a dedicated set of software based services to be interconnected over a predetermined system of compatible hardware.

Dramatic new efficiencies can be provided by the configuration of on-line interactive concurrent electronic services which creates a marketplace which can serve a wide spectrum of buyers, wholesalers, distributors, suppliers, agents, and other service providers within an industry or multiple industries, as well as to freight, financial, and other services deployed over any number of existing communications systems. Such an electronic marketplace can optimize the procurement process, optimize freight usage, cut inventory costs at each level of the distribution chain, and permit new and previously impossible or impractical transactions and business arrangements.

It is accordingly an object of this invention to provide a novel interactive, broad spectrum business transaction processing system.

It is yet another object of the invention to provide a novel interactive business transaction processing system permitting controlled on-line interactive concurrent electronic access to various members of an industry, to freight, financial, and related services, and to operational and commercial information data bases and computing services.

It is yet another object of the invention to provide a novel system for interactive on-line electronic communications and processing of business transactions between a plurality of sellers and a plurality of buyers.

Briefly, according to one embodiment of the invention, a system is provided for interactive on-line communications and processing of business transactions between different types of independent users including at least a plurality of sellers, and a plurality of buyers, wherein each user communicates with the system. The system comprises access means for providing selective access to a data base by users. Processing means is provided responsive to the access means for interactive on-line transactions between one of the plurality of buyers and a selected one of the plurality of sellers wherein one party to the transaction specifically selects the other party. In an alternative embodiment, the processing means provide for concurrent, interactive on-line processing of business transactions between more than two different users concurrently conducting an interactive business transaction session.

BRIEF DESCRIPTION OF THE DRAWINGS

The invention, together with further objects and advantages thereof, may be understood by reference to the following description taken in conjunction with the accompanying drawings.

FIG. 5 is a flow diagram illustrating the processing methodology and structural flow for the NEWS function as shown in FIG. 3 for a specific embodiment of the interactive market management system according to the invention.

FIG. 6 is a flow diagram illustrating the processing methodology and structural flow for the INCOMING MAIL function as shown in FIG. 3 for a specific embodiment of the interactive market management system according to the invention.

FIG. 7 is a flow diagram illustrating the processing methodology and structural flow for the SERVICE SELECTION and security validation level-2 function as shown in FIG. 3 for a specific embodiment of the interactive market management system according to the invention.

FIG. 8 is a flow diagram illustrating the processing methodology and structural flow for the SIGNING and function shown in FIG. 3 for a specific embodiment of the interactive market management system according to the invention.

FIG. 9 is a flow diagram illustrating the processing methodology and structural flow of an ESTABLISH CONNECTION function as shown in FIG. 8. for a specific embodiment of the interactive market management systems according to the invention.

FIG. 10 is a flow diagram illustrating the processing methodology and structural flow for a service selection SHORTCUT function for a specific embodiment of the interactive market management system according to the invention.

FIG. 11 is a flow diagram illustrating the processing methodology and structural flow for the MAIL function as shown in FIG. 3 for a specific embodiment of the interactive market management system according to the invention.

FIG. 12 is a flow diagram illustrating the processing methodology and structural flow for the FUNCTION SELECTION and security validation level-4 function as shown in FIG. 11 for a specific embodiment of the interactive market management system according to the invention.

FIG. 13 is a flow diagram illustrating the processing methodology and structural flow for the general INFORMATIONAL SERVICE function as shown in FIG. 3 for a specific embodiment of the interactive market management system according to the invention.

FIG. 14 is a flow diagram illustrating the processing methodology and structural flow for the PROCUREMENT PROCESS function as shown in FIG. 3 for a specific embodiment of the interactive market management system according to the invention.

FIG. 15 is a flow diagram illustrating the processing methodology and structural flow for the PAYMENT function as shown in FIG. 14 for a specific embodiment of the interactive market management system according to the invention.

FIG. 16 is a flow diagram illustrating the processing methodology and structural flow for the FINANCIAL SERVICES function as shown in FIG. 3 for a specific embodiment of the interactive market management system according to the invention.

DETAILED DESCRIPTION OF THE PREFERRED EMBODIMENT

Figure 1:
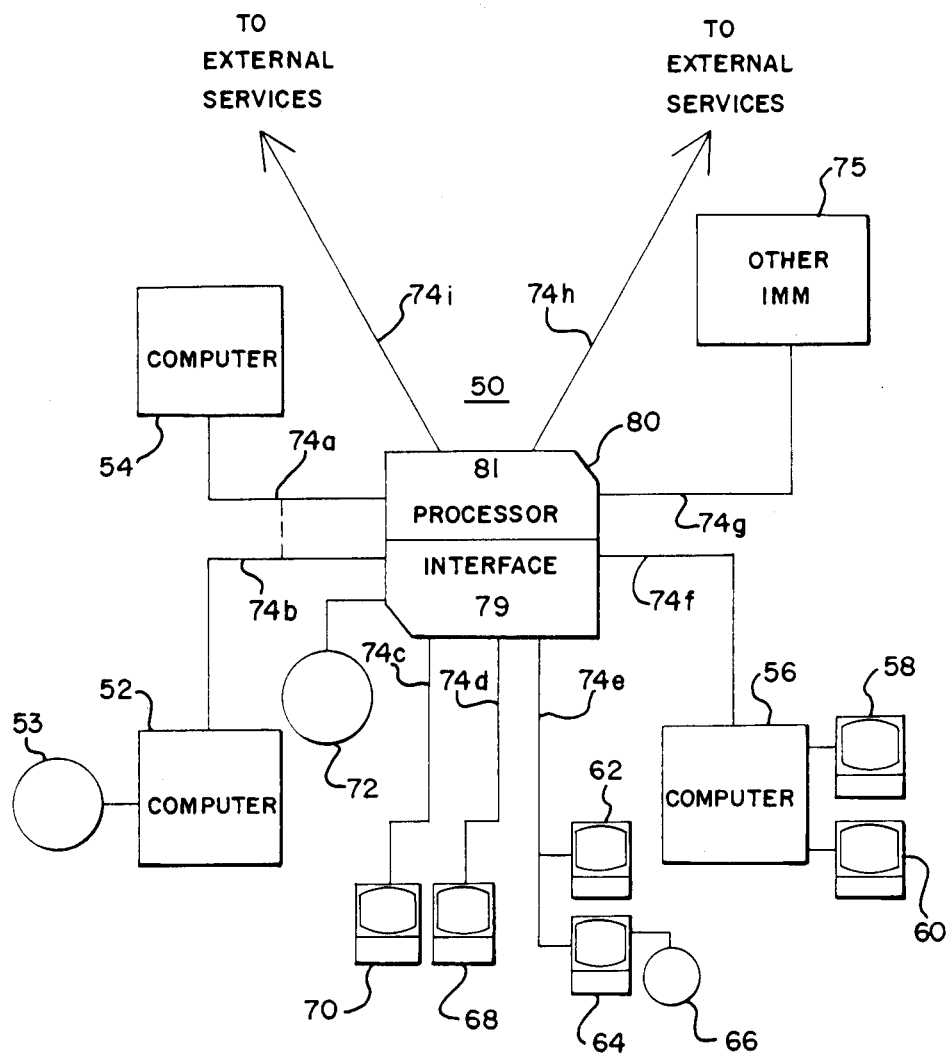
FIG. 1 is a generalized block diagram illustrating the structure of a specific embodiment of the interactive business transaction market management system according to the invention.

FIG. 1 is a generalized block diagram illustrating the structure of a specific embodiment of the interactive market management system 50 for interactive communications and processing of business transactions between users according to the invention. The system 50 permits users such as buyers, sellers, etc. at remote sites to conduct business transactions and communicate with data bases on other computing services from a variety of remote terminals, as shown. Various types of remote terminals may b e utilized such as dumb terminals 68, 70 (e.g., ASCII terminals) which provide terminal access to the system 50 without any local processing capability, or remote intelligent terminals 62, 64 such as a personal computer 62, and a personal computer 64 including a mass storage device 66 (e.g., an International Business Machines personal computer, or a 327x terminal) for storage of a remote data base. Additionally, the remote sites may comprise a remote computer system 56 through which operators communicate via terminals 58, 60, as shown, or the remote site may comprise an automatic computer system 52, 54 which may include a mass storage device 53, (e.g., magnetic hard disk) for storage of a remote data base.

Various remote sites communicate with a central processor 80 which comprises a central processing unit (CPU) 81, communications interface 79, and a mass storage system 72. The CPU 81 provides local processing capability and the communications interface 79 provides an interface to permit access by the remote users to the processor 80 and to the local data bases stored on the mass storage system 72 via communication links 74a-i. In addition, pass-thru communications is also available, such as terminals 60, 70 communicating thru the central processor 80 with the computer 52 accessing data stored on the mass storage device 53. The communication links 74a-8i may be any of a wide variety of network services, such as public telephone networks, public data networks (e.g., Telenet), open virtual lines, private or public network, ISDN, Software Defined Networks, leased datalines, etc. The remote communications may use any of a variety communications protocols such as System Network Architecture (SNA), X.25, ASYNCH, BSC, etc. The communications interface 79 also permits users to access remote data bases of subscribers providing such data bases, as well as access to external information services including public data base services, or remote computer services. The communications interface 79 further provides for access to other interactive market management (IMM) systems 75 via a communications link 74g, as shown.

Figure 2:
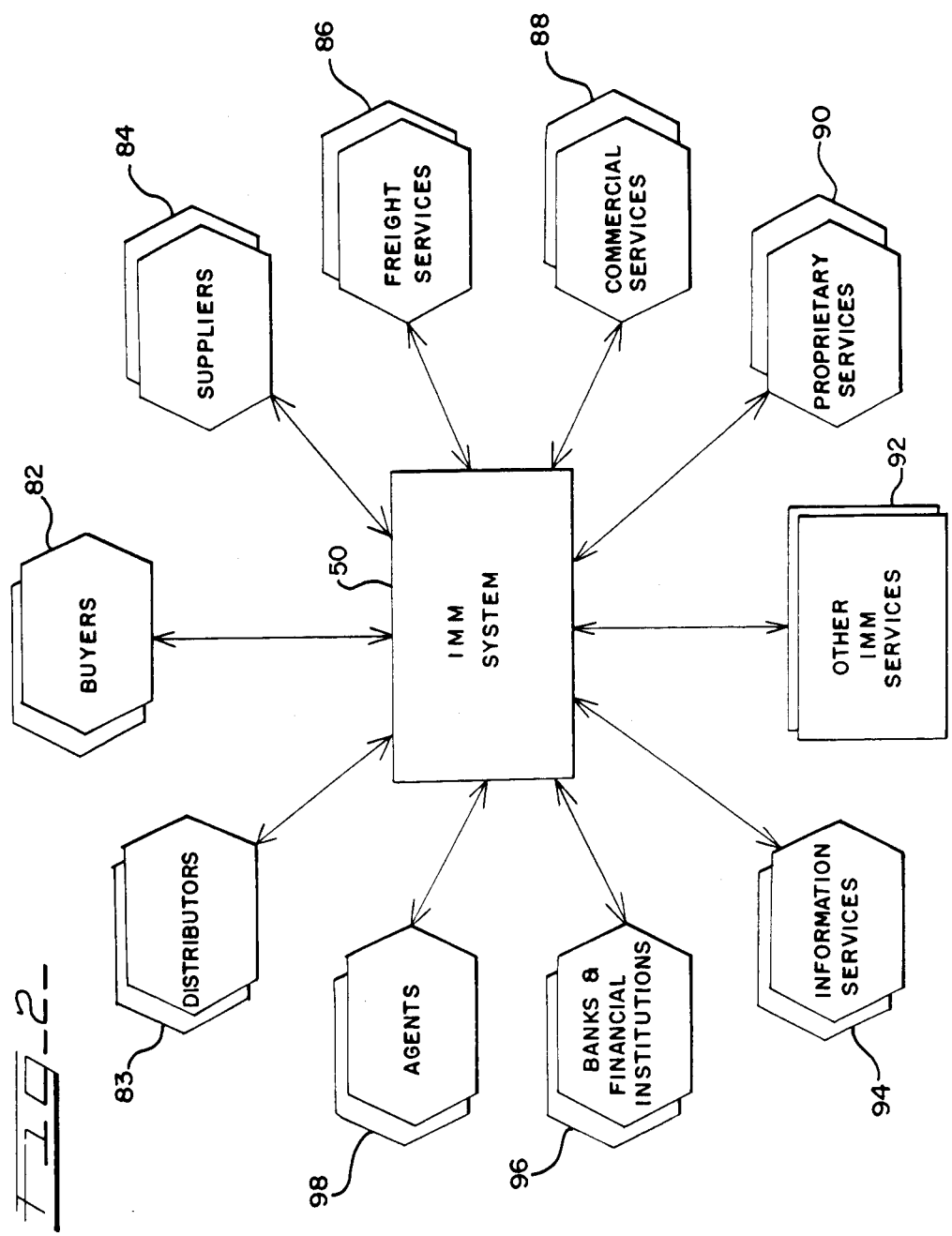
FIG. 2 is a generalized block diagram illustrating the organizational relationship between market participants and the interactive market management system according to the invention.

Referring now to FIG. 2, there is shown a generalized block diagram illustrating the organizational relationship between market participants (i.e., system users) and the interactive market management system 50 according to the invention. Users may include a wide variety of participants in an industry market as well as other service providers and interested users. Users who subscribe to the services of the interactive market management system have all the services of the system available to them while non-subscribers may access the system and communicate with data bases of subscribers who authorize such access. Subscribers may include such market participants as sellers (i.e. distributors 83, suppliers 84), their agents 98 (e.g., manufacturers' representatives), buyers 82, freight service providers 86, financial service providers 96, commercial service providers 88, information service providers 94, and proprietary service providers 90, as shown. The interactive market management system 50 may also be linked to other interactive market management systems 92 in other industries.

Subscribing distributors, for example, can provide their customers with more convenient and more efficient ways to purchase goods and enjoy improved operations when utilizing the interactive market management system 50. In providing on-line, interactive electronic access to multiple sources as well as to freight, financial, and other related services, the interactive market management system 50 optimizes the procurement process, cuts costly inventories at each level of the distribution chain and provides controlled access to valuable operational and commercial information. Access to distributors is provided by a menu of optional services which may range from a simple mailbox service used to collect customer orders to a complete automated wholesale distributor management system that includes such functions as order entry, inventory control, sales and management reports and financial subsystems. Thus, a distributor may offer its customers an interactive, convenient and consistent way to place orders or conduct any other business with the distributor. This also permits the system 50 to provide buyers with a reliable and consistent way of reaching multiple sources to shop for goods, electronic access to carriers for shipping, and convenient access to financial resources and services, and information services. Thus, subscribing sellers are provided the necessary exposure and availability to a large community of buyers as well as a convenient access to a variety of important services related to their operation. This creates new efficiencies in shipping, financing, and promotion of products by providing a novel system for electronic online interactive access to a whole range of services related to the selling or buying process.

The interactive market management system 50 allows concurrent sessions with multiple parties, usable, for example, for shopping or closing all the details of an urgent shipment that has to be coordinated with an agent, a source, and a shipping company. In shipping and freight services, the market management system 50 makes available an option to permit shopping for available space on desired routes as advertised by various freight carriers or to directly inquire and book carrier services and receive intermediate confirmation that allows immediate scheduling. In addition, the system 50 supports for batch communications with third parties providing mailbox services to buyers and sellers who don't want to make their own systems available continuously. A unique advantage of this service is that while communications with the mailbox owner may be done periodically and on a batch basis, the appearance to the user can be one of an interactive exchange. A user may use the system 50 resources for its processing capabilities or may use the system simply as a conduit to translate the transactions and communicate them to remote computing facilities.

In addition, the system 50 can interconnect and serve as a conduit to a variety of other services such as airline reservations, data bases, banks, insurance companies, etc. Also, the system 50 provides subscribers with access to a variety of information services such as data base services including those provided by the system 50 itself using information stored in its own files (i.e., directories, information purchased by it for distribution, etc) or as a conduit to other information data base providers (e.g., Dialog, etc.). Access is also provided to computer services where the system 50 itself provides the processing capability or where a remote computer service is linked to the system 50 to provide users with computing services (e.g., engineering, forecasting, etc.). Finally, the system allows individual subscribers to use the network as a means to provide their own proprietary commercial and information services.

To provide the various services to subscribers and other users the system 50 maintains a local data base which may include a complete data base for individual subscribers as well as a partial data base of a subscriber. The service available to users can be accessed in a variety of operational modes which are characterized by the location of the computing logic, the location of the data base, and the communications mode. The location of the computing intelligence, which includes the logic for accepting or rejecting and processing a transaction, may reside with the central processor of the system 50 or it may reside in a remote computer of the subscriber. In addition, the subscriber's data base may be a completely local data base entirely located within the storage device of the system 50 or may be completely remote residing entirely in the data base storage medium of the subscriber's computing system. Alternatively, the systems may be shared in which case part of the user's data base is maintained at the system 50 processing center and part is maintained at the subscriber's computing center. Communication modes may be either interactive involving a continuous flow of transactions in both directions or batch involving periodic transfer of information or transactions in one direction at a time.

An Alert feature is available to subscribers using direct point to point communications with the system 50. Such users can define one or more of its remote terminals as Alert terminals. When an event that was flagged by the subscriber occurs, a message is displayed on the status line of the remote terminal along with an audio indication. Events that may be flagged include a shortage of inventory to satisfy an umbrella agreement order, an incoming conversational call, and incoming request for quotation (RFQ) from an important customer, etc.

An interactive conversational service is also available between different users who have either a need for immediate response or want their conversation to be recorded by the system 50 for their records. In a conversational session, one party submits to the system 50 a request for conversation. The system 50 uses its alert feature to advise the other party about the incoming call. Once the communications link has been established, the two parties exchange messages in turn. The entire conversation is recorded and a copy may be submitted to both parties as well as to other authorized subscribers. While the initiator may use either a switched or a dedicated communication link, the receiver should be a subscriber with a direct point to point link connecting its terminal.

Various transactions may involve an interactive mode in which complete interactive service is provided with immediate confirmation based on a local system data base. Interactive service may also be based upon a data base residing in another subscriber's remote computing center such that the interactive process requires retrieving and modifying information on the remote data base. In addition, an interactive mode is provided in which the system computer translates and transmits transactions to and from a user subscriber's computer system. Batch modes may be initiated in which a remote data base and other information are downloaded periodically to the system 50 data base and wherein transactions are accumulated by the system and periodically transmitted to the remote site. Further, a third party mailbox service is provided for accumulating transactions collected by the system 50 and transferring them periodically to the appropriate correspondents.

Financial service can be made available via the system 50 allowing financial institutions to lend money to the industry and to finance both the distribution channels and the buyer. This is achieved by control of the credit levels at each stage in a detailed way and by novel distribution of the credit risks between the lending party, the supplier, the distributor, and the buyers. In addition, the system 50 provides direct interaction between sellers, buyers, and service providers in all stages of the market distribution chain. Thus, it can accumulate all of the relevant information throughout the trading process. As a result of these capabilities, the system 50 has the unique ability to handle the financial outcome of the various transactions (e.g., payment, mortgaging, collection of funds, reports, etc.). Consequently, the system 50 may make available some financial services that are practically impossible without an overall coverage of the trading cycle including invoice and order mortgaging. For example, the system 50 also allows a buyer to mortgage a payment of a particular order or invoice to a financial institution or supplier. Using a set of detailed reports, the system 50 makes it convenient and practical for distributors to raise capital based on the credit rating of their customers, for suppliers to extend credit to their distributors or to the end users via the distributors for orders of their products, and for financial institutions to provide factoring with detailed credit controls and limits approved for both the buyer and the distributor. Thus, buyers can use novel or previously impractical financial services in a manner heretofore unavailable to enable them to negotiate better terms.

A payment service capability is provided to the user (e.g., buyer, distributor, supplier, service provider, etc.) who authorizes the system 50 to carry its payment instructions to the user's bank. Based upon the acceptance of such authorization by the bank, the user may use its remote terminal to authorize the system 50 to transfer payment instructions through the bank. This payment service automatically advises all relevant parties about such transactions even before the actual payment takes place. An early automatic advisory to the payee allows the payee to immediately update his credit control information. In some cases a payor will commit in advance to pay a particular invoice through the system 50. Based upon this commitment, a bank, financial institution, or a lender will make credit available to either the buyer or the seller (factoring). Payment of such "mortgaged invoices" is diverted by the system 50 and is made to the beneficiary's account on behalf of the seller (in factoring) or on behalf of the buyer (where the credit was extended to the buyer by a third party).

The buyer of goods or services can inform the system 50 that he commits to pay for a particular invoice or for invoices covering a particular order through the system payment services. This commitment is the basis for allowing third parties to extend credit to the buyer through the system and for allowing third parties to extend credit to the seller on the basis of its outstanding invoices. This credit may be extended as a factoring service or by a manufacturer who is willing to participate in the credit risk. The system 50 maintains a full audit trail for every order or invoice that is mortgaged. It makes this information available to buyers, sellers, lenders, and co-lenders via the system's services.

Whenever the system carries a payment instruction, an advising transaction is distributed to the payee as well as to other parties that may be interested in the information. The information is used for updating credit control and other management information files. As an example, a supplier may take part of the credit risk along with the financial institution when the buyer accepts its particular products from the distributor. Maintaining the actual balance of outstanding guarantees may allow the supplier to release more guarantees and control of total exposure. The system 50 also provides several types of reporting features for financial transactions. The daily journal details all the transactions reported as well as all the advisories submitted by the system with regard to a particular user. An on-line inquiry service allows a user to access every financial transaction in which the user participates. In addition, the system provides online access to balances and statement information. The system also provides both detailed financial reports and summaries which may be printed on a user's remote printer or submitted to the user by first class mail.

Because of the sensitivity of the information stored in either the system's local data base or the subscribers'-remote data bases, extensive provisions for security are necessary to limit access to the information and computing services provided. Each subscriber of the system 50 may specify what type of information and computing functions are authorized for each user signing into its services. A subscriber may elect to make some of the services available to anyone who cares to communicate with it. The system 50 maintains security profiles within its data base for every subscriber and every user and allows subdivision of the profile to the level of personnel records so that some of the functions may be authorized only to specific individuals. The system then consults those profiles at certain junctions to validate attempted access. When the system is connected to a subscriber via a CPU to CPU link, similar security measures are taken. The two computers exchange security information as part of a LOG-IN process and establishment of connection process. These procedures are activated automatically and are controlled by a set of rules for the dialog between the remote CPU and the system's central processor. In order to maintain the flexibility to control the access to each function by providing a high level of distinction between the various users, the system 50 supports four security validation levels.

Security validation level-1 involves an individual user initially accessing the system. He is required to identify himself by means of a user ID and a password recognized by the system. If the user is recognized by the system, his security profile is extracted from the security data base. A user who is not known to the system may still access limited services when the accessing user is recognized by a subscriber with whom the accessing user wants to interact or when the user accesses services that are defined by their provide (i.e., a subscriber) as unrestricted services. The second level of security validation (level-2) occurs when a service is selected from a service selection manu. For each selection of a desired service from the menu, the system checks whether the selected service option is authorized to the user.

After the selection of the desired service (e.g., interacting with a distributor), the user normally will be asked to select the party with whom he wants to interact (e.g., a specific distributor or a specific freight company, etc.). Selection of the service providing party is done by a name or short code. At this stage the system performs an automatic authorization procedure verifying that the user is allowed to access the service. If the limitations are found in the user's profile, the selected party's profile is checked to determine whether the party is willing to communicate with this particular user (i.e., security validation level-3). Based on the selected subscriber instructions, the user may be prompted for an additional password to permit access at this stage. If the session is authorized, a connection is established between the user and the provider's services (whether they are local or remote).

The level-4 security validation occurs when the user selects, from a menu of options, the specific function it wants to perform (e.g., enter an order, inquire about a late delivery, search the catalogue, etc.). The system consults the user's security profile as well as the service provider's profile to assure that the selected function is open to the user. Part of the authorization is based upon the subscribing provider's willingness to pay for a service to a particular user. In some cases the system 50 advises the user that a given service or function is authorized provided that the user will override standard billing procedure and pay for the cost of the service.

A great variety of services are provided by the system 50 regardless of the type of remote terminal used. To aid in the selection of the many available services, menus and shortcut features are provided. Thus, after the log-in process, a user in presented with a main menu to permit selection of a service. The system makes extensive use of nested menus to provide the necessary guidance for the beginning user as well as the required flexibility and shortcuts for the experienced user. A special go-to function allows the more experienced user to jump from any point within the routing tree to any other selected point without having to go through the maze of menu options.

In using the go-to function, the user may supply a short string of characters containing just the go-to sign which will cause the display of the previous menu. Alternatively, the user may follow the go-to sign with a code name for a selected service which will result in branching to the selected service or, the user may further include the selected service provider with whom the service is requested. In the latter case, if a password is required for the combination of service and service provider, the user may further supply the password required for that selection. In addition, the user may further include a string of parameters that will be interpreted by an application program invoked by the selection. However, even with this go-to mode of selecting the service, the party, and the function, all the rules and authorization security levels that apply in the normal selection process are maintained. Thus, if the system encounters an unauthorized selection, it stops the shortcut process, displays an error message with the reason for the rejection, then continues with the normal selection mode.

Concurrent communications is provided by the system 50 during any transaction session permitting any user to concurrently communicate with a plurality of different types of parties. Thus, for example, during an interactive session with a buyer, a seller may communicate concurrently with a financial institution to arrange financing, a supplier to procure a needed item and a freight carrier to arrange for shipment. Such concurrent sessions may be conducted using various techniques, including windowing or flipping from one party to another.

Since most of the transactions carried out by the system 50 have a monetary value, the system stores and logs every transaction carried out. Once a day the system 50 will generate for every user a journal of all transactions reported to it or for it in the previous day. In addition, the system logs every entry of the user ID, the password, and the individual operator ID to permit tracking of every operation. The retrieval process allows reconstruction of a particular transaction, the presentation of all transactions related to a particular order or event, or the extraction of any combination of any transactions. Each subscriber may define the extent of the period for which it maintains the transaction files on-line.

Many services are provided to buyers who are always a major force in any industry market and thus a major potential interactive market management system user. After a buyer has established a communications link (e.g., by dialing on a public telephone system), the user goes through a standard procedure requiring log-in wherein he enters an assigned user ID code and password. After identification by user ID and password, the system 50 determines whether this is a non-subscriber user who is authorized to access only selected subscriber information or a subscriber who can select from a wide set of services. As soon as the log-in is completed, the system 50 displays a page of news. The system uses this service as its own promotion board or as a way to inform users about operational changes, new features, new services, etc.).

Before establishing a transaction session with a particular subscriber, the buyer is advised about any outstanding incoming mail (e.g., incoming bids sent by distributors, incoming shipping advisories, incoming invoices, incoming letters from distributors and other users, etc.) waiting for him to review. This mail is summarized in categories such as bids, promotions, notifications, files, and text memos. It is then followed by a list of the mail items grouped by prioritized categories with the sender identified for each item. The user may then select items from this list thereby entering the mail service session. Alternately, however, the user may select (as anywhere else in the system) to proceed directly to another service, deferring handling of its incoming mail. Bids, shipping advisories, and invoices are presented as printable documents and also as files that can be either transferred to the user's computer or modified by the user (e.g., a bid may be reviewed by a user and then converted into an order).

If the user elects to continue with a mail session, the system 50 allows the user to prepare documents and memos, distribute them to a list of addressees, file them for later reference and confirm the delivery or retrieval of messages. In addition, in a mail session, a user can access a daily journal, maintain private and public directories, and interconnect with external private and public delivery services (e.g., telex, mail, etc.). The system mail services handle formatted transaction files which permits it to present such files containing orders, bids, delivery advisories, etc. as incoming or outgoing documents while maintaining their original format thereby allowing data processing of the data contained in the files. The user thus may first review the mail items as documents and then he may proceed to process the contents as data.

The system 50 also can determine the nature of various mail items so that it can present them in an order of priority and alert a user when an item requires immediate intervention. This capability facilitates selection of work flow such that a user may delay handling of text memos and promotions while insuring the scanning of such documents as delivery advisories so that its warehouse is prepared to receive shipments.

Once past the standard access procedure and having either passed through the mail session or delayed mail processing, the user is asked to select the type of information provider (e.g., distributor, freight carrier, financial institution, etc.) the user wants to communicate with. After the user has passed through the necessary security validation, the user is asked to select the party he wishes to interact with and the system validates that the selected party is willing to accept such a transaction session. The results of the validation check may be an acceptance of the session by the provider, a demand for additional security information (e.g., additional password), a total rejection of the session, or an acceptance of the session on the condition that the user will accept the costs.

As an example of a transaction, a buyer may request a transaction with a particular distributor. In this case, if the buyer passes through the security validation levels as required, the buyer may receive one frame of news/promotion information prepared by the selected distributor. This frame may be changed by the distributor as frequently as desired. The user may then proceed with the transaction session or elect enter a promotional review session. The variety of services that are available from the distributor when the transaction session proceeds are presented to the user for his selection by a menu.

Each distributor may present its customers with different choices in its menu since the distributor may choose the services it prefers to offer and the different types of data bases and service levels it desires to make available. A typical distributor's menu may present catalogue/price list inquiry, enter/modify request for quotation (RFQ), review proposals, enter an umbrella agreement, enter/amend/confirm an order, inquiry and report, enter/review payments, and mortgage of orders/invoices. To identify an item to be referred to after a choice is made, the system supports multiple alternative keys for accessing the same item. For example, if a part number is not known, the user may enter a "?" with parts of the description, and the system will display all the items that need such description segments and allow the user to request the desired one. Additionally, the system allows multiple types of reference among different items. Such references may be substitution, complementary, one-way replacement, documentation for an item, a component relationship, etc. At any point the user may review information about related items such as possible substitutes. The system also uses the complementary relationships to recommend additional or substitute items at ordering sessions.

A buyer may enter and substitute one or more RFQ's. At the entry time the system validates the various data items, and calculates weight, volume, etc. distributor's catalogue, the system can suggest Based upon complementary relationships listed in the complementary items. The user may modify an RFQ that was entered before and the system recalculates the prices and the terms of the bid. As soon as the RFQ is entered, the system attempts to prepare a bid and if the data base is available and the system is authorized by the distributor to quote the item, it will prepare an automatic bid and submit it to the user on-line. The user may browse through the bid, print it, or keep it for later reference. If the bid is not immediately available, the system will confirm receipt of the RFQ and deliver the bid as soon as available. When the bid becomes available, the system generates an automatic memo in its electronic mailbox notifying the user that a new bid is now available. The bid can be accessed by the buyer either as a mail item or by means of a menu selection. If the system is not authorized to release the bid, it will route it to the distributor for review before it is released to the buyer. This interactive process of quotation is iterative and thus a buyer may modify its request and retransmit the RFQ several times before making an order decision.

A distributor may sign a master purchasing agreement with a buyer providing a fixed price as well as a definition of delivery time for a given predetermined list of items. The terms of such an agreement are entered and authorized by the seller. When ordering against an umbrella agreement, the buyer enters an agreement number and thus defines the terms of the order and may define the shipping address as well. The system then calculates and presents the balance of each item within the master agreement. In addition to ordering against it, the buyer an also inquire about the terms and balances of the agreement or request some modification of either the terms or the items listed in the agreement. The request for agreement modification is sent to the distributor and becomes effective upon approval by the distributor.

Purchase orders may be entered by a buyer in one of a variety of modes. Interactive entry may be made from the buyer's remote terminal with the system helping to identify the required items, proposing substitutes and complementary items, validating various data items and computing such values as weight and volume of the ordered items. In addition, an outstanding bid can be converted to an order either as is, or with changes. In case the bid prices are different than the standard price list and the content of the order was changed, the new order may be processed but the terms remain pending until a distributor confirmation. However, an outstanding RFQ can be converted to an order either as is or with modifications. Further, an orders file can be transmitted from a buyer's personal computer and order confirmations as well as any errors in the orders are interacted between the PC and the system 50 using the same validation procedure as if the order were entered via a terminal. If authorized by the distributor, and if the distributor's inventory data base is on-line, the system 50 can confirm available orders immediately based upon distributor's preferances. The system can also propose substitutes for an available item, indicate when it will become available, reject the order, or defer the order confirmation. When authorized, the system 50 can mortgage inventory and commit for a confirmed delivery as well.

An outstanding order may be modified by the buyer at any time. The modifications may be made either by deleting, changing, or amending lines in the order or by entering a new order that replaces the old one. Once modified, the order undergoes again the entire validation process, the distributor is advised and the modification is rejected or deferred if it is not valid or if the modified order cannot be supplied. Also, the system 50, when authorized, can send the customer a shipment notification a predetermined time ahead of actual delivery. Such notification can be sent via the system's own electronic mail service, an overnight carrier, first class mail, telex, or facsimile. Once a shipment is scheduled, a buyer can extract from the system 50 a set of receiving documents. The documents include such data as location in the buyer's warehouse, and the documents can also serve as accounting and/or operational documents at the user's site.

The distributor normally delivers an order to the buyer's site, however, it is possible to take delivery in the distributor's, the agent's, or the manufacturer's warehouse. The system, therefore, provides extensive services to allow reservation and control of freight services. Buyers can also use the system's financial services if they are subscribers of the system 50 including payment services, factoring, and borrowing. Payment services allow a buyer to instruct its bank to pay a bill or a group of bills to a distributor or to another financial institution on behalf of the distributor. Before using this service, an agreement is signed between a buyer, distributor, and the buyer's bank. When placing an order a buyer may enter "mortgaged" to mark the order. This represents a commitment of the buyer to pay the invoice for the order to a particular trust account on behalf of the distributor. Having such a commitment allows the distributor to use the buyer's credit rating in obtaining working capital. The advantage to the buyer of this factoring capability is the ability to deal with more distributors and to have greater negotiating flexibility.

The system 50 will also allow distributors, suppliers, and financial institutions to make credit available to buyers. This credit may cover all the supplies bought from a given distributor, or all the products of a given manufacturer, etc. The commitment to pay through the network allow the lending company to monitor and control the credit utilization and risks involved with extension of credit. Additionally, the system can produce either reports or answers to inquiries at the buyer's request, subject to approval of the information provider, on a wide selection of information about its orders, shipments, invoices, outstanding loads, usage of various items, etc.

Many unique services to suppliers (e.g., manufacturers) are made possible by the system 50. Typically, subscriber suppliers can be expected to connect their own computer centers (CPU's) with the system 50 over an on-line communications line to allo their customers to interact with them through the system. Transactions communicated with a supplier's computer center can be generated in several ways. A distributor may interact with a supplier using a terminal connected to the system 50 over either a switched or a leased line. In addition, the distributor's computer application may generate orders, inquiries, RFQ's, etc. and communicate the transactions to the supplier. Such distributor's applications may run on a remote distributor's computer in which case the system 50 receives a transaction from one computer, translates its content, and transmits it to the other computer. Alternatively, the system 50 may run the distributor's application and interact directly with the supplier's application. Each time a logical or physical link is established between a supplier's computer and the system 50, an exchange of ID's and passwords is effected to identify the supplier and assign it a security profile.

Suppliers may elect to use a narrow set of services to communicate with the system 50 only periodically and to use a batch mode to exchange transaction files destined to and from their correspondents. Two types of batch-oriented services can be carried out through the system 50. A limited mode is a mailbox service. In this mode, the system 50 collects transactions sent to the supplier's mailbox. The supplier calls the system periodically and retrieves all the transactions and messages collected for it. Additionally, it can send to the system batch transaction files addressed to its correspondents. The system 50 provides for the communication and delivery of these transactions to their destinations. While the communications with the outsides world may be based upon a standard communication protocol for the industry (e.g., EDI), the communications with the supplier is done in its own proprietary formats and all the necessary translations are performed by the system 50. A less limited mode of batch services within the system 50 allows distributors and other parties to interact with the system on behalf of the supplier when placing orders, inquiries and other transactions destined to it. The system 50 validates the transactions and places them in a batch file. Each time the supplier calls the system 50, it retrieves all transactions accumulated for him and then provides for submission of outgoing material to be delivered back to the distributors.

The system 50 also allows the supplier to provide its customers with an on-line interactive sales service providing immediate quotations, confirmations, and status information. Alternatively, some of the transactions may be validated and recorded but the actual confirmation is deferred for either a manual intercept or later processing at the supplier's end. At any point during an interactive session with a supplier, a user may branch into a catalogue/price list search session. While the system supports a wide set of options in searching a supplier's catalogue, a subscriber supplier may elect to support only a subset of these options. Such options include searches by multiple keys partial description, related items (substitutes, complementary, promotional relations, documentations, systems, etc.) as well as multiple ways to price an item.

The bidding process within the system 50 permits both pricing an RFQ and confirming the availability of the products as requested. When the system transmits an RFQ to a supplier, the system expects to receive a validation of the basic data items and a structured bidding file. If the bid is immediately available, it is communicated to the distributor's terminal who may then proceed to place an order. If, however, the supplier defers its response (e.g., because it requires manual intercept, or because it wants to call the distributor and converse with the distributor before officially quoting), the system 50 will so inform the distributor who may then proceed to the next transaction. When a deferred bid becomes available, the system 50 places a notice in the distributor's mailbox and alerts the distributor that such information is now available. The distributor may then either review the bid as incoming mail or process it as raw data (i.e., change it into an order, etc.).

Sales orders can be entered by a user via an interactive or batch terminal session with the system 50, or by a user's computer entering orders using an interactive CPU to CPU communication session with the system 50. In addition, a user may submit orders to the supplier's mailbox. Further, an agent may enter orders to the supplier via the system 50 or a supplier may inform its agents via the system about orders accepted and entered directly in its offices. Such information may be entered by the supplier using either a terminal, or a CPU to CPU communication. Once an order is entered, the supplier can use the system 50 as a means to deliver order confirmations. Copies of the confirmations are delivered to the customer, the agent, and if required, to a freight carrier, a financial institution, and any other desired party. Advisories about any amendment to the order or change in the delivery schedule are delivered to the customer and other desired parties via the system 50 mail service.

Delivery notifications can be transmitted by the supplier to its customers with copies to the supplier's agents a certain time before the actual delivery. In case of a direct delivery to the end user, such an end user is also advised using telex, first class mail, facsimile or any other delivery method. The system 50 uses this delivery notification in preparing receiving documents for its subscriber distributors. The system also supports delivery of invoices from suppliers to their customers. When the customer is a wholesale distributor whose financial reporting system is managed by the system 50, each invoice is automatically entered in its procurement data base, waiting for manual authorization to be recorded. The invoices can be both printed and processed as transaction files at the receiving end. Whenever a distributor pays a supplier's invoice via the system, an advisory is forwarded to the supplier even before the actual funds are accepted. Such advisory can be submitted to the supplier as a memo or as a transaction used to update its credit control data base.

Whenever scheduling a shipment, freight departments of a shipper may use the system 50 as a convenient way to communicate with carriers. Thus, the system 50 can provide freight services to suppliers, distributors, buyers, agents and any other shippers. A shipper can interactively enter freight RFQ information and submit it to one or more subscribing carriers. A bid can be received immediately in the case that the carrier operates an interactive quotation service or shortly after if the bid is prepared and reviewed manually on the carrier side. Once a deferred bid is received, it is forwarded to the supplier as a transaction file and an advisory is placed in its mailbox. A freight service reservation can be sent to the carrier either as a batch transaction file or interactively. A confirmation is immediately delivered to the shipper if an interactive reservation service for the carrier is available. Otherwise, such confirmation is delivered as soon as practical, and respective advisories are placed in its mailbox. Also, the system 50 may activate the Alert feature when a bid is received.

The carrier, the shipper, and the consignee can exchange status and operational information using the system 50 mail services. Because of the importance of timely handling of the information, both shippers and carriers may use the system's interactive services to resolve problems. In addition, a supplier can search automatically the freight services posted on a system bulletin board. The main advantage of this service is the ability to piggyback partial loads on already scheduled routes. To search the bulletin board, the shipper has to specify details about the source, destination, and nature of the load as well as limitations, if any, on the carriers he is willing to use. The selected offers are then submitted to the shipper's remote terminal by the system 50.

As an additional service, a supplier who has scheduled a shipment of less than a truckload on a particular route, may advertise the available space on the system bulletin board thereby enabling other shippers to share the freight costs. The supplier may limit the type or identity of shippers who may share the route with it utilizing the system 50. Thus, the system 50 can serve as the primary communications link between a supplier and its carriers. Using services available through the system, such as conversational sessions, the alert feature, and mail services provides unique efficiencies in the supplier's freight department.

A supplier may use the general financial services available to other users on the system 50 as a means to pay its invoices, and as a convenient means to be informed each time a payment is made through the system. However, the system 50 also provides several unique financial services through suppliers. Among these is the ability to either finance or share the credit risk of financing an end-user's purchase of its products. A major problem for manufacturers (especially in commodity items) is that they do not deal directly with the end users. The system 50 allows distributors to pass through supplier's credit to the buyers. Thus, the supplier alone with or without participation of a financial institution may make the credit available conditioned upon buying its products. The system 50 manages the balance of products (by time) that has to be purchased by the distributor within a given time, maintains a buyer's mortgaging of the invoice, and provides a paying trust with all of the necessary information to manage and control the balances and the credit risk. The lending can be managed by a financial institution while allowing the supplier to approve each sale and control its exposure.

The system 50 also provides services of unique value to agents, such as manufacturing representatives. Agents have great need for constant communication both with their customers (distributors) and the suppliers they represent. In addition, agents who stock inventory require a link to their inventory management system. The ability to reach electronically both suppliers and customers through the system 50 and to be advised about any events in the supply cycle allows agents to dramatically enhance efficiency and service. Thus, the system 50 provides for an agent to receive RFQ's and other transactions sent by distributors to him or to be advised if sent directly to the supplier. Such an RFQ is available both as incoming mail and as a transaction file ready for further processing. The RFQ can be available at the same time, both to the agent and its supplier. Thus communications cost and problems are reduced.

Agents may use the system 50 to review RFQ's, prepare a bid, either manually using a remote terminal (in referring to the original RFQ), or automatically using its own remote computer system. If necessary, the agent can first discuss the RFQ with the supplier, with each party accessing the RFQ information through their own remote terminals, and then proceed with preparation of the bid. The bid may then be submitted to the distributors via the system 50 or by any interconnected mail service. An agent may also be authorized by suppliers to receive copies of every order placed by a customer in its territory directly to the supplier. Additional advisories may be sent to the agent each time an order is amended. When an order is accepted at the agent's office, the agent may enter the order through the system 50 directly to the supplier's files. The supplier then has an opportunity to review the order in an intercept mode. Agents may receive copies of every delivery advisory sent to their customers. Any status information that relates to such deliveries (e.g., advisories of delay because of a broken truck) can also be distributed to the agent through the system 50.

Figure 3:
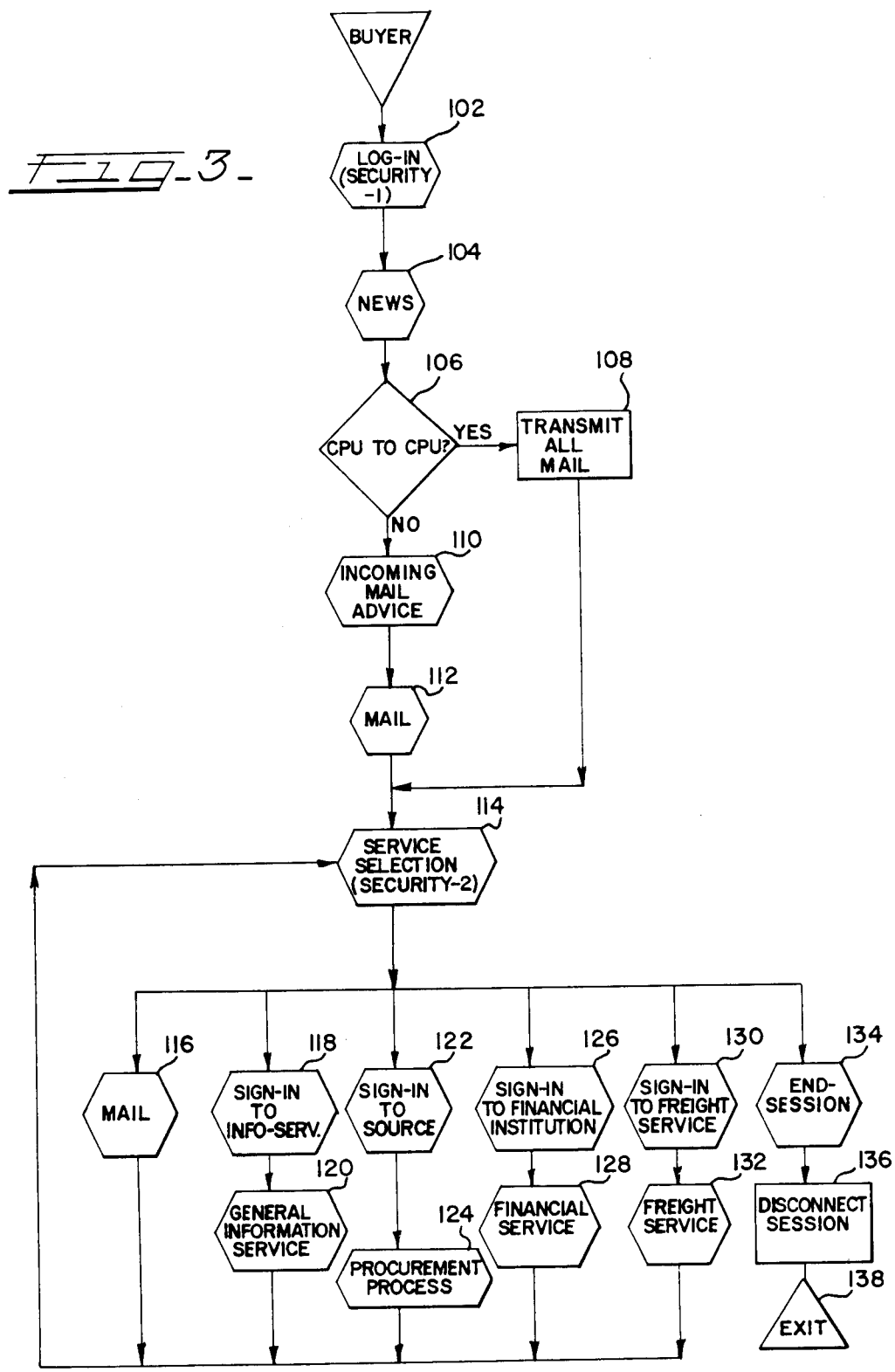
FIG. 3 is a generalized flow diagram illustrating the methodology and structural flow for a BUYER transaction function for a specific embodiment of the interactive market management system according to the invention.

Referring now to FIG. 3 there is shown a generalized flow diagram illustrating the methodology and structural flow for a BUYER function for a specific embodiment of the interactive market management system 50 according to the invention. Beginning at the top of FIG. 3, a buyer enters the BUYER transaction by entering a LOG-IN procedure 102 wherein the user identifies himself by a user-ID and a password which provides a first security level of validation (i.e. level-1), which is described in greater detail hereinafter with reference to FIG. 4. Subsequently, a NEWS service 104 provides such information as new system features, operational changes, new services, and particular information of interest to buyers by displaying a single screen of such information. Processing flow then proceeds to logical block 106 wherein a test is made to determine whether the user accessing the system is a remote terminal or a CPU. If the result is that the accessing party is a CPU, processing flow is directed to functional block 108, as shown, wherein all mail existing in the user's mail file is transmitted, and processing flow then continues to block 114. However, if the result at logical block 106 is negative, then processing flow proceeds to functional block 110 (INCOMING MAIL) wherein the user is advised about any outstanding mail waiting for him by summarizing any waiting mail in categories such as bids, promotions, delivery notifications, files, text memos, etc. This function is described in greater detail hereinafter with reference to FIG. 6.

After receiving mail advice, the user may enter a MAIL session 112 (described in greater detail hereinafter with reference to FIG. 11) where the subscriber can prepare mail such as documents and memos, distributes them to a desired list of addresses, etc. Following the MAIL session 112, the subscriber enters a SERVICE SELECTION function 114 which requires the user to enter a selection of a desired service from a menu which is then checked in security validation level-2 to determine if the user is authorized for that service. Based on the menu selection made by the user at functional block 114, processing flow will branch to one of a plurality of functional branches, as shown.

The functional branch 116, if selected, permits the user to enter a MAIL session to process desired mailing transactions. The four primary service branches, 120, 124, 128, 132 require the user to pass through a third security level of validation of the SIGN-IN function as shown by functional blocks 118, 122, 126, 130, respectively. Thus, in most cases, after the user selects a desired service, the user is asked to select the party with whom he wants to interact (i.e., a specific distributor, freight company, etc.) in the SIGN-IN procedure which is described in greater detail hereinafter with reference to FIG. 9. In the SIGN-IN procedure, once the subscriber has selected a specific party, the third level of validation determines whether the party is authorized for such communication. Subsequently, if authorized, the processing flow proceeds to the desired service block, as shown.

The user may select a general INFORMATION SERVICES FUNCTION 120 which permits the user to access a wide variety of information services such as data base services or computing services (described in greater detail hereinafter with reference to FIG. 13). The PROCUREMENT PROCESS 124 may be selected, which allows the buyer to place orders and perform other related operations (described in greater detail hereinafter with reference to FIG. 14). The FINANCIAL SERVICES function 128 provides for financial institutions to extend financing to buyers (described in detail hereinafter with reference to FIG. 16) and the freight services function 132 allows the buyer to reserve and control freight services (described in detail with reference to FIG. 19). If the buyer at functional block 114 desires to end the transaction, the system 50 branches to functional block 134 to end the session as indicated by functional block 136, thereby updating control information, disconnecting the application session and exiting the transaction as indicated at block 138.

Figure 4:
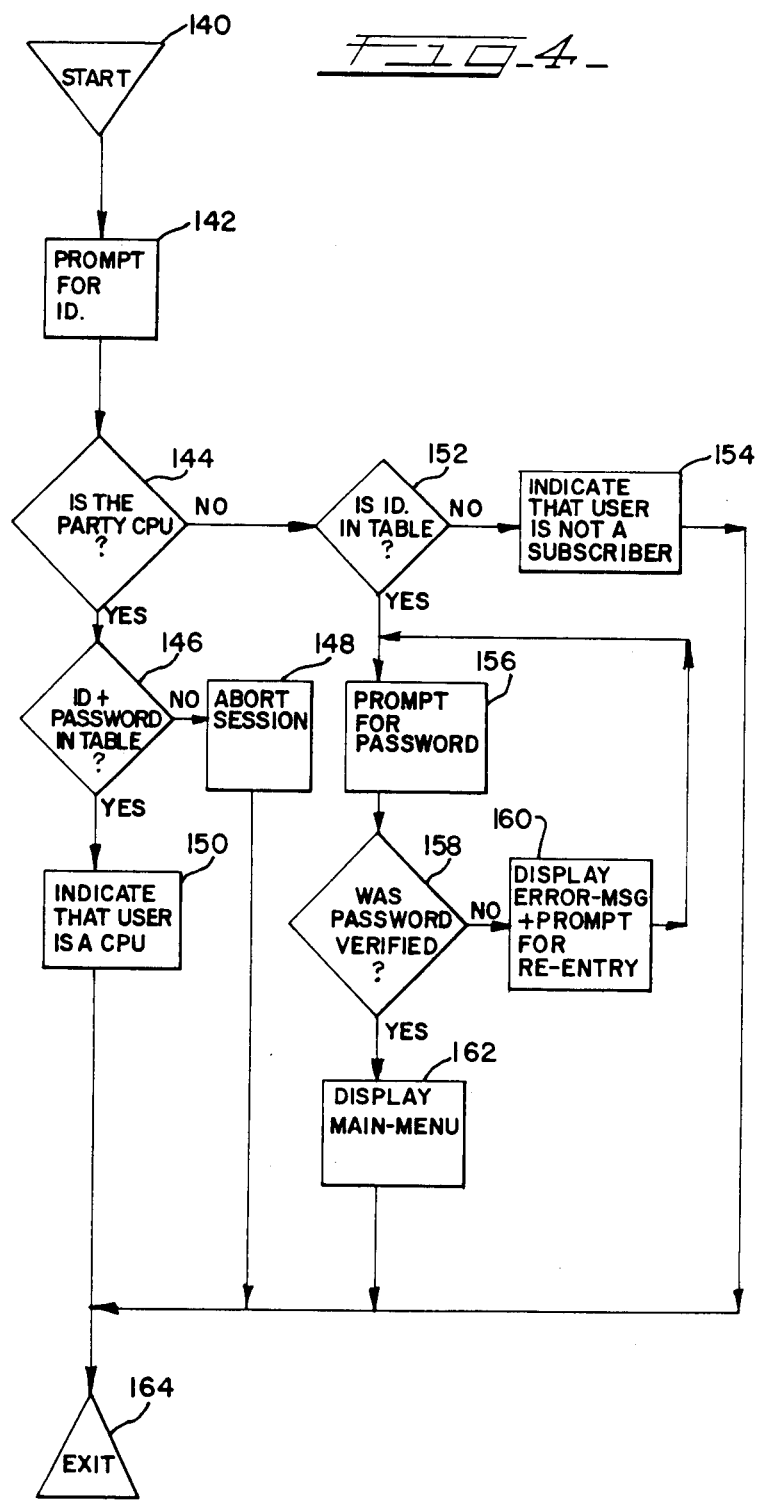
FIG. 4 is a detailed flow diagram illustrating the methodology and structural flow for a LOG-IN function as shown in FIG. 3 for a specific embodiment of the interactive market management system according to the invention.

The LOG-IN function which provides the first level of validation security is shown in detail in the flow diagram of FIG. 4 which illustrates the methodology and structural flow for a specific embodiment of LOG-IN function. The LOG-IN process is entered as shown at 140 and the user in immediately prompted for a user ID as indicated by block 142. After entry of the user ID, the system 50 determines whether the accessing party is an automated CPU or a user at a remote terminal (based, for example, on the type of ID code or on a CPU's control table in the system 50 data base) as shown at logical block 144. If the accessing party is an automated CPU system, processing flow proceeds to logical block 146 where an ID and password table is interrogated to determine whether the user is authorized. If the result at 146 is negative, the session is aborted as indicated at block 148 and processing flow proceeds to exit at 164. However, if the result at logical block 146 is affirmative, then the system sets a flag indicating that the user is a CPU and processing flow proceeds to exit the LOG-IN routine as shown at 164. If the result at block 144 is negative, processing flow branches to logical block 152 where the ID table is interrogated to determine whether the accessing party is a nonsubscriber. If the result at logical block 152 is negative, a flag is set by the system to indicate that the user is a non-subscriber, as illustrated at functional block 154, and processing flow then exits the LOG-IN routine as indicated at 164. However, if the result of the operation at logical block 152 is affirmative, the user is immediately prompted for the password, as shown at block 156, and the password is checked for verification as illustrated at logical block 158. If the password is not verifiable, a message error is displayed and the user is again prompted for a password, as shown. If the password is verified, the system displays the main menu, as shown at functional block 162, and the routine is exited as illustrated at block 164.

FIG. 5 is a flow diagram illustrating the processing methodology and structural flow for a specific embodiment of the NEWS function as shown in FIG. 3. The NEWS function is entered at 188 immediately after the user has completed LOG-IN and checks to determine if there is any news to be displayed for the user, as illustrated at logical block 190. If there is no news to be displayed, the NEWS function is terminated and exited as illustrated at 194, and if news is to be displayed screens (i.e., pages) of news are displayed for the user. This permits information to be provided to the user about operational changes, new features, new services, and other information of interest to the user. After the news information is displayed for the user, the news routine is exited as indicated at 194.

Referring now to FIG. 6, there is shown a flow diagram illustrating the processing methodology and structural flow for a specific embodiment of an INCOMING MAIL function as shown in FIG. 3. The INCOMING MAIL function is entered at 195 as shown, and the system immediately checks to determine whether there is any mail for the user as illustrated at logical block 198. If there is no mail, the system displays a no-mail message as illustrated at 102. If there is mail for the user, the system displays a summary to advise the user about any outstanding incoming mail which is waiting for him. The summary summarizes the mail waiting in categories such as bids, promotions, delivery notifications, files, and text memos. The summary is followed by a list of the actual mail item grouped by prioritized categories with the sender identified for each item. Normally at this point, the user will work on his mail, selecting items from the list, thereby entering a MAIL session (as illustrated at FIG. 3 at block 112), after exiting the INCOMING MAIL function as illustrated at 204 in FIG. 6.

Referring now to FIG. 7, there is shown a flow diagram illustrating the process methodology and structural flow for a SERVICE SELECTION function which also provides validation security level-2 as shown at functional block 114 of FIG. 3. The SERVICE SELECTION function begins at block 206, where a service is selected from a menu by the user. Subsequently, a logical operation 208 is performed to determine whether the user is authorized for that service. If the result of the logical operation 208 is affirmative, the processing flow proceeds to exit the SERVICE SELECTION function as indicated at 216. However, if the service selected is not authorized, the system 50 checks to determine whether the transaction involves an automated CPU at the remote site communicating with the system as shown at logical block 210. If the result of the logical operation 210 is negative, an error message is displayed and a prompt for reentry of the selected service is displayed as illustrated at block 212, after which processing flow returns to block 208, as shown. If the transaction involves an automated remote CPU, then an error code is generated and transmitted as indicated at 214, and the SERVICE SELECTION function is terminated and exited at block 216.

FIG. 8 is a flow diagram illustrating the processing methodology and structural flow for a specific embodiment of the SIGN-IN function and security validation level-3 shown in FIG. 3. SIGN-IN is entered as indicated at block 218, and a selection of a particular service providing party is made by means of a name or a short code. Once selected, the selected party is checked in an automatic authorization procedure to verify that the user has selected a party recognized by the system, as shown at logical block 220. If the result is negative, an error message is displayed and system flow returns processing back to logical block 220. If the result is affirmative, processing flow proceeds to the logical block 224, as shown. At the logical block 224, a test is performed to determine whether the selected party is actively available and, if not, an error message and a prompt for reentry is generated and transmitted to the user, as indicated at functional block 226.

If the result at the logical block 224 is affirmative, a test is performed to determine whether the selected party is one who accepts contacts from any callers, or only selected callers, as shown at logical block 228. If the result at block 228 is that the selected party only responds to authorized callers, the processing proceeds to logical block 230 which tests to determine if the caller is an authorized party. If the result at logical block 230 is negative, the system generates an error message and terminates the selected service session producing an exit from the SIGN-IN function, as shown at block 238. If, however, the result at logical block 230 is positive, meaning that the user is authorized to contact the selected party, then a billing code is assigned, as shown by functional block 234, to permit identifying and billing of charges for the system 50 services provided. After the billing code is established, the processing flow proceeds to functional block 236 where the user selects a desired function, and the type of connection required is established (utilizing an ESTABLISH CONNECTION function described in detail hereinafter with reference to FIG. 9). The SIGN-IN routine is subsequently exited as shown at block 238.

An ESTABLISH CONNECTION function is illustrated in the flow chart of FIG. 9 which illustrates the processing methodology and structural flow for a specific embodiment of the ESTABLISH CONNECTION function as shown in FIG. 8. The ESTABLISH CONNECTION function begins at block 166 where the user selects a desired function to be performed by the previously selected party. Subsequently a logical operation 168 is performed to determine whether the function is served locally or remotely, as shown. If the result at logical block 168 is negative, a logical operation 170 is performed to determine if a batch mode operation is to be performed. If the result at logic block 170 is negative, an interactive exchange made with a remote computer is enabled, as indicated at functional block 172. If the result of logic operation 170 is positive, then a mode of operation that accumulates transaction records for batch transfer based on a desired standard at a later time is enabled, as indicated at functional block 174. In both cases, once the appropriate mode of operation is enabled, the ESTABLISH CONNECTION function is terminated and exited as shown by block 186.

If the result of the logic operation 168 is affirmative, a logical operation 176 is performed to determine whether the data base to be accessed is a local, full data base. If the result is negative, a logical operation 178 is performed to determine whether the data base is a local, partial data base. If the result of the logical operation 178 is negative, then an interactive transaction process is enabled for accessing a remote data base, as illustrated by functional block 180. If the result of the logic operation 178 is affirmative, then an interactive process is enabled, and transactions are accumulated to be periodically batch transmitted to the remote data base. In this mode, a partial data base is downloaded periodically to the central processor from the remote data base. If the result of the logic operation 176 is affirmative, then a completely interactive process is enabled, with immediate confirmation of transactions, as shown by functional block 184. In both block 182 and block 184, the mode of operation enacted is interactive, using only a local data base for validation and confirmation of a transaction. In both cases, the local data base immediately amended to reflect the processed transaction. However, in the mode enacted in block 184, where the entire data base is locally maintained, the amended data base is the primary source of information. In the mode enacted in block 182, where the local data base is a secondary partial image of a primary base managed elsewhere, the local data base is downloaded periodically from a remote site. The transactions that are processed locally are accumulated in addition in a separate transaction file and are then transferred periodically to the remote primary computer for updating. The ESTABLISH CONNECTION routine is terminated and exited after either block 184 or block 182, as illustrated by block 186.

Once the SIGN-IN function has been completed and exited, the user is then enabled to proceed with the selected service. However, having once entered a particular service function, the user is able to jump to other functions and override menus, thereby permitting an experienced user to move from any point within the routing tree to any other selected point without having to go through all menu options. Thus, a service selection SHORTCUT function may be activated at any time by a go-to command, formatted to optionally indicate at least the function, the party desired, and any necessary password. The go-to command initiates a service selection SHORTCUT function as illustrated by the flow diagram of FIG. 10. The service selection SHORTCUT function is entered as shown at block 240, and is activated as shown at logical block 242 via a logical operation which determines whether the go-to command (which may be a character such s ">") has been initiated. The go-to command may have a format, for example, as follows: "go-to, function name, selected party name or code, password, character string". If the result at logic operation 242 is negative, the SHORTCUT function is exited as illustrated by block 260.

If the go-to command is present, processing proceeds to logical block 244, where the logic operation determines whether the function indicated is recognizable by the system. If the result of the logic operation 244 is negative, an error message is generated and a prompt for re-entry is provided to the user as shown by functional block 246. If the result of the logic operation 244 is affirmative, the system performs a logical operation to determine whether the selected party exists and is recognized by the system, as illustrated at logical block 248. If the result of the logical operation 248 is negative, an error message is generated and a prompt for re-entry is provided to the user, as illustrated at functional block 250, after which processing flow returns to block 248, as shown. If the result at logical operation 248 is affirmative, the system determines whether a password is required as shown at logic block 252. If the result of the logical operation 252 is affirmative, a password is requested of the user and checked to determine if it is correct, as indicated at logical block 254. If the result of the logical operation 254 is negative, an error message is displayed and a prompt for re-entry is provided to the user, followed by return of processing flow to logical block 252, as shown. If the result of the logic operation 254 is affirmative, or at 252 is negative, processing flow proceeds to activate the new selected service transaction and to set up the required parameters, as indicated at functional block 258. Subsequently, the service selection SHORTCUT function is terminated and exited, as illustrated by block 260.

Referring now to FIG. 11, there is shown a flow diagram illustrating the processing methodology and structural flow for a specific embodiment of the MAIL function as shown in FIG. 3 at block 116. Once the Mail function has been selected and level 2 security satisfied at functional block 114 of FIG. 3, the MAIL function is entered, as illustrated at block 262 of FIG. 11. Initial entry into the MAIL function involves a level-4 security validation process for the selected function, as illustrated at block 264. The level-4 security validation process permits the system to consult the user's security profile, as well as the service provider's profile, to assure that the selected function is open to the requesting user (described hereinafter in greater detail with reference to FIG. 12).

After passing through security function 264, the system permits the user, by means of menu selection, to select any one of the available services 268-282, as shown. Thus, the MAIL function allows the user to select, review, save, or erase any incoming mail as illustrated at functional block 268. User may also unload, save or erase incoming files, as illustrated at functional block 270, and may prepare new documents or files or edit old documents or files and distribute them to a list of addressees, as indicated at blocks 272 and 274. The user may also distribute memos, documents, or transactions files to subscriber mailboxes, and send documents, messages and other mail through other mail services, telex services, facsimile or other external public and private delivery services, as shown at functional blocks 276 and 278. The user may also send batch files to correspondents, and may maintain and review a daily journal of all mail received and sent, as well as maintain private and public directories, as illustrated at functional block 282.

Once a selected service is completed, processing flow returns to the FUNCTION SELECTION and security validation, level-4 function 274, as shown, to permit the user to select a new desired mail function. This mail service function is able to handle formatted transaction files, thus it an present transaction files that contain such matters as orders, bids, delivery advice, etc. as incoming or outgoing documents, while maintaining their original format and allowing further data processing of the data. Consequently, the user can first review the mail items as text documents and then he may process the content of the documents as data. In addition, the system can present various mail items in the order of priority and alert a user when an item requires immediate intervention. This facilitates convenient selection of work, while insuring the review of high priority items. Once a user has completed all mail functions desired, the MAIL function is ended via menu selection, as indicated by functional block 266 and the MAIL function is exited, as indicated at 284.

Function selection processing with security validation level-4 is illustrated by the flow diagram of FIG. 12 which illustrates the processing methodology and structural flow for a specific embodiment of the FUNCTION SELECTION and security validation level-4 process as shown in FIG. 11 at block 264. The FUNCTION SELECTION Process begins, as shown at block 286, where a particular function is selected via a menu or a go-to command. The system then determines whether the function is authorized for that user, as illustrated by the logical block 288. Thus the user selects a particular function to be performed with the party previously selected, such as entering an order, inquiring about a late delivery, searching a catalog, etc. At this point the system must consult the user security profile as well as the service provider's profile to assure that the selected function is authorized to be available to that user. If the service is not available to the user, an error message is displayed, as illustrated by functional block 290, and processing flow proceeds to exit the FUNCTION SELECTION process as indicated at block 294. If, however, the selected service is authorized to the user, the processing flow continues to block 282, where the billing center for the selected function is set. The user may be advised that a given service or function is authorized only if the user will override billing and pay for the cost, as illustrated at block 292. Subsequently the security routine is exited as shown at block 294.

Referring now to FIG. 13, there is shown a flow diagram illustrating the processing methodology and structural flow for a general INFORMATIONAL SERVICE function as shown is FIG. 3 at block 120. The INFORMATION SERVICE function is entered as illustrated at block 296 and initiates a FUNCTION SELECTION security check 298, which, if authorization is obtained, allows processing flow to proceed to logical block 300. At the logical block 300, a logical operation is performed to check whether the selection service is provided locally or remotely. If a remote information service was selected, processing flow proceeds to functional block 304 which provides for logging onto the remote service. The remote services include such service providers as external data base services, external computer computing services and the like. Once the logon to the remote service is completed, the user is linked through the system to communicate with the remote service, as illustrated by functional block 308. At the end of the service session, the billing information for the remote service is obtained, as illustrated at functional block 310. Subsequently, the communications link with the remote provider is disconnected, as illustrated at block 312, and a billing procedure is executed for the service provided, as indicated at functional block 314.

If at logical block 300 a local information service was selected, processing flow branches to functional block 302 where a account code is assigned to handle billing for the service provided by the system, and processing continues to logical block 306, as shown. The logical function 306 determines whether the selected local information service is an access to a local data base or to a local computing service. If a data base service is selected, processing flow proceeds to functional block 318. If computing services are selected, processing flow proceeds to functional block 316. At functional block 316, the system links the user to selected application programs, as selected by the user by means of a menu, for doing computer function such as engineering, forecasting, etc. As illustrated at block 318, data base retrieval programs are available to the user to provide information to the user from the local files, including such data files as directories, distribution information, etc. After completing the selected computing or data base function, as illustrated at functional blocks 316 and 318, the processing flow continues to functional block 314, where the required billing process is completed to bill the user for the services provided. Subsequently, the buyer general INFORMATION SERVICE function is terminated and exited as indicated by block 320.

The PROCUREMENT PROCESS function illustrated by block 124 of FIG. 3 is illustrated in detail by the flow diagram of FIG. 14. The PROCUREMENT PROCESS function is entered as shown at 322 which initiates the FUNCTION SELECTION and security validation level-4 process previously described which, if successfully completed, permits selection of any one of the procurement function 330 through 350 by means of a menu or a go-to command. Once the selected procurement process is completed, process flow returns to the FUNCTION SELECTION and security process 324 for further process selection, if desired, as shown. If the user does not desire to proceed with the PROCUREMENT PROCESS function, the menu permits selection of an end of procurement which branches process flow to the functional block 326, which terminates and exits the PROCUREMENT PROCESS function, as illustrated at block 328.

After selection of the request for quotation function (RFQ), the RFQ function is initiated, as indicated at functional block 334, which permits a buyer to enter and submit RFQ's while the system 50 validates the data of the items entered and provides for calculating such values as weight, volume, etc. The user may also modify an RFQ that was entered previously, including those directed to different distributors, and he may also tentatively recalculate the prices and terms of a previously reviewed bid. As soon as an RFQ is entered, the system attempts to prepare a bid based on data base information and, if authorized by the distributor, prepares an automatic bid and presents it to the user on-line. The user may review the bid or store it for later reference. If a bid is not immediately available, the system will confirm receipt of the RFQ, and provide a bid as soon as available by generating an automatic memo in the user's electronic mailbox to notify the user that a new bid is available. The bid may be accessed by the buyer either as a mail item or by means of a function selection. If the system does not have prior authorization to release a bid, it will route it to the distributor for review before it is released to the buyer.

A purchasing function may be entered, which includes the functional block 336 for providing purchase order entry, the block 338 for providing various purchase order changes, the block 340 for providing a master purchase agreement capability, and the block 342 for handling mortgage of orders and invoices (as described in greater detail hereinafter with reference to FIG. 18). In this purchasing function, orders may be entered by the buyer in a number of ways involving interactive entry from a buyer's terminal, converting an outstanding bid to an order, converting an outstanding RFQ to an order, or writing orders against an umbrella agreement. In addition, an order file can be transmitted from a buyer's PC and be processed as if it was entered via a regular terminal, so that order confirmations as well as errors in the order are interacted between the PC operator and the system. In addition, if the distributor has provided authorization and an inventory data base on-line, the system can automatically confirm available orders immediately, propose substitutes for an unavailable item, indicate when it will become available, reject orders, or defer confirmation.

When a distributor desires to make use of an umbrella agreement, as shown at block 340, to provide a master purchasing arrangement with a buyer, such an agreement can provide a fixed price and define such matters as delivery time for a predetermined list of items. When ordering against an umbrella agreement, the buyer enters an agreement number and thus defines the terms of the order and the shipping address. The system calculates and presents the balance of each item within the master agreement and permits a buyer to inquire about the terms and balances of the agreement and to request any modifications in the terms or items listed in the agreement. In addition to modifications to the umbrella agreement which are tentative until authorized by the seller, modification may be made to outstanding purchase order at any time, as indicated at functional block 338, by deleting, changing, or amending lines in the order or by entering a new order that replaces the previous one. Upon being modified, the order must again enter a validation process with the distributor being advised, and a modification may be rejected or deferred if it is not valid. As shown by functional blocks 332 and 330, orders and invoices may be mortgaged, as is described in greater detail with reference to FIG. 18.

Within the PROCUREMENT PROCESS function, a user may make inquiries regarding the status of orders, backorder, deliveries, payments, etc., as indicated by functional block 346, and may make catalog and price list inquiries of the distributors'data base, as illustrated by functional block 348. The user may also select a shipping and receiving function 350, which allows the buyer to review delivery advisories, or print receiving documents. The buyer, in the PROCUREMENT PROCESS function, may also select a PAYMENT function, illustrated by functional block 334, which permits the buyer to instruct its bank to pay a bill or group of bills to a distributor or other payees, based on agreements between the buyer, the payee and the buyer's bank (more fully described hereinafter with reference to FIG. 15). The buyer in the PROCUREMENT PROCESS function, furthermore, may select a MORTGAGE ORDER/INVOICE function 330, 332 to permit the user to mortgage orders and invoices through the system (more fully described hereinafter with reference to FIG. 18).

Referring now to FIG. 15, there is shown a flow diagram illustrating the processing methodology and structural flow for a specific embodiment of the PAYMENT function, as shown in FIG. 14 at block 344. The PAYMENT function is entered at 352, as shown, initiating a logical operation 354 to determine whether the payer is authorized within the system to issue instructions to make a payment. If the system does not find an authorization is provided, processing flow proceeds to terminate and exit the PAYMENT function as illustrated at block 380. If however payment is authorized, a logica operation 356 is performed to determine whether a financial institution is specified. If no financial institution is specified, then a logical operation 358 is performed to determine if there is only one permissible institution authorized for the payor within the system 50, as indicated at block 358, and if more than one is possible, the PAYMENT function is exited. However, if there is a single institution authorized, then the institution is assigned, as is indicated at functional block 362, and processing flow proceeds to block 360, as shown. If the result of the logical operation 356 is affirmative, then logical operation 360 is performed to determine if an invoice number was specified in the payment transaction. If the result of the logic operation 360 is negative, processing flow branches to functional block 376 where an order is issued to make a payment and where advisories may be issued.

If, however, the result of the logical operation 360 is affirmative, a logical operation 364 is performed to determine if the invoice has been mortgaged to a different payee. If the result is affirmative, the system reports an error, as illustrated at functional block 366, and exits the PAYMENT function, as shown. However, if the result at logical block 364 is negative, a logical operation 368 is performed to determine whether the system manages the payee's statement information. If the result is affirmative, an update of the payee's statement is made, as illustrated by functional block 370, and if negative, a logical operation 372 is initiated. The logical operation 372 determines whether the system manages the payer's balance statement and, if affirmative, updates the payer's statement, as illustrated by functional block 374 thereafter returning processing flow to block 376. If the result of the logical operation 372 is negative, processing flow proceeds directly to issue the payment order, as illustrated at block 376, and the PAYMENT function is terminated and exited, as indicated by block 380.

Figure 18:
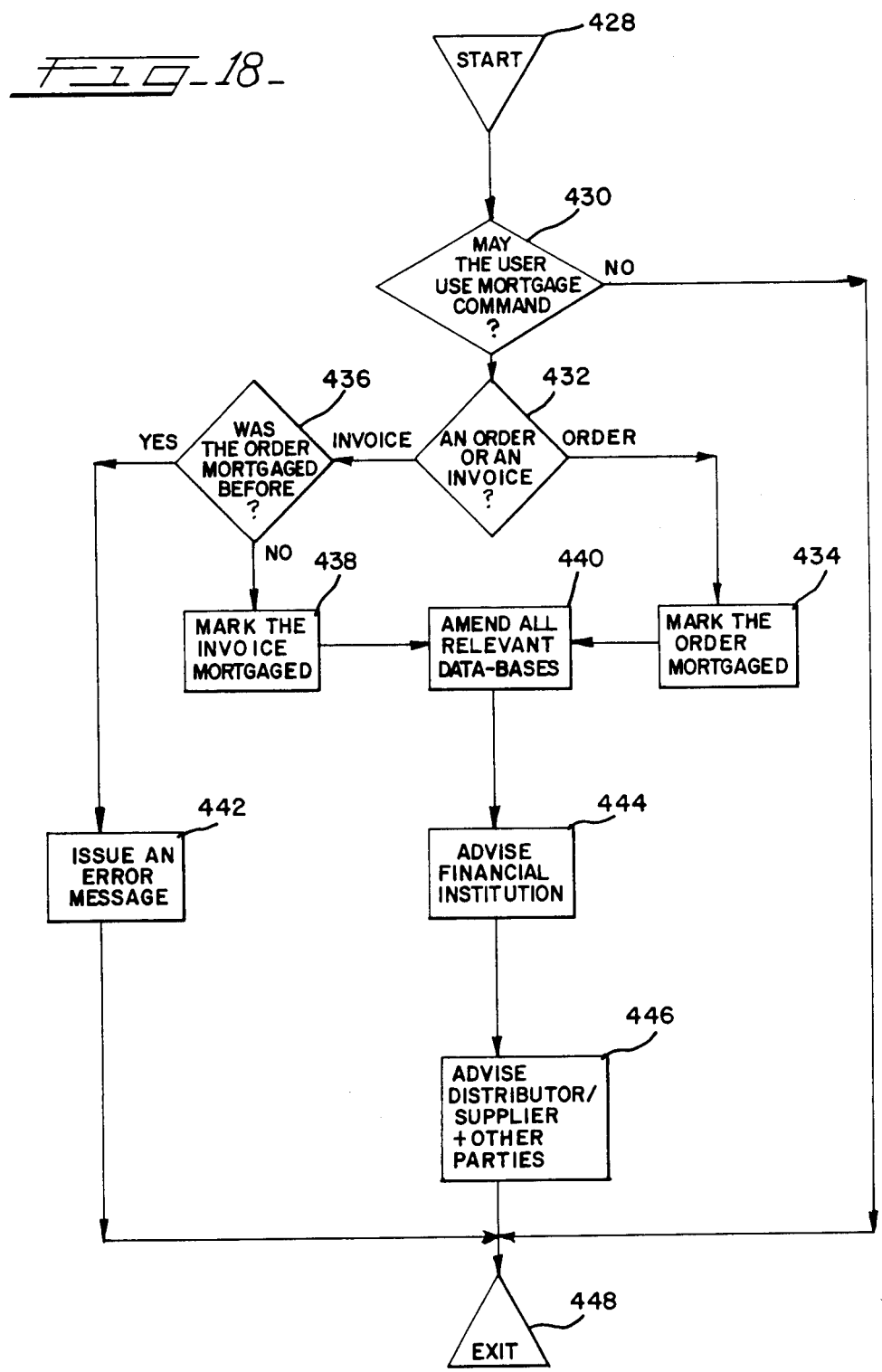
FIG. 18 is a flow diagram illustrating the processing methodology and structural flow for the MORTGAGE ORDER/INVOICE function as shown in FIG. 16 for a specific embodiment of the interactive market management system according to the invention.

Referring now to FIG. 18, there is shown a MORTGAGE ORDER/INVOICE function flow diagram illustrating the processing methodology and structural flow for a specific embodiment of a MORTGAGE ORDER/INVOICE function, as shown in FIG. 14 at blocks 330 and 332. The MORTGAGE ORDER/INVOICE function, for mortgaging orders and invoices, is entered at block 428 initiating a logical operation 430 to determine whether the user is authorized to mortgage invoices or orders through the system 50. If the result of the logical operation 430 is negative, processing flow branches to block 448 terminating and exiting the MORTGAGE ORDER/INVOICE function. If the result of the logical operation 430 is affirmative, a logical function 432 is performed to determine whether an order or an invoice mortgage process is to be performed. If an order mortgage is to be performed, the order is marked as "mortgaged", as illustrated by the functional block 434. Thereafter, processing flow continues to block 440, where all relevant data bases are updated with regard to the mortgaging of the order. If the mortgage process is to mortgage an invoice, the program flow proceeds to logical block 436 where a logical operation is performed to determine whether the order was previously mortgaged. If the result is negative, processing flow proceeds to block 438 where the invoice is marked mortgaged, and then to block 440 to update all related data bases to indicate the new status of the invoice. If the result of the logical operation 436 is affirmative, then processing flow proceeds to functional block 442 where an error message is issued, and then to block 448 terminating and exiting the MORTGAGE ORDER/INVOICE function. After the relevant data bases have been updated at functional block 440, the financial institution involved in the mortgage operation is advised via the system 50, as illustrated by the functional block 444. The distributor, supplier or other parties involved in the mortgage process are advised, as illustrated by the functional block 446. The MORTGAGE ORDER/INVOICE function is then terminated and exited as illustrated by block 448.

A FINANCIAL SERVICE function as shown in FIG. 3 at functional block 128 is illustrated in flow diagram form in FIG. 16 which illustrates the processing methodology and structural flow for a specific embodiment of the FINANCIAL SERVICE function. The FINANCIAL SERVICE function is initiated by entry at block 382, as shown, which initiates the FUNCTION SELECTION and security validation level-4 function previously described, as shown at block 384. As a result of a menu selection, any one of the financial services 390 through 402 may be accessed. After completion of the selected service, processing flow returns to the functional block 384 to permit the user to select another desired service, as shown. If at any point the user desires to terminate the FINANCIAL SERVICE function, the user may select the "End Financial Services" process, as illustrated at functional block 386, which terminates and exits the FINANCIAL SERVICE function at functional block 388.

Upon selection of the PAYMENTS function 390, the user may provide for direct payment to sellers, (as previously described with reference to FIG. 15), and subsequent to selection of the mortgage of orders or mortgage of invoices service 394 and 396, the user may initiate a procedure to obtain such mortgages. Thus a buyer may instruct his bank to pay a bill or group of bills to a distributor, or to another financial institution on behalf of the distributor or to another payee, based upon agreements between the buyer, the distributor and the buyer's bank. In addition, with mortgaging of orders and invoices, a buyer may enter a "mortgaged" mark on an order when placing an order, representing a commitment of the buyer to pay the invoice for the order to a particular trust account on behalf of the distributor. This commitment allows the distributor to use the buyer's credit rating in obtaining working capital.

The user may also select a statements and reports function 398 which permits the system 50 to produce, at the buyer's request and subject to the approval of the information provider, a wide variety of reports and statements about such matters as mortgaged invoices and orders, invoices, statements, outstanding loads, usage of various credit lines, etc. Similarly, by selecting an inquiry function 400, the user may request a variety of information from the system 50 data bases. By selection of on-line service 402, the user may create a pass-thru communications link to a bank to permit on-line corporate banking. In addition, a user may select a BORROWING function 392, which allows distributors, financial institutions and suppliers to extend credit to buyers. The commitment to pay through the system allows the lending company to monitor and control the credit utilization and risks.

Figure 17:
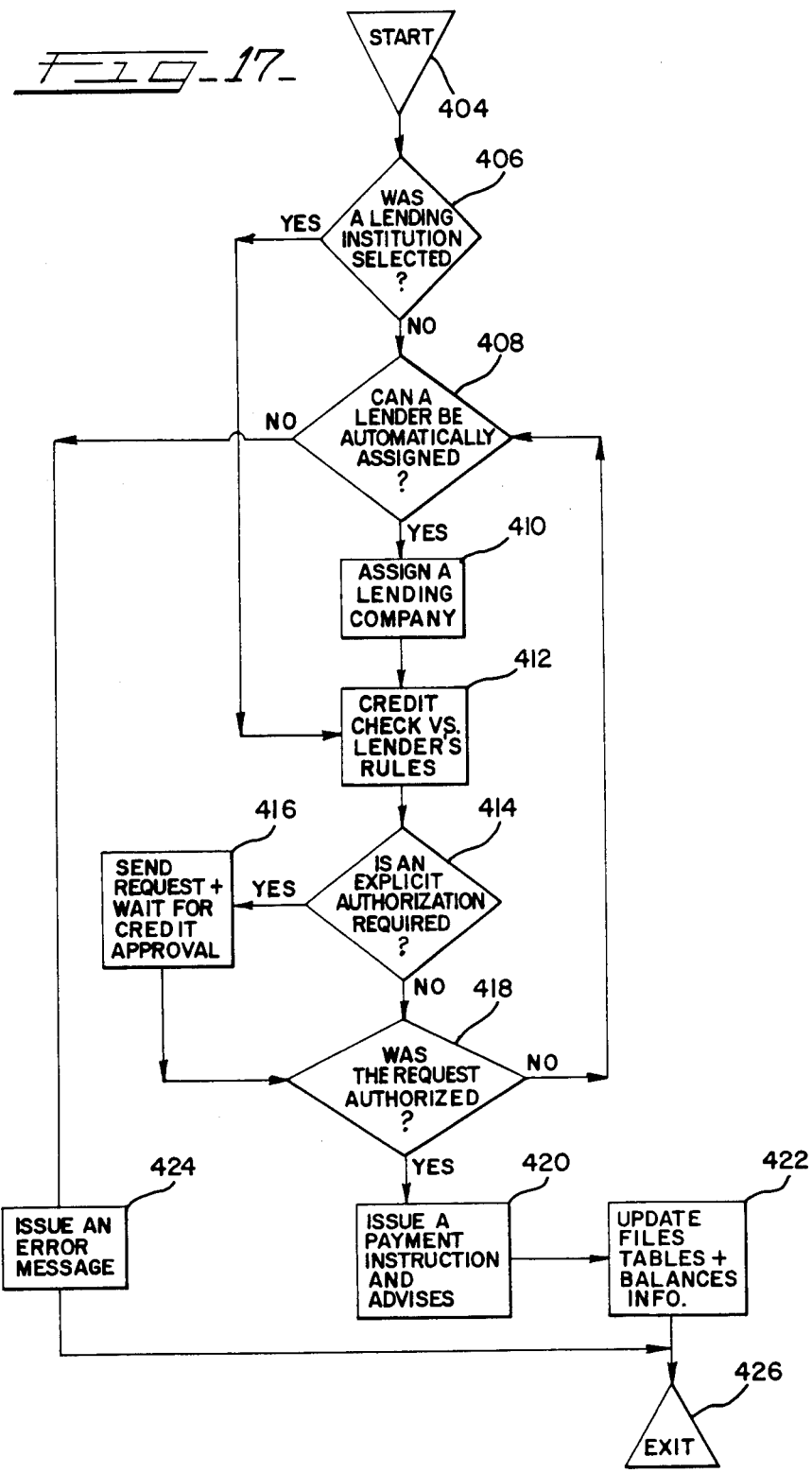
FIG. 17 is a flow diagram illustrating the processing methodology and structural flow for the BORROWING function as shown in FIG. 16 for a specific embodiment of the interactive market management system according to the invention.

The BORROWING function, as shown in FIG. 16 as block 392, is shown in flow diagram form in FIG. 17 which illustrates the processing methodology and structural flow for a specific embodiment of the BORROWING function. This BORROWING function is initiated by entry at block 404, as shown, which initiates a logical operation 406 to determine whether a lending institution was selected. If the result of the logical operation 406 is negative, processing flow branches to a logical operation 408 to determine whether the lender may be automatically assigned by the system. If the result of the logical operation 406 is affirmative, processing flow proceeds to functional block 412 to check credit against the lender's credit rules, as shown. If the result of the logical operation 408 is affirmative, the processing flow proceeds to functional block 410 to assign a lending company, and then to functional block 412 to check the user's credit against the lender's rules. If the result of the logical operation 408 is negative, an error message is issued, as indicated at functional block 424, and the BORROWING function is terminated and exited as indicated at 426.

Referring back to functional block 412, once the credit check has been made, a logical operation 414 is performed to determine whether an explicit authorization for credit is required. If the result is affirmative, a request is sent and the system waits for credit approval or rejection, as indicated at functional block 446, after which the processing flow proceeds to a logical block 418, as shown. If the result of the logical operation 414 is negative, processing flow also proceeds to block 418 to determine whether the request for credit was authorized. If the result is negative, processing flow returns to functional block 408, as shown. If the result of the logical operation 418 is affirmative, processing flow proceeds to functional block 420 which issues a payment instruction and issues advisories to the involved parties. Processing flow then continues to functional block 422, which updates the files, tables, and balance information for the parties involved, and then proceeds to terminate and exit the BORROWING function, as indicated at block 426.

Figure 19:
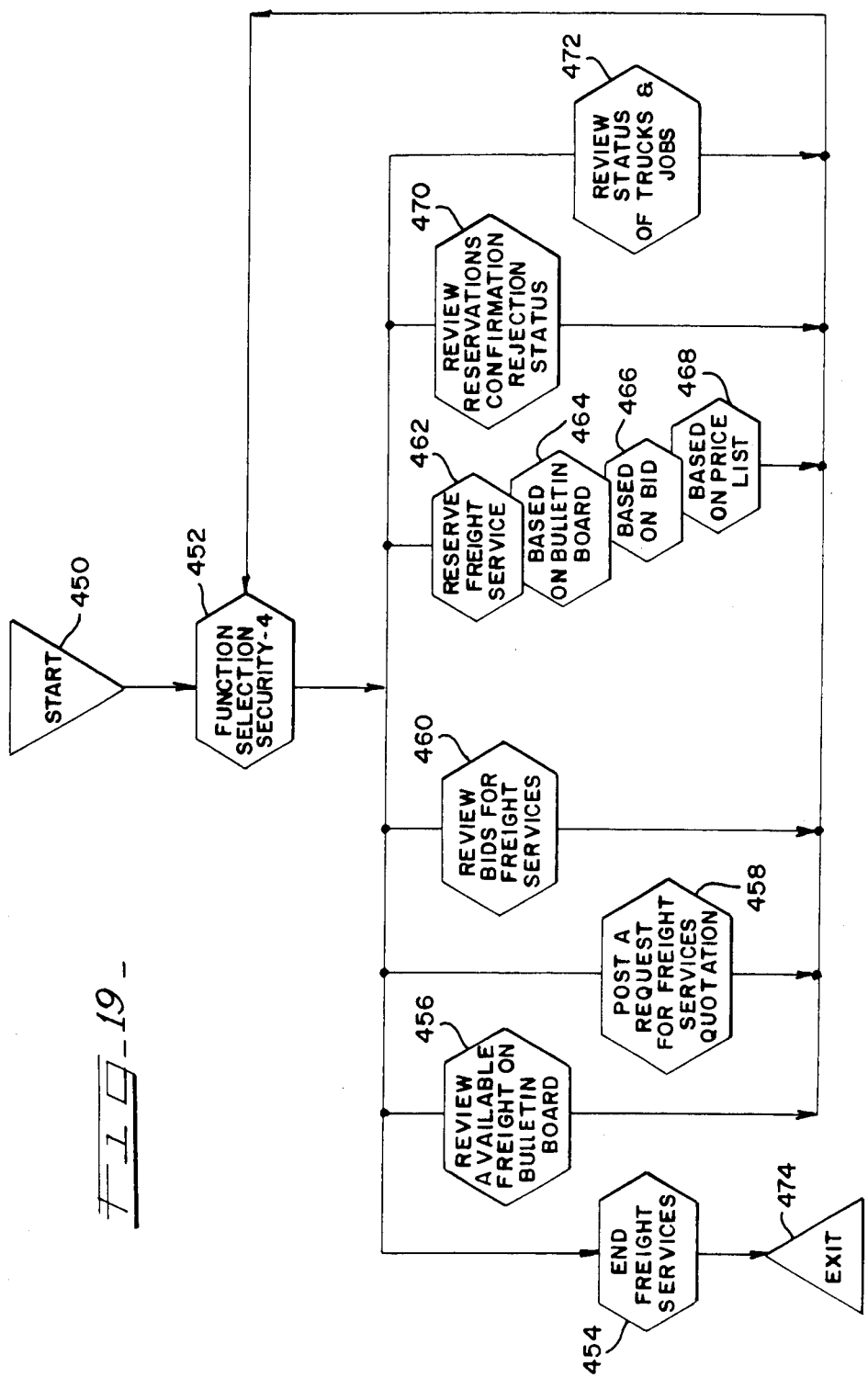
FIG. 19 is a flow diagram illustrating the processing methodology and structural flow for the FREIGHT SERVICE function as shown in FIG. 3 for a specific embodiment of the interactive market management system according to the invention.

Referring now to FIG. 19, there is shown a flow diagram illustrating the processing methodology and structural flow for a specific embodiment of a FREIGHT SERVICE function as shown in FIG. 3 a block 132. The FREIGHT SERVICE function starts at block 450 which immediately initiates the FUNCTION SELECTION and security validation level-4, as previously described and as shown at block 452. The user, via a menu, selects a desired one of the freight services 456 through 472, as shown. Upon completion of the FUNCTION SELECTION process, processing flow returns to functional block 452 to permit selection of a new function, if desired. Otherwise, the user may elect to end the FREIGHT SERVICE function, as indicated at functional block 454, thereby terminating and exiting the FREIGHT SERVICE function, as illustrated at function block 474. In situations where a buyer does not obtain delivery of an order directly to the buyer's site (e.g., taking delivery at the distributor's agent or manufacturer's warehouse), the buyer may desire to take advantage of freight services available through the system 50. Thus, the buyer may select a review function 456 to review available freight space on a bulletin board or, the buyer may post a request for a freight service quotation, as indicated by functional block 458. In addition, the buyer may desire to review a variety of bids for freight services, as provided at functional block 460, or may desire to review reservations and/or confirmations or rejections of requested freight services, as indicated at functional block 470, or to review the status of trucks and jobs, as indicated at functional block 472. The buyer may also select the freight service reservation process 462 which may be based on bulletin board information 464, bid information 466, or price list information 468, as shown. Thus, the FREIGHT SERVICE function provides extensive services to allow the buyer to reserve and control the freight services made available to the buyer through the system 50 thereby permitting the buyer to order the freight services through the system.

Figure 20:
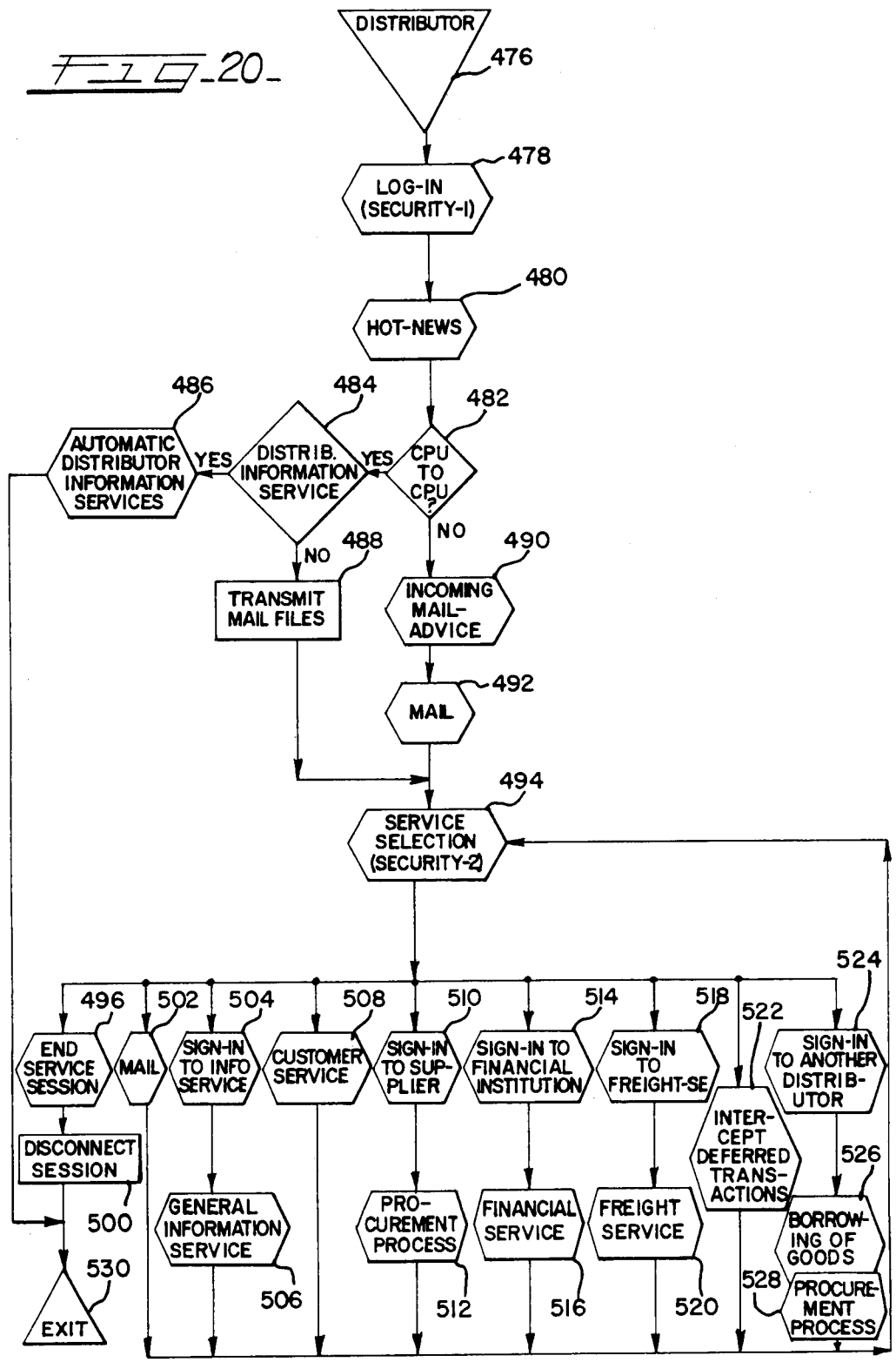
FIG. 20 is a flow diagram illustrating the processing methodology and structural flow for the DISTRIBUTOR function for a specific embodiment of the interactive market management system according to the invention.

Referring now to FIG. 20, there is shown a flow diagram illustrating the processing methodology and structural flow for a DISTRIBUTOR function for a specific embodiment of the interactive market management system according to the invention. The DISTRIBUTOR function is initiated, as shown at block 476, and proceeds through a standard access procedure of the LOG-IN function 478 and NEWS function 80, as previously described with reference to FIG. 3. Subsequently at logical block 482, a logical operation is performed to determine whether the accessing party is an operator at a remote terminal or an automated computer application running either on the same or a remote CPU. If the accessing party is an automatic application, processing flow is directed to a logical block 484 to determine whether a distributor information service is desired and, if the result is affirmative, an automatic distributor information service process is initiated, as shown at functional block 486. This process is described in detail hereinafter with reference to FIG. 21. After the completion of the distributor AUTOMATIC INFORMATION SERVICE process 486, the process flow is directed to the function block 530 where the DISTRIBUTOR function is terminated and exited, as shown.

If the result of the logic operation 484 is negative, processing flow is transferred to block 488 where the mail files are transmitted, and processing flow is then transferred to the SERVICE SELECTION function 494. If the result of the logic operation 482 is negative, then the previously described INCOMING MAIL 490 and MAIL 492 functions are performed, as shown. Processing flow then proceeds to the SERVICE SELECTION and security validation level-2 function illustrated at block 494. The SERVICE SELECTION function 494 is substantially identical to the SERVICE SELECTION function 114 of FIG. 3. Once the distributor user has successfully passed through security validation level-2 and selected a service by means of the appropriate menu or go-to command, the processing flow is transferred to the selected service, as shown. The MAIL session 502, the INFORMATION SERVICE function 506, the PROCUREMENT PROCESS function 512, the FINANCIAL SERVICE function 516, the FREIGHT SERVICE function 520, and the BORROWING GOODS and PROCUREMENT PROCESS functions 526, 528 are substantially similar to those previously described with reference to FIGS. 3 through 19. In addition, these services are entered via a SIGN-IN procedure 504, 510, 514, 518 and 524, which procedure is substantially similar to the SIGN-IN procedure described previously with reference to FIG. 8. The CUSTOMER SERVICE function 508 and the intercept deferred transactions function 522 may be entered without going through the SIGN-IN and security validation level-4 process. Once the user has exited the selected service function, processing flow is transferred back to the SERVICE SELECTION function 494, as shown. At this point the user may select a new service, or may elect to end the DISTRIBUTOR function, as illustrated by functional block 496 and 500, and thereby exit the DISTRIBUTOR function, as indicated at functional block 530.

Figure 21:
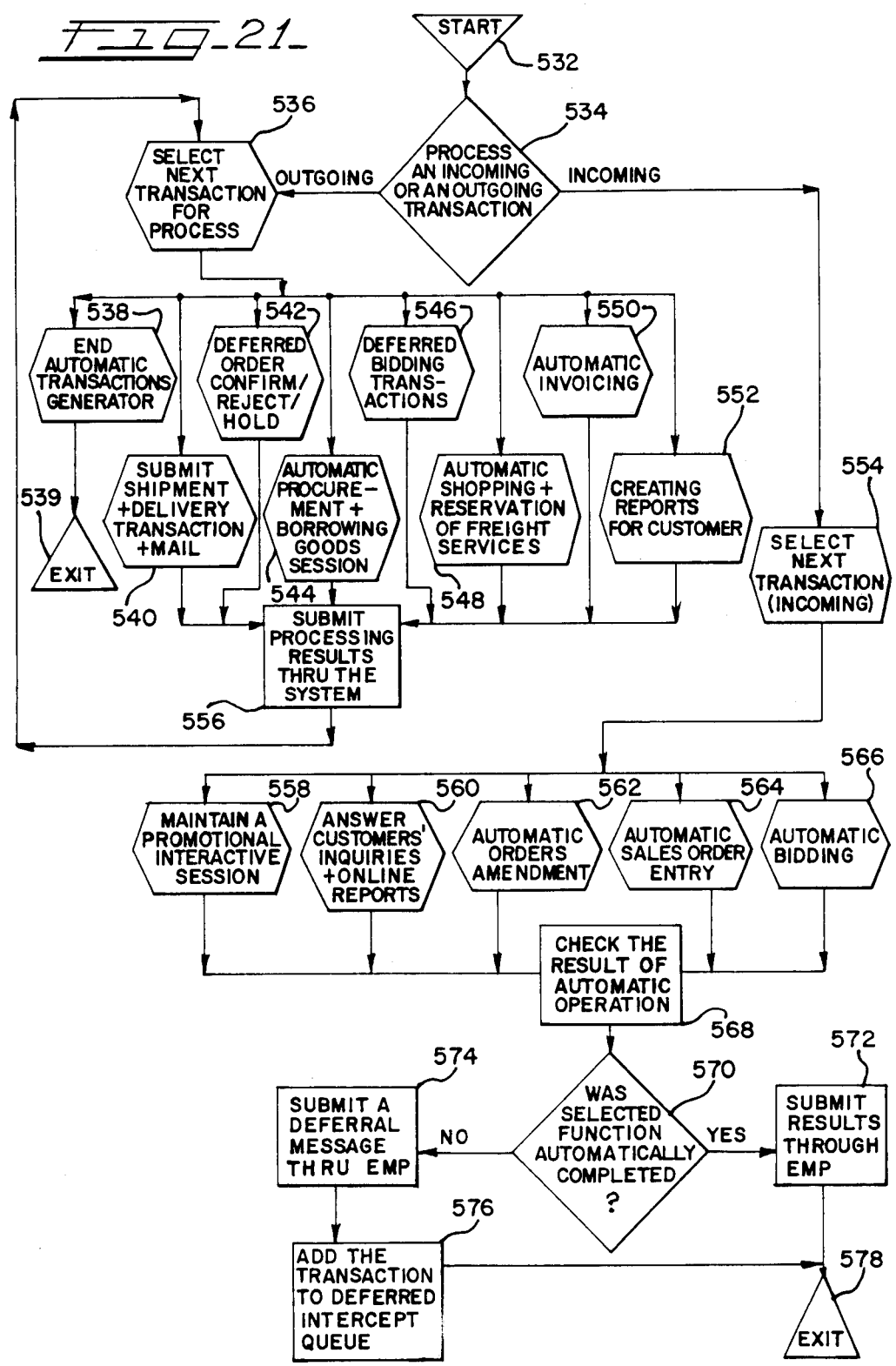
FIG. 21 is a flow diagram illustrating the processing methodology and structural flow for the AUTOMATIC INFORMATION SERVICES function as shown in FIG. 20 for a specific embodiment of the interactive market management system according to the invention.

FIG. 21 is a flow diagram which illustrates the processing methodology and structural flow for a specific embodiment of an AUTOMATIC INFORMATION SERVICE function as shown in FIG. 20 at block 486.

The distributor AUTOMATIC INFORMATION SERVICE function provides application programs for accessing the distributor data base and provides data processing functions on behalf of the distributor when dealing with other parties. Some or all of the functions can be provided by proprietary application programs run either locally in system 50 or remotely in a resident computer at the distributor's site and communicating on a CPU-to-CPU basis with system 50. Where proprietary automatic functions are used, the system 50 provides an application level interface between its internal logic and the proprietary program used by the distributor. The AUTOMATIC INFORMATION SERVICE function is entered as shown at 532 which initiates a logic operation 534 to determine whether incoming or outgoing automatic transactions are to be performed. If incoming transactions are being performed, processing flow is transferred to functional block 554 for selection of the next desired transaction by the resident computer via an automatic selection. The distributor's resident computer may respond to any of the incoming requests for services 558 through 566, as shown. Thus, a promotional interactive operation may be performed as shown at 558, or customer inquiries may be answered and on-line reports generated in response, as indicated at functional block 560. In addition, automatic order amendments may be initiated, as shown at block 562, and automatic sales order entries may be made, as indicated at block 564. Further, the distributor's resident CPU may initiate automatic bidding as indicated by functional block 566, as shown.

After each one of the transactions 558 through 566 has been completed, processing flow proceeds to a check of the result of the automatic operation as indicated in functional block 568 and then a logical operation 570 is performed to determine whether the function automatically selected was completed. If the function was completed, then processing flow is transferred to functional block 572 where the results are submitted through the system, and the AUTOMATIC INFORMATION SERVICE is terminated and exited, as indicated at block 578. If the function was not completed, then processing flow proceeds to functional block 574 where a deferral of result message is submitted through the system, and the transaction is added to the deferred intercept queue, as shown at functional block 576. Subsequently the AUTOMATIC INFORMATION SERVICE function is terminated and exited, as indicated at 578.

If the result of the logic operation 534 is the selection of outgoing transactions, processing flow is transferred to functional block 536 for automatic selection of the next transaction for processing. Any one of the processing selections 538 through 552 may be initiated from the functional block 536 and, when completed, processing flow is transferred to functional block 556 where the results are submitted through the system and processing flow returns to the functional block 536, as shown. The functional block 540 permits selection of the function of submitting shipment and delivery transaction information and mail through the system, and the functional block 542 provides for dealing with deferred orders by either confirming, rejecting, or continuing to defer such orders. Automatic procurement and borrowing of goods may be initiated, as indicated at functional block 544, and deferred bidding transactions may be processed, as indicated by functional block 546. Automatic shipping as well as reservation of freight services, may be transacted as indicated by functional block 548, and automatic invoicing can be processed as illustrated at 552. Reports can be created for customers, as indicated by functional block 552. Finally, the outgoing automatic transaction session may be terminated after all outstanding outgoing transactions are processed and sent, as shown by functional block 538, resulting in termination and exit from the AUTOMATIC INFORMATION SERVICE function, as indicated at 539.

Figure 22:
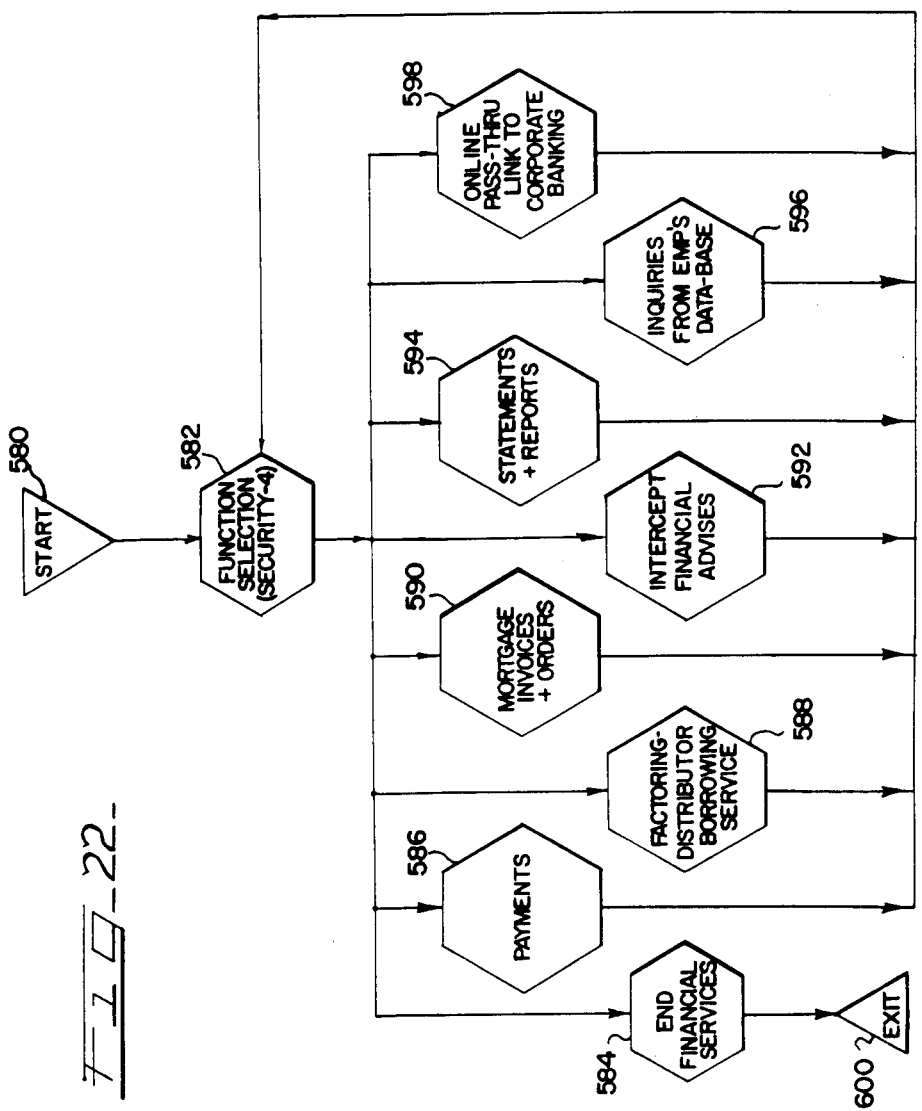
FIG. 22 is a flow diagram illustrating the processing methodology and structural flow for the distributor's FINANCIAL SERVICE functions as shown in FIG. 20 for a specific embodiment of the interaction market management system according to the invention.

Referring now to FIG. 22, there is shown a flow diagram illustrating the processing methodology and structural flow for a specific embodiment of a distributor FINANCIAL SERVICE function as shown in FIG. 20 at block 516. The distributor FINANCIAL SERVICE function is entered at 580, as shown, followed by a FUNCTION SELECTION and security validation level-4 process 482, as shown. After selecting a function and passing through the security level-4 at functional block 582, the distributor may enter any one of selected services 586 through 598, and when the service process is completed, processing flow returns to the functional block 582, as shown. The distributor may choose a PAYMENT function, illustrated by functional block 586, which is substantially similar to the PAYMENT function previously described with reference to FIG. 15. A FACTORING-BORROWING function, is also available, as illustrated by functional block 588 and described in greater detail hereinafter with reference to FIG. 23. A mortgage of invoice and mortgage of orders function 590, similar to the previously described MORTGAGE ORDER/INVOICE function, may be implemented as well as an intercept of advisories of financial transactions function, as indicated at functional block 592, to permit review of financial transactions entered by other parties, such as payments and mortgaging by buyers. Statements and reports may be created and transferred through the system, as illustrated by functional block diagram 594, and inquiries, to obtain information from the system data bases, may be initiated as shown at functional block 596. An on-line communications link to an external bank may be made through the system to permit on-line corporate banking, as shown at functional block 598. When the distributor desires to end a financial services transaction, the end of financial services function 584 may be selected to terminate and exit the FINANCIAL SERVICE function as shown at block 600.

Figure 23:
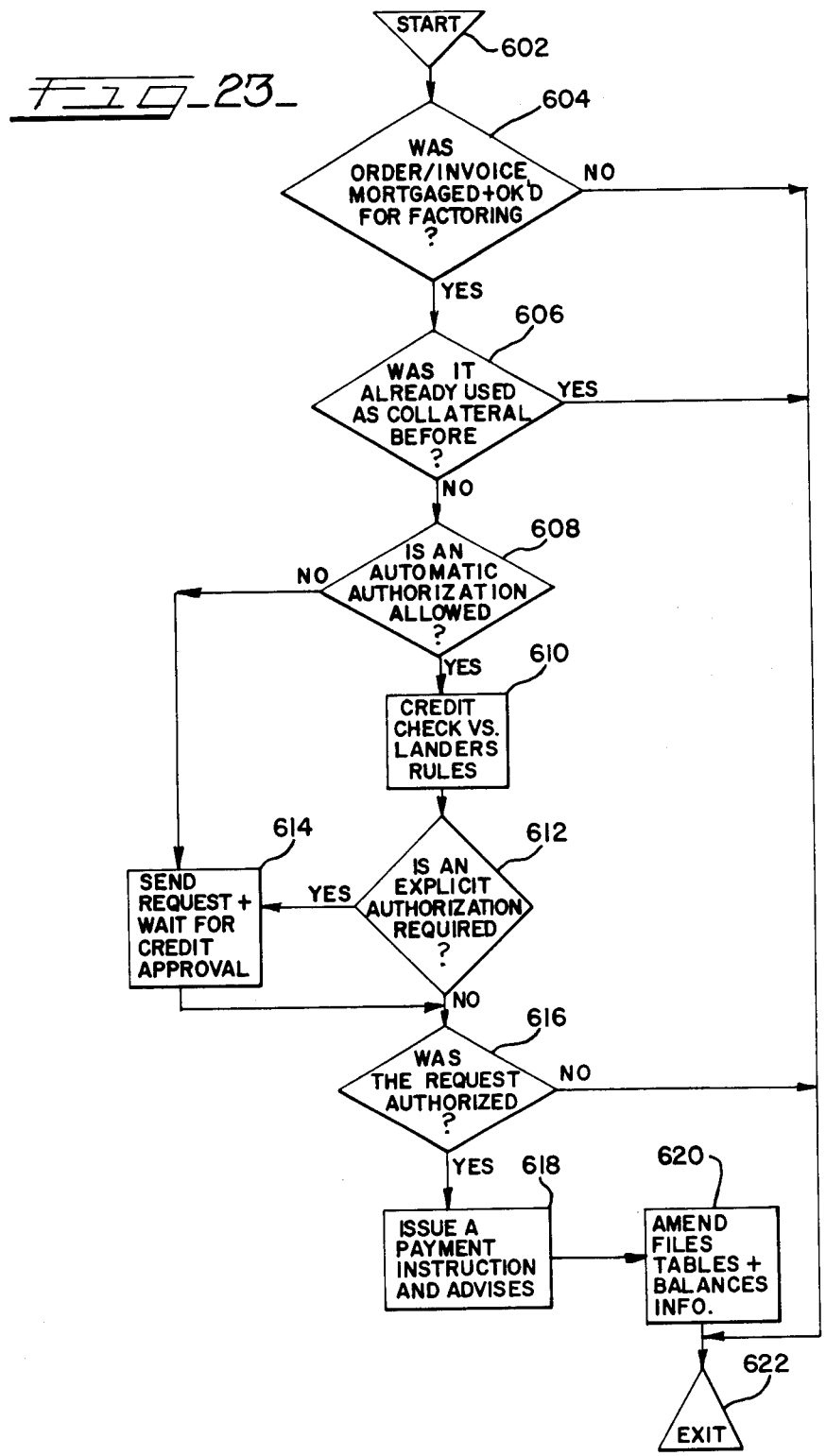
FIG. 23 is a flow diagram illustrating the processing methodology and structural flow for the distributor's FACTORING-BORROWING function as shown in FIG. 22 for a specific embodiment of the interactive market management system according to the invention.

A distributor's FACTORING-BORROWING function as shown in FIG. 22 at block 588 is shown in flow diagram form in FIG. 23 illustrating the processing methodology and structural flow for a specific embodiment of the interactive market management systems according to the invention. The distributor's FACTORING-BORROWING function is entered, as shown at 602, based on a manual per invoice basis, or automatically once a day, for all outstanding orders and invoices. A logical operation 604 is immediately initiated after entry to determine whether the order and/or invoice was mortgaged and ok'd for factoring. If the result is negative, processing flow transfers to block 622 where the FACTORING-BORROWING function is terminated and exited as shown. If, however, the result of the logical operation 604 is affirmative, processing flow proceeds to logical operation 606 to determine whether the order or invoice was used as collateral previously. If the result is affirmative, the FACTORING-BORROWING function is terminated and exited as shown at block 622 and, if negative, a logical operation 608 is performed to determine whether an automatic authorization is allowed. If the result is affirmative, a credit check against the lender's rules is performed as shown at functional block 610, and a check is made to determine if a specific authorization is required as shown at logical block 612.

If no explicit authorization is required at logical block 612, then processing flow proceeds to a logical operation 616 to determine whether the request was authorized. If the result of the logic operation 608 is negative, processing flow proceeds to functional block 614 to send a request and wait for credit approval. This functional block is also activated if the result of the logic operation 612 is affirmative. After credit approval is obtained at functional block 614, processing flow proceeds to block 616 to determine whether the request has been authorized. If the result is negative, processing flow branches to block 622 terminating and exiting the FACTORING-BORROWING function and, if the request has been authorized, the processing flow proceeds to block 618 where payment instructions and advisories are issued to the involved parties. Processing flow then is transferred to functional block 620 where the files, tables and balance information of the involved parties are updated after which the distributor's FACTORING-BORROWING function is terminated and exited, as shown at functional block 622.

Figure 24:
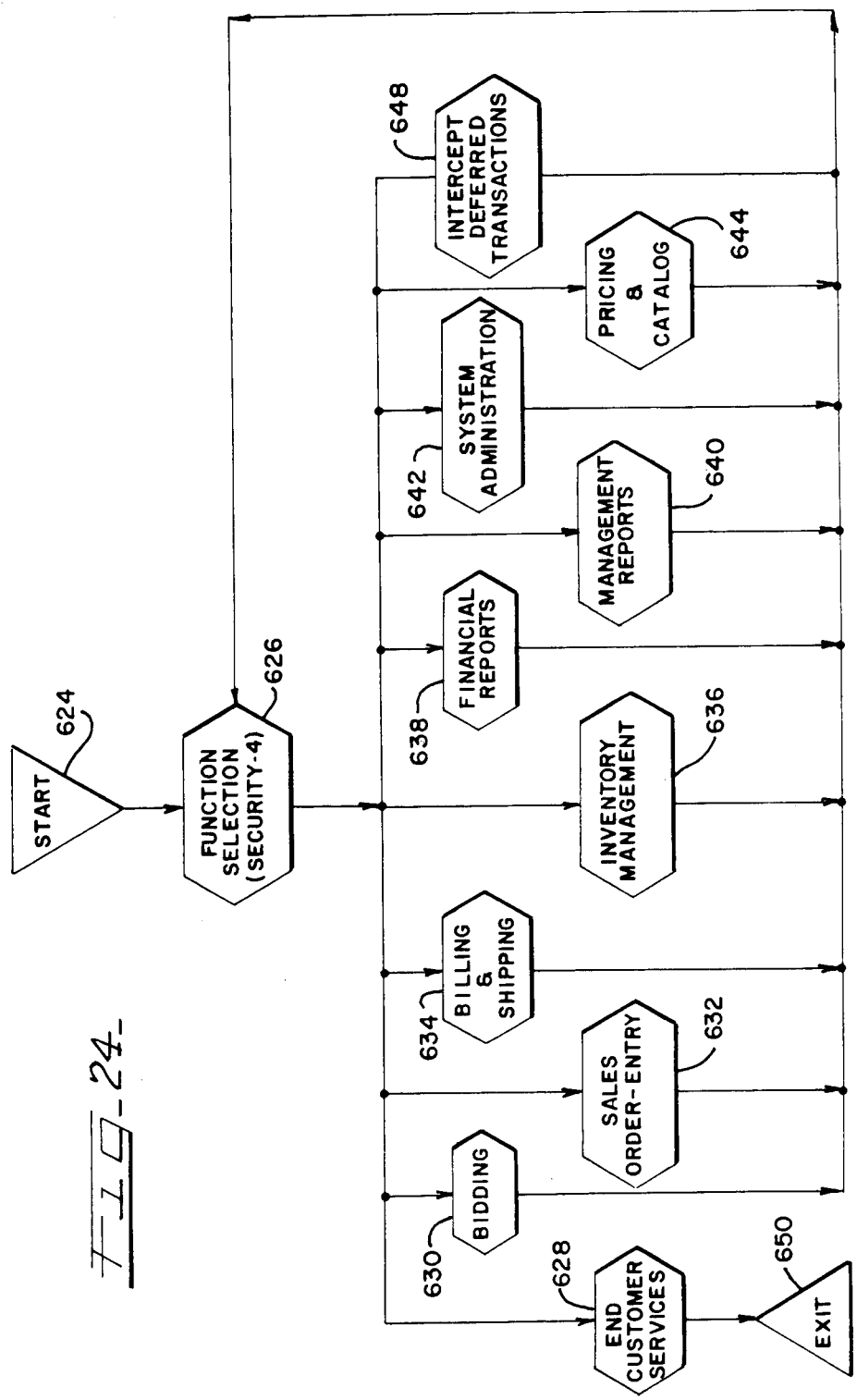
FIG. 24 is a flow diagram illustrating the processing methodology and structural flow for the CUSTOMER SERVICE function as shown in FIG. 20 for a specific embodiment of the interactive market management system according to the invention.

Referring now to FIG. 24, there is shown a flow diagram illustrating the processing methodology and structural flow for a specific embodiment of a CUSTOMER SERVICE function as shown in FIG. 20 at block 508. The CUSTOMER SERVICE function begins with entry at 624, as shown, which initiates the FUNCTION SELECTION and security validation level-4 function 626 which is substantially similar to the function selection process as described previously. Once the function selection has been made and security validation completed, the selected function 630 through 648 is initiated, as shown. After the selected service has been completed, processing flow returns to the functional block 626 to permit selection of another service if desired. One customer service available is a bidding process, indicated at functional block 630, which provides both for pricing of requests for quotation and for confirmation of the availability of products when requested. Sales order entry may also be made, as indicated at functional block 632, by means of a variety of methods including interactive terminal sessions, CPU to CPU communication sessions, or by means of orders entered by an agent. The system also provides for confirmation of orders, including necessary information which may be delivered to customer's agents, freight carriers, financial institutions and other involved parties. Billing and shipping functions may be selected as shown at functional block 634, and inventory management processing is available to be selected, as shown at functional block 636. Financial reports and management reports may be generated from the information available through the system as shown by functional blocks 638 and 640. System administration functions are also performed, as shown at functional block 642, and price and catalog files maintenance may be performed, as illustrated at functional block 644. Deferred transactions, such as order confirmations, may be intercepted by processing function 648. The user may exit the CUSTOMER SERVICE function by selection of the end of customer service process, shown at functional block 628, which results in termination and exit of the CUSTOMER SERVICE function as indicated at block 640.

Figure 25:
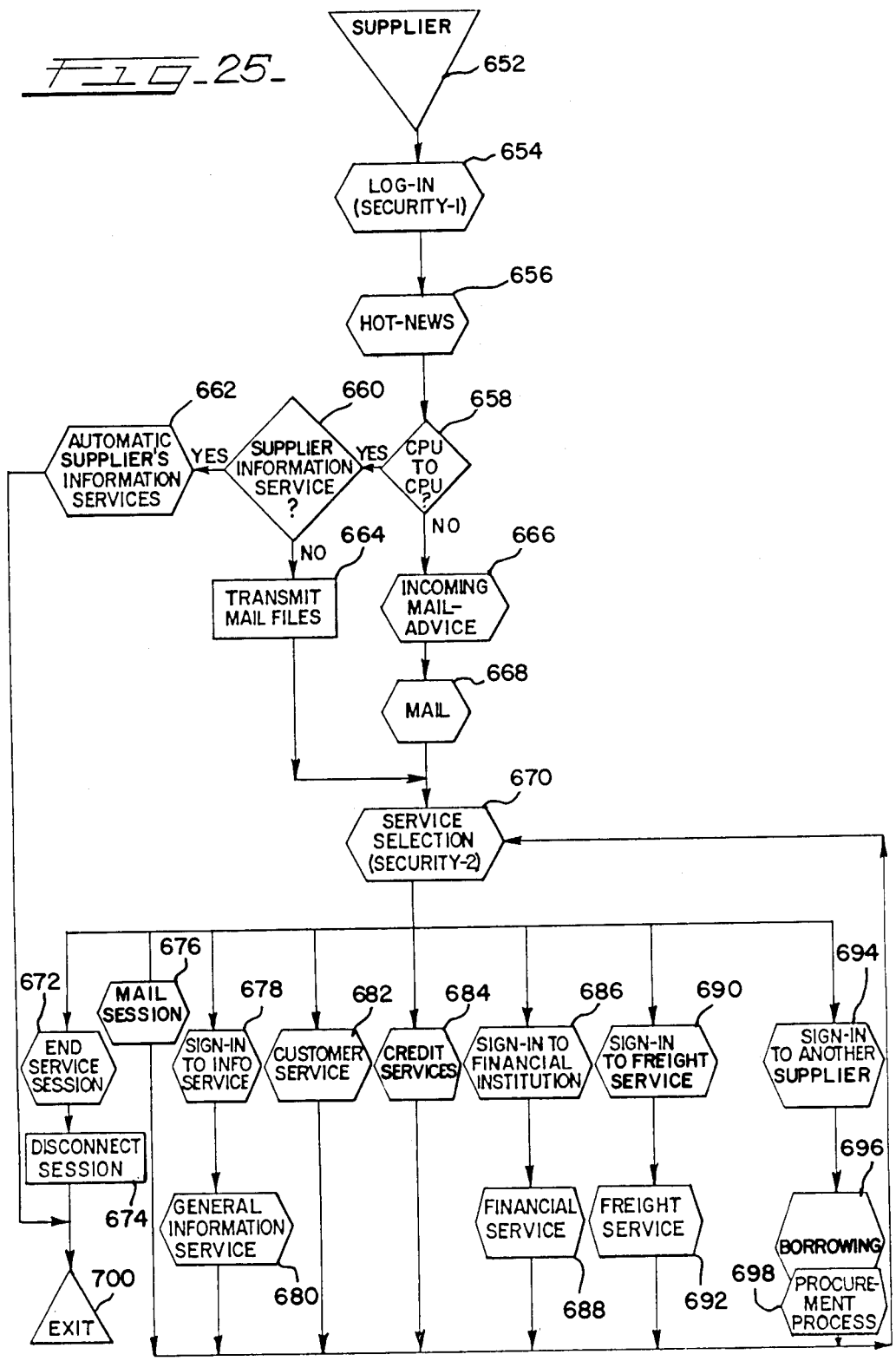
FIG. 25 is a flow diagram illustrating the processing methodology and structural flow for a SUPPLIER function for a specific embodiment of the interactive market management system according to the invention.

FIG. 25 is a flow diagram illustrating the processing methodology and structural flow for a SUPPLIER function for a specific embodiment of the interactive market management system according to the invention. The SUPPLIER function is entered, as shown at 652, followed by the standard access process substantially as described with reference to FIG. 20, including functional blocks 654 to 670. The SERVICE SELECTION and security validation level-2 function 670 is performed to permit the user to select a desired service and provide security validation. Once the service selection has been made and the security validation procedure completed, the process flow proceeds to the selected function from the functions 676 to 698, which are substantially similar to those described with reference to FIG. 20. Once the selected function is completed, processing flow returns to block 670 to permit selection of another service, or selection of an end of service as indicated at functional block 672 and 674, resulting in termination and exit from the SUPPLIER function as shown at block 700. The SUPPLIER function, as shown in FIG. 25, is substantially similar to the DISTRIBUTOR function described with reference to FIG. 20 with specific exceptions of the supplier AUTOMATIC INFORMATION SERVICE 662 which are describe in detail with reference of FIG. 26, and the supplier FINANCIAL SERVICES 688 which are described in greater detail with reference to FIG. 27.

Figure 26:
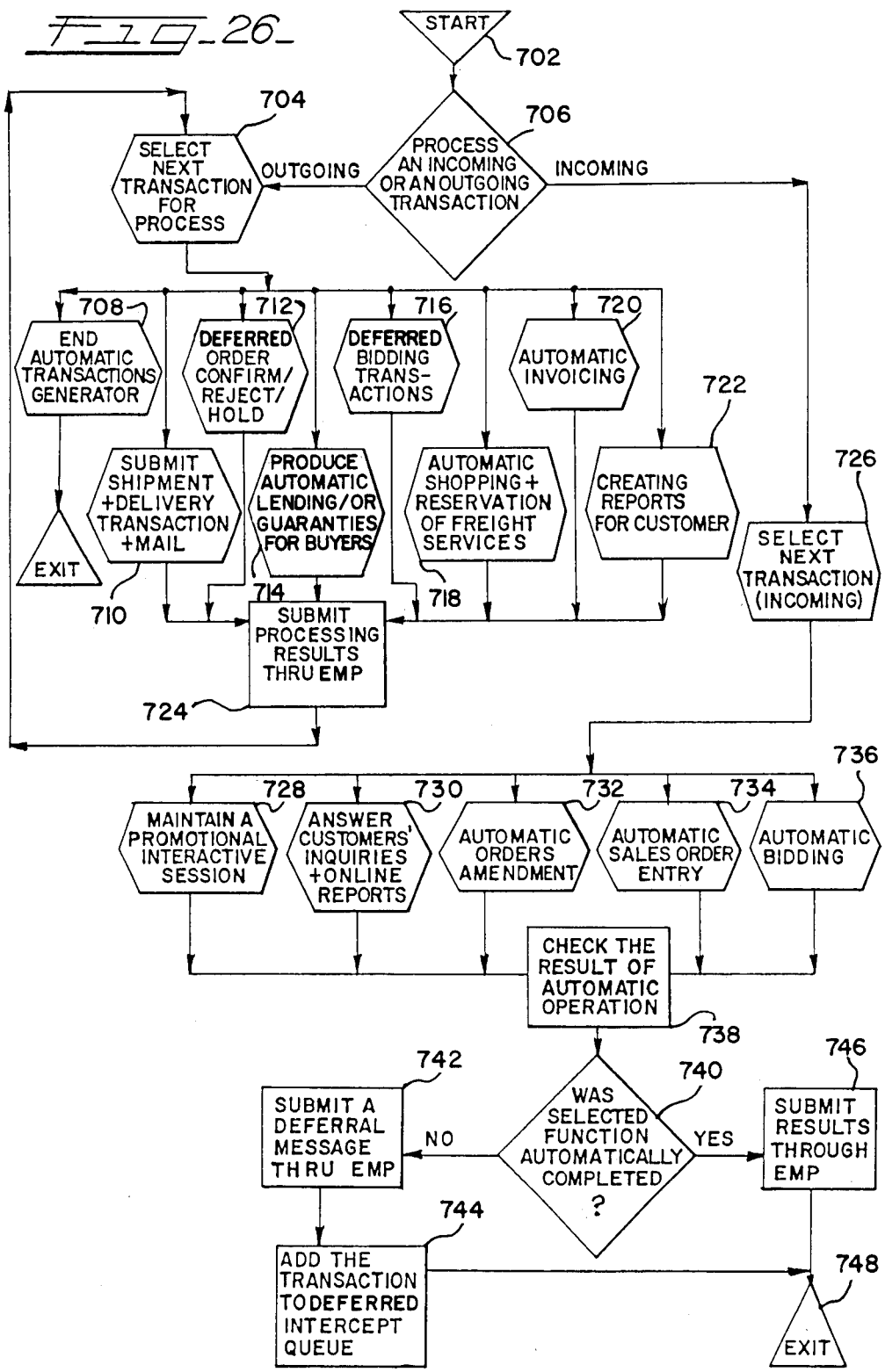
FIG. 26 is a flow diagram illustrating the processing methodology and structural flow for the supplier's AUTOMATIC INFORMATION SERVICE function as shown in FIG. 25 for a specific embodiment of the interactive market management system according to the invention.
Figure 27:
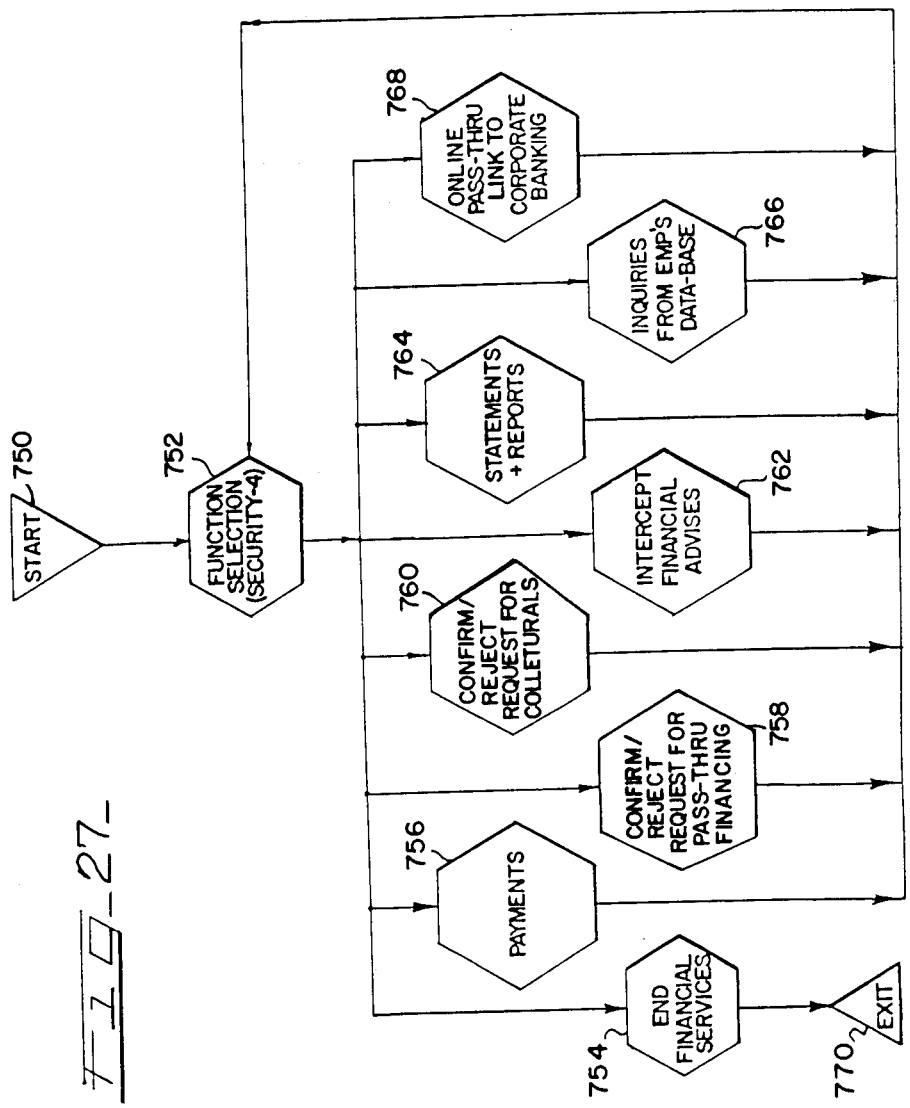
FIG. 27 is a flow diagram illustrating the processing methodology and structural flow for the supplier's FINANCIAL SERVICES function as shown in FIG. 25 for a specific embodiment of the interactive market management system according to the invention.

Referring now to FIG. 26 there is shown a flow diagram illustrating the process and methodology and structural flow for a specific embodiment of a supplier AUTOMATIC INFORMATION SERVICE function as shown in FIG. 25 at functional block 662. The flow diagram of FIG. 25 is substantially similar to that of FIG. 21, with the exception of functional block 714 in the outgoing transaction section. Functional block 714, if selected as a desired transaction, provides for the production of automatic lending or guarantees for buyers. FIG. 27 is a flow diagram illustrating the processing methodology and structural flow for a specific embodiment of a supplier FINANCIAL SERVICES function as shown in FIG. 25 at block 688. The supplier FINANCIAL SERVICE function of FIG. 27 is substantially similar to that shown and described with reference to FIG. 22, with the exception of functional blocks 758 and 760. Functional block 758 provides for confirmation or rejection of requests for pass-through of financing, while functional block 760 provides for the confirmation or rejection of requests for collateral. The functions 758,760 allow a supplier to make credit or collaterals, respectively, available to the end user or to a distributor thus providing previously unavailable services which enable the seller to gain a competitive advantage in promoting his products. The system 50 provides the various management tools to control the credit risks and the total exposure of the supplier.

Figure 28:
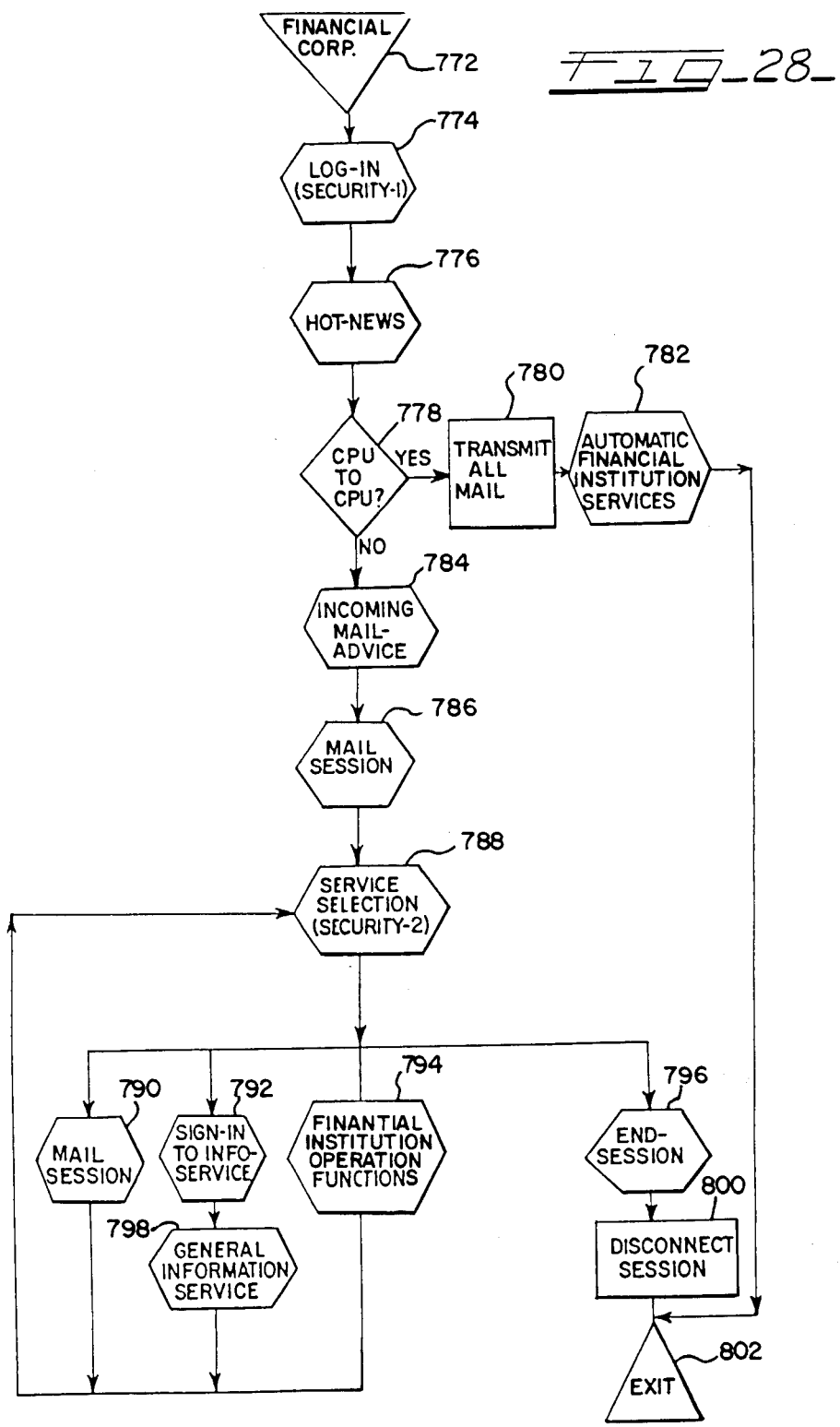
FIG. 28 is a flow diagram illustrating the processing methodology and structural flow for a FINANCIAL INSTITUTION transaction function for a specific embodiment of the interactive market management system according to the invention.

Referring now to FIG. 28, there is shown a flow diagram illustrating the processing methodology and structural flow for a FINANCIAL INSTITUTION function for a specific embodiment of the interactive market management system according to the invention. The FINANCIAL INSTITUTION function illustrated in FIG. 28 is entered, as shown at block 772, and proceeds through the access process from functional block 774 through functional block 788. This access process is substantially similar to that shown and described in FIG. 3, with the exception of functional block 782 which is described hereinafter in greater detail with reference to FIG. 29. After the SERVICE SELECTION of functional block 788 is completed, the processing flow proceeds to the selected service 790-798 as shown. The services shown in FIG. 28 are substantially similar to those described with reference to FIG. 25 with regard to operational blocks 790, 792, 798, and 796. However, functional block 794 is described in greater detail hereinafter with reference to FIG. 30.

Figure 29:
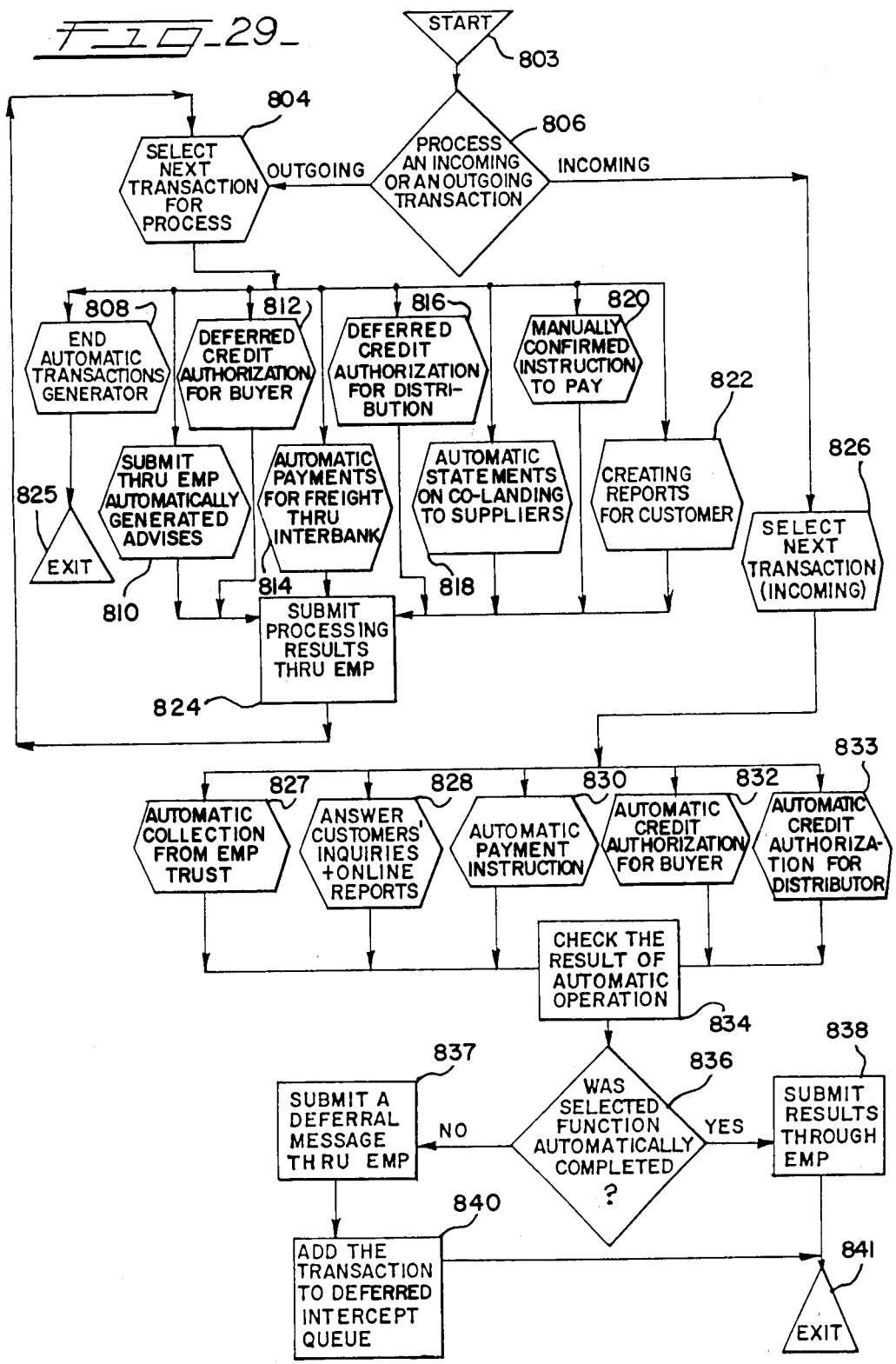
FIG. 29 is a flow diagram illustrating the processing methodology and structural flow for the AUTOMATIC FINANCIAL SERVICE function as shown in FIG. 28 for a specific embodiment of the interactive market management system according to the invention.

FIG. 29 is a flow diagram illustrating the processing methodology and structural flow for a specific embodiment of an AUTOMATIC FINANCIAL SERVICES function as shown in FIG. 28 at block 782. The AUTOMATIC FINANCIAL SERVICES function illustrated in FIG. 29 is substantially similar to that shown in FIG. 26 and previously described herein with the exception of functional blocks 810-820 and 827-833. Functional block 810 shows that an outgoing transaction may be selected to permit submission through the system of automatically generated advisories regarding credit transactions. Functional block 812 illustrates the processing of deferred credit authorizations for buyers. A functional block 814 illustrates the selection of automatic payment for freight through interbank transactions, and the functional block 816 illustrates deferred credit authorizations for distributors. Functional block 818 provides for automatic statements on co-lending to suppliers, and functional block 820 provides for submission of manually confirmed instructions to make payments requested.

Referring to the outgoing transactions selected through functional block 826, the automatic collection through the system trust may be processed through a functional block 827, and customer inquiries may be answered and on-line reports issued, as illustrated by functional block 828. Automatic payment instructions may be issued, as shown at 830, and automatic credit authorization for buyers may be issued, as shown at functional block 832. Automatic credit authorization for distributors may be issued, as shown at functional block 833. The rest of the functional blocks illustrated in FIG. 29 are substantially identical to those previously described with reference to FIG. 26.

Figure 30:
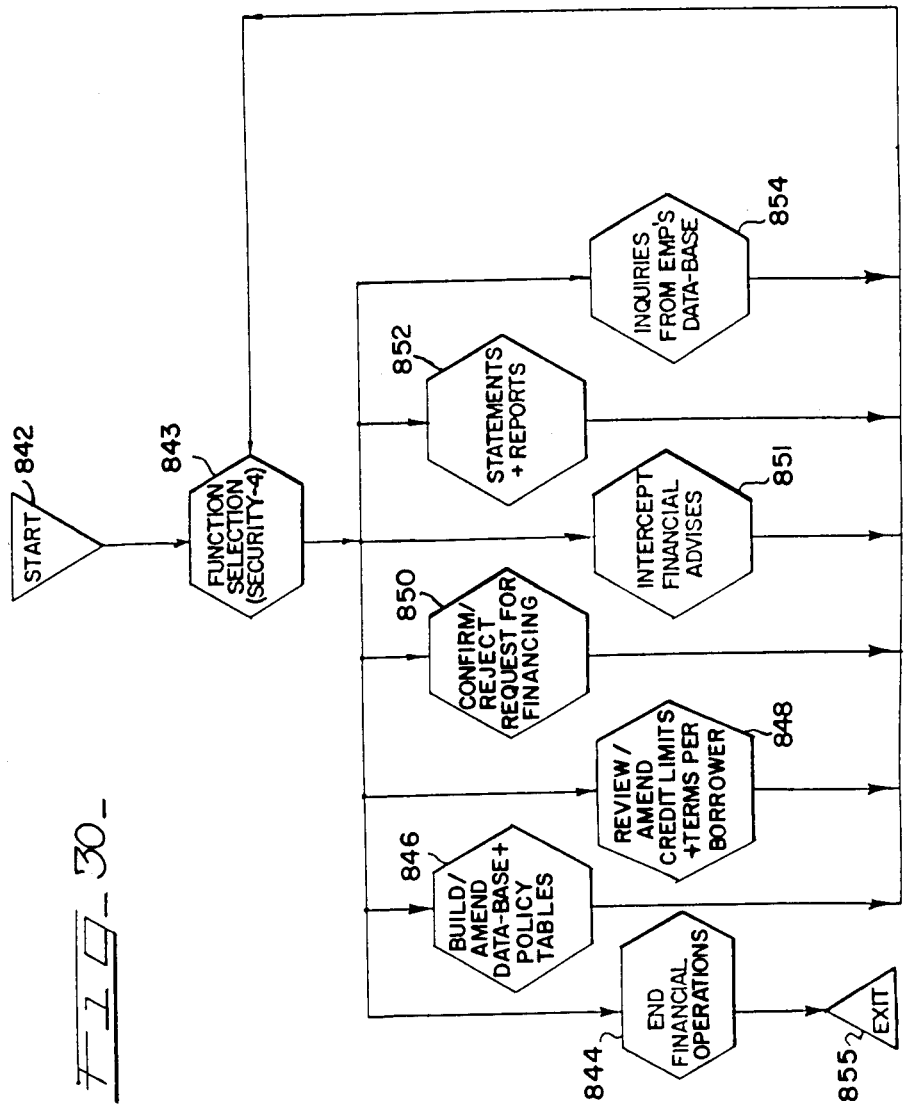
FIG. 30 is a flow diagram illustrating the processing methodology and structural flow for the FINANCIAL INSTITUTION OPERATIONAL function as shown in FIG. 28 for a specific embodiment of the interactive market management system according to the invention.

FIG. 30 is a flow diagram illustrating the processing methodology and structural flow for a specific embodiment of a FINANCIAL INSTITUTION OPERATIONAL function as shown in FIG. 28 at block 794. The FINANCIAL INSTITUTION OPERATIONAL function of FIG. 30 is entered, as shown at block 842, and is substantially similar to the FINANCIAL SERVICES function described and shown with regard to FIG. 27 with the exception of functional blocks 846-850. Functional block 846 provides for creating and amending a data base and policy table with regard to the financial institution's credit policies, and operational block 848 provides for the review and amendment of credit limits and terms with respect to individual borrowers. The functional block 850 provides for confirmation and rejection of requests for financing, as shown. The flow diagram of FIG. 30 is otherwise substantially identical to that shown and described with regard to FIG. 27.

Figure 31:
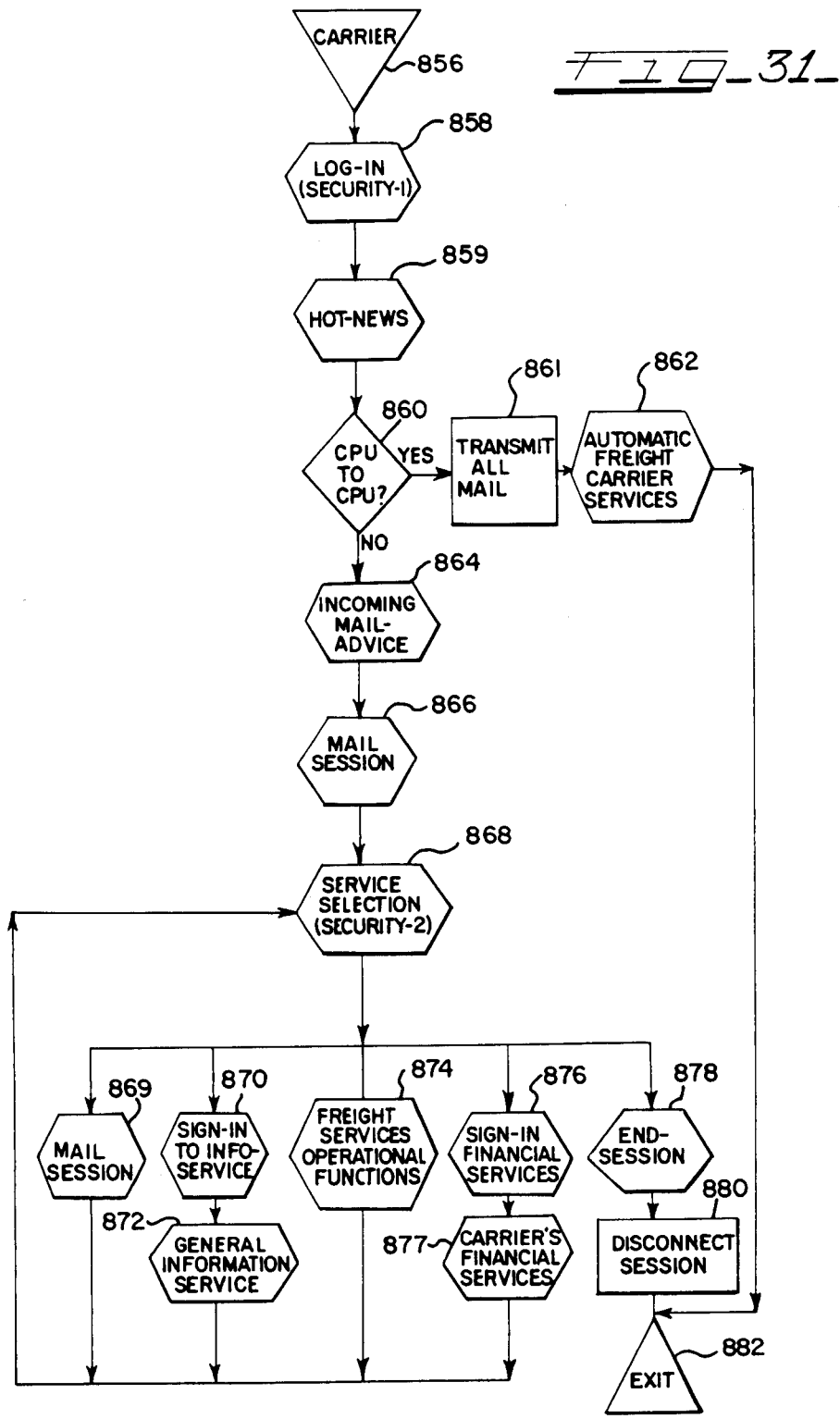
FIG. 31 is a flow diagram illustrating the processing methodology and structural flow for a FREIGHT CARRIER function for a specific embodiment of the interactive market management system according to the invention.

FIG. 31 is a flow diagram illustrating the processing methodology and structural flow for a FREIGHT CARRIER function for a specific embodiment of the interactive market management system according to the invention. The flow diagram of FIG. 31 is substantially similar to that illustrated in FIG. 28 and previously described herein, with the exception of functional blocks 862, 874, and 877. Functional block 862 is described in detail herein after with reference to FIG. 32. Functional block 874 is described in detail hereinafter with reference to FIG. 33, and functional block 877 is substantially similar to the FINANCIAL SERVICES function described previously with reference to FIG. 25 at block 688.

Figure 32:
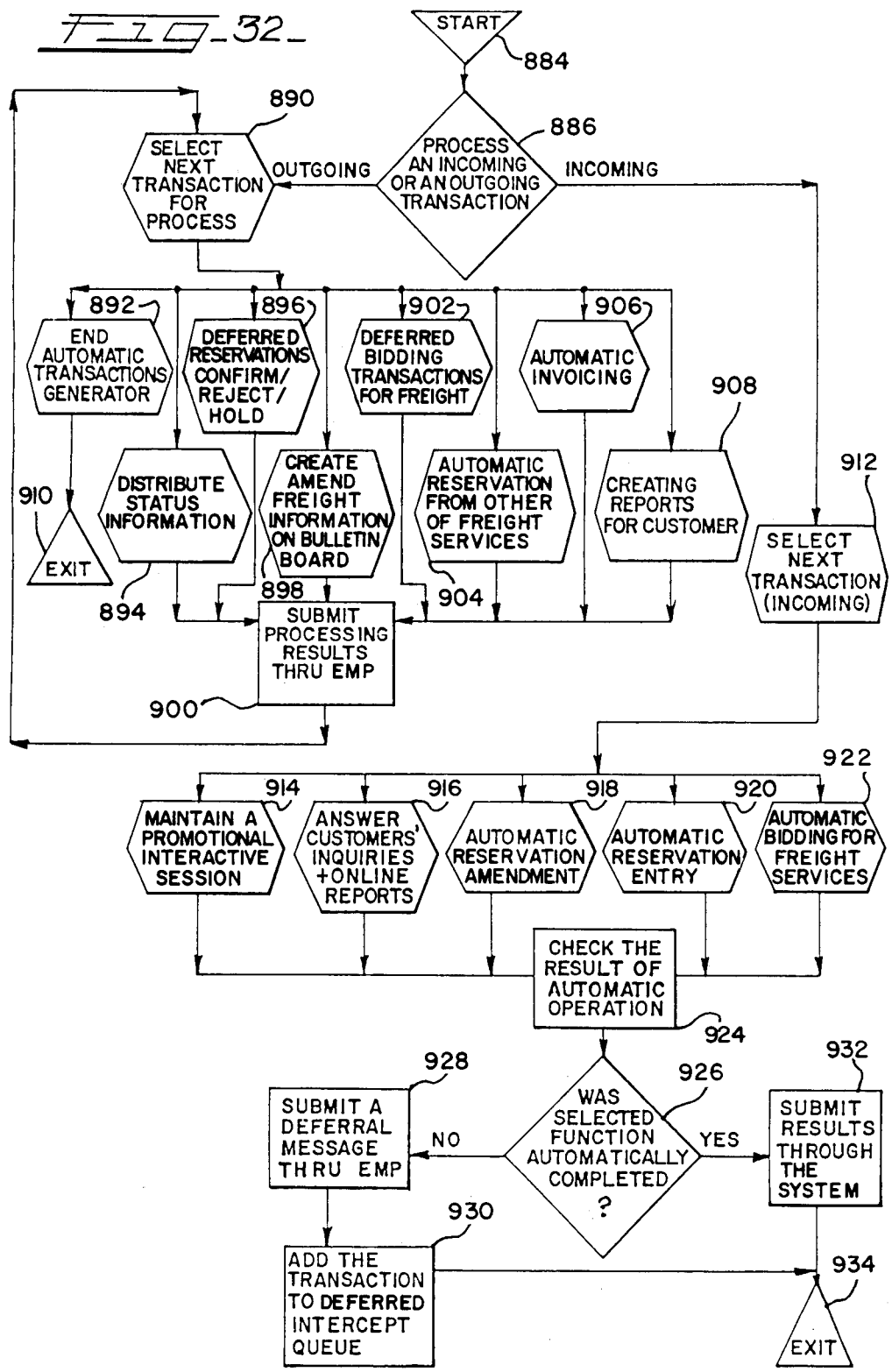
FIG. 32 is a flow diagram illustrating the processing methodology and structural flow for the freight carrier AUTOMATIC INFORMATION SERVICE function as shown in FIG. 31 for a specific embodiment of the interactive market management system according to the invention.

FIG. 32 is a flow diagram illustrating the processing methodology and structural flow for a specific embodiment of a freight carrier AUTOMATIC INFORMATION SERVICE function as shown in FIG. 31 at block 862. FIG. 32 is substantially similar to the AUTOMATIC INFORMATION SERVICES flow diagram illustrated in FIG. 21 and described previously herein, with the exception of functional blocks 894 and 898. Functional block 894 provides for distribution of status information, and functional block 898 provides for the creation and amendment of freight information on a bulletin board provided to users.

Figure 33:
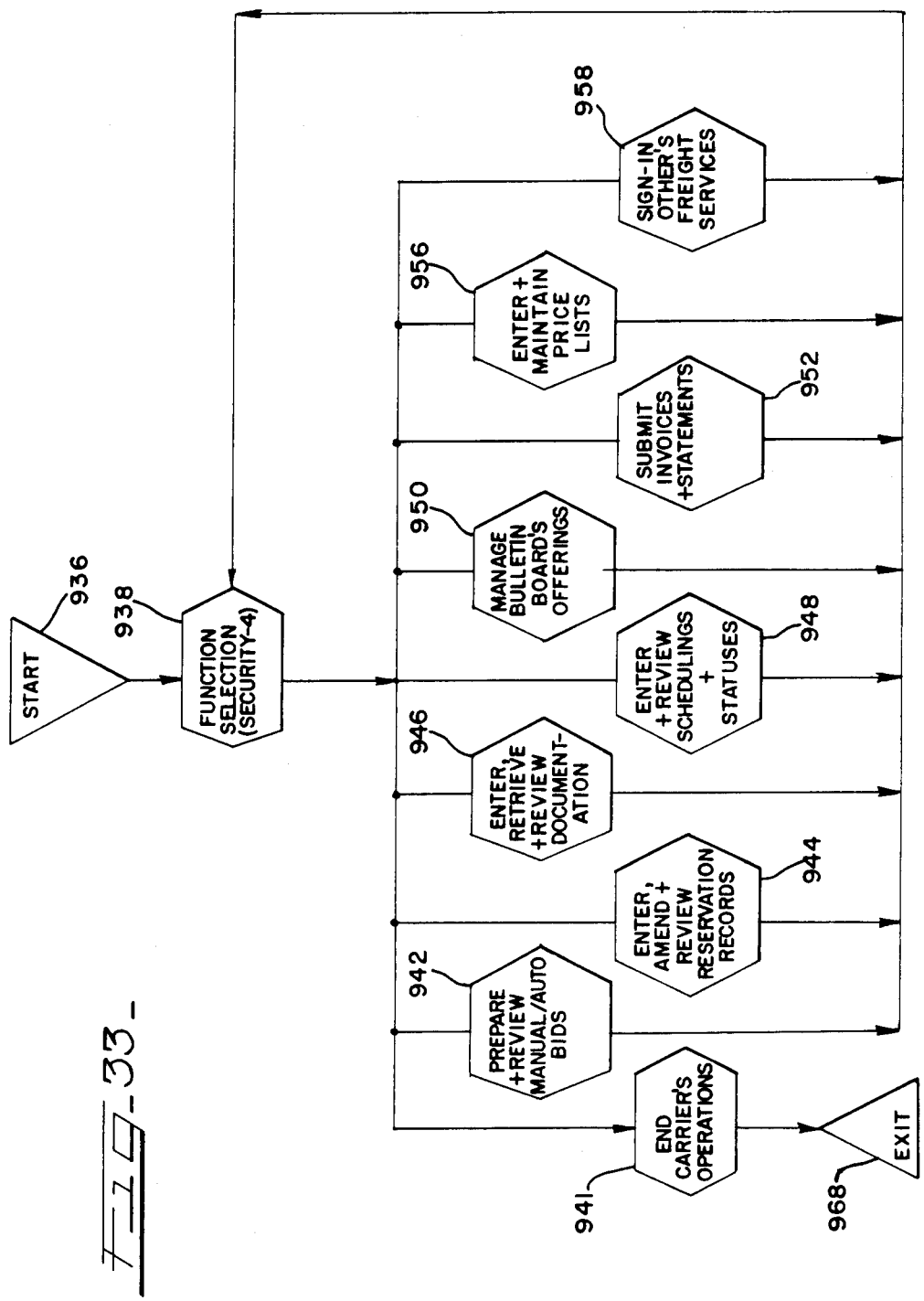
FIG. 33 is a flow diagram illustrating the processing methodology and structural flow for the FREIGHT CARRIER OPERATIONAL function as shown in FIG. 31 for a specific embodiment of the interactive market management system according to the invention.

FIG. 33 is a flow diagram illustrating the processing methodology and structural flow for a specific embodiment of a FREIGHT CARRIER OPERATIONAL functional as shown in FIG. 31 at block 874. The operational function is entered, as shown at 936, and the FUNCTION SELECTION and validation security Level-4 function is immediately initiated at functional block 938. Once the function selection and the security process is completed, a selected one of the operational functions from 941 to 958 is initiated, and upon completion, the processing flow returns to the function block 938 to permit selection of another desired function. The functional block 942 provides for the preparation and review of manually and automatically generated bids, and the functional block 944 provides for the entry, amendment and review of reservation records. The functional block 946 provides for entry, retrieval and review of documentation, and the functional block 948 provides for entry and review of scheduling and status information. The functional block 950 permits management of bulletin board offerings and, the functional block 952 illustrates the operation of submission of invoices and statements through the system 50. The functional block 956 provides for the entry and maintenance of price lists on the carrier's data base, while the functional block 958 illustrates the operation of sign-in of other freight services and use of all services offered by the other freight carriers. The user may, at the functional block 938, elect to end the FREIGHT CARRIER OPERATIONAL function by selecting the end carrier operation functional block 941, which results in termination and exit as illustrated at 960.

Figure 34:
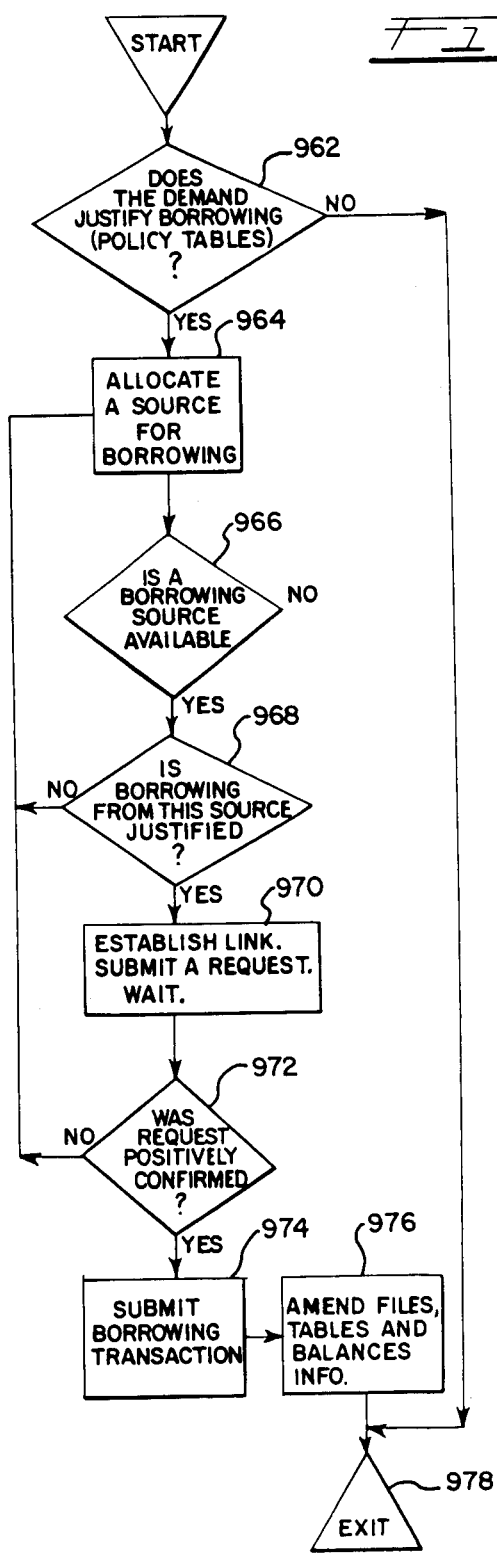
FIG. 34 is a flow diagram illustrating the processing methodology and structural flow for the BORROWING GOODS function as shown in FIG. 20 for a specific embodiment of the interactive market management system according to the invention.

FIG. 34 is a flow diagram which illustrates the processing methodology and structural flow for a specific embodiment of a distributor BORROWING GOODS function as shown in FIG. 20 at block 526. The BORROWING GOODS function is entered at the top of FIG. 34 and immediately leads to a logic operation 962 which interrogates stored policy tables to determine if the demand meets requirements for justifying borrowing of goods. If the result is negative, processing flow branches to block 978 terminating and exiting the BORROWING GOODS function as shown. If the result of the logical operation 962 is affirmative, a source is allocated for the borrowing, as shown at functional block 964, and processing flow proceeds to logical block 966 for determination of whether a borrowing source is available. If the result of logical operation 966 is negative, the processing flow branches to block 978 terminating and exiting the BORROWING GOODS function. If the result of the logical operation 966 is affirmative, another logical operation 968 is performed to determine if the borrowing from the available source is justified. If not, processing flow returns to block 964, as shown, and if the borrowing is justified a communications link is established and a borrowing request is made, as shown at functional block 970. After a wait period, a logical operation 972 is performed to establish confirmation of the request, and if the request was not confirmed, processing flow returns to functional block 964, as shown. If the request is confirmed, the borrowing transaction is submitted as shown at function block 974, and the files, table and balances for all involved parties are updated, as shown at functional block 976. Subsequently, the BORROWING GOODS function is terminated and exited, as shown at block 978.

A specific embodiment of the novel interactive market management system according to the invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A system for interactive online electronic communications and interactive on-line processing of business transactions between different types of independent users including at least a plurality of separate on-line sellers, and a plurality of buyers, wherein each user communicates with the system, the system comprising:
   access means for providing selective access by users to a data base and for permitting selection of users by at least one other user;
   processing means responsive to the access means for interactive on-line processing of a business transaction between one of the plurality of buyers and one of the plurality of online sellers wherein one party to the transaction is specifically selected by the other party via the access means.

2. The system of claim 1 wherein the seller is specifically selected by the buyer via the access means.

3. The system of claim 1 wherein the business transaction involves goods.

4. The system of claim 3 wherein the business transaction involves goods related services.

5. The system of claim 1 wherein the independent users further comprise at least one of a financial institution, and a freight service.

6. The system of claim 1 wherein the independent users further comprise financial institutions and freight service providers.

7. The system of claim 1 wherein the independent users further comprise at least one of agents, information services, commercial services and independent network systems.

8. The system of claim 7 wherein sellers include distributors, wholesalers, and suppliers, and wherein the users in addition to sellers, buyers, freight service providers, and financial service providers, comprise agents, information services, commercial services, and public data bases.

9. The system of claim 8 wherein the processing means further comprises means to permit distributors and agents to order shipments to be made directly from a supplier to a buyer.

10. The system of claim 1 wherein buyers communicate with the system from remote terminals adapted to access communication links, and the access means provides access to the buyers on remote terminals.

11. The system of claim 10 wherein the processing means comprises a central resident means for processing business transactions on behalf of users.

12. The system of claim 11 wherein the processing means further comprises means for processing some business transactions at the remote terminals.

13. The system of claim 10 wherein at least one remote terminal is an automated computer system.

14. The system of claim 10 further comprising means for access by users from remote terminals to public data bases and remote information services.

15. The system of claim 1 wherein the data base comprises a central resident data base for storage of at least seller information.

16. The system of claim 15 wherein the data base further comprises at least one remote data base.

17. The system of claim 1 wherein the processing means further comprises means for concurrent, interactive on-line processing of business transactions between more than two different types of users concurrently conducting an interactive business transaction session.

18. The system of claim 1 further comprising storage means responsive to the processing means for validation and storage of information generated during business transactions.

19. The system of claim 1 further comprising means responsive to the processing means for permitting freight service providers to auction freight services to users and for users to subscribe to and confirm the freight services on-line from remote terminals.

20. The system of claim 1 further comprising financial means responsive to the processing means for permitting users, including financial institutions, to provide financial services to users.

21. The system of claim 20 further comprising means responsive to the financial means for providing selective access to the data base by users providing financial services to permit updating of financial information utilized to evaluate the extension of financial services.

22. The system of claim 1 wherein users information is stored in the data base comprising at least some of seller catalog information, price lists, inventory information, accounting information, customer credit limits, contractual terms of delivery, shipment quantities, back orders, general agreements, special instructions, requests for quotations, routing and freight information, agency agreements, financial agreements, access authorization for individual users, agreements regarding payments, telecommunications network usage, market information, statistical information, econometric information, engineering data, bill of material information, seller history including cancelled orders, bids, shipments, payments, and other transactions processed by the system for the seller.

23. The system of claim 1 further comprising message means for providing message storage, routing, and delivery between system users.

24. The system of claim 1 further comprising validation means responsive to the access means for selectively limiting access to the system based upon at least one password.

25. The system of claim 24 wherein the validation means further comprises means for selectively limiting access to selected data bases, selected services, selected users, and selected business transactions, based upon multiple levels of validation.

26. The system of claim 1 further comprising means responsive to the processing means and data base to process, retrieve and update statistical information regarding transactions and user information.

27. The system of claim 1 wherein the access means further comprises interactive conversational means for providing direct communications between a plurality of users.

28. A system for interactive electronic communications and processing of business transactions between a plurality of different types of independent users including at least a plurality of sellers and a plurality of buyers, and at least one of a financial institution and a freight service provider, wherein each user communicates with the system, the system comprising:

a central resident data base for storage of user information;

access means for providing selective access to the resident data base user information by users from remote terminals on communication links and for providing for periodic exchange of information files between a user's remote terminal and the system;

validation means responsive to the access means for selectively limiting access to the system based upon at least one password;

processing means responsive to the access means and the validation means for on-line interactive processing of business transactions between a user and a plurality of other users during an interactive business transaction session comprising a plurality of different types of business transactions from a remote terminal; and, means responsive to the processing means for providing access to the data base by sellers from a remote terminal during an interactive business transaction session with a buyer.

29. The system of claim 28 further comprising means responsive to the processing means for freight service providers to auction freight services to users on remote terminals and for users to subscribe to and confirm the freight services on-line from remote terminals.

30. The system of claim 29 further comprising at least one remote data base.

31. The system of claim 30 further comprising storage means responsive to the processing means for validation and storage of information generated during business transaction sessions, and financial transaction means responsive to the processing means for permitting users, including financial institutions, to provide financial services to users.

32. The system of claim 31 further comprising means responsive to the financial transaction means for providing selective access to the data base and to the storage means by users providing financial services to update financial information utilized to evaluate the extension of financial services.

33. The system of claim 32 wherein the seller information stored in the data bases comprises at least some of seller catalog information, price lists, inventory information, accounting information, customer credit limits, contractual terms of delivery, shipment, quantities, back orders, general agreements and special instructions, requests for quotations, routing information to agents, financial agreements, access authorization for individual users, agreements regarding payments, and seller history including cancelled orders, bids, shipments, payments, and other transactions processed by the system for the seller.

34. The system of claim 31 further comprising means for access to the data bases by users from remote terminals to permit updating and retrieval of seller information including inventory information, orders, quotations, and transactions.

35. The system of claim 31 further comprising message means for providing message storage, routing and delivery between system users 36. The system of claim 31 wherein at least one remote terminal is an automated computer system.

37. The system of claim 31 wherein the transaction means processes buyer business transactions including at least one of requesting and receiving price quotations, mortgaging inventory, placing and amending orders, making direct shipment instructions, receiving invoices and statements, product catalog screening, electronic shopping, making payments and accessing user information.

38. The system of claim 31 wherein the validation means further comprises means for selectively limiting access to selected data bases, selected services, selected users, selected business transactions, and selected system functions based upon multiple levels of validation.

39. The system of claim 31 further comprising means for access by users from remote terminals to public data bases and remote information services.

40. The system of claim 31 wherein sellers includes distributors, wholesalers, and suppliers, and wherein the users in addition to sellers, buyers, freight service providers, and financial service providers, comprise agents, information services, commercial services, and public data bases.

41. The system of claim 40 when the processing means further comprises means to permit distributors and agents from remote terminals to order shipments to be made directly from a supplier to a buyer.

42. The system of claim 31 further comprising means responsive to the processing means and data bases to process, retrieve and update statistical information regarding transactions and user information.

43. The system of claim 31 wherein the access means further comprises interactive conversational means for providing direct communications between the remote terminals of a plurality of users

* * * * *

UNITED STATES PATENT AND TRADEMARK OFFICE
CERTIFICATE OF CORRECTION

PATENT NO. : 4,799,156
DATED : January 17, 1989
INVENTOR(S) : Eyal Shavit, et al.

It is certified that error appears in the above-identified patent and that said Letters Patent is hereby corrected as shown below:

Column 3, lines 10-11, "SIGNING and" should be --SIGN-IN--.

Column 3, line 36, "INFORMATIONAL SERVICE" should be --INFORMATION SERVICE--.

Column 5, line 25, "b e" should be --be--.

Column 5, line 51, "74a-8i" should be --74a-i--.

Column 6, line 49, "online" should be --on-line--.

Column 7, line 55, "and" should be --an--.

Column 9, line 37, "online" should be --on-line--.

Column 10, line 10, "provide" should be --provider--.

Column 10, line 13, "manu" should be --menu--.

Column 10, line 49, "in" should be --is--.

Column 11, line 51, "etc.)." should be --etc.--.

Column 12, line 49, "elect enter" should be --elect to enter--.

Column 12, line 68, "need" should be --meet--.

UNITED STATES PATENT AND TRADEMARK OFFICE
CERTIFICATE OF CORRECTION

PATENT NO. : 4,799,156

DATED : January 17, 1989

INVENTOR(S) : Eyal Shavit, et al.

It is certified that error appears in the above-identified patent and that said Letters Patent is hereby corrected as shown below:

Column 13, lines 12-15, "distributor's catalogue, the system can suggest Based upon complementary relationships listed in the complementary items." should be --Based upon complementary relationships listed in the distributors' catalogue, the system can suggest complementary items.--.

Column 13, line 45, "an" should be --can--.

Column 14, line 4, "preferances" should be --preferences--.

Column 14, line 55, "allow" should be --allows--.

Column 14, line 67, "allo" should be --allow--.

Column 15, line 31, "outsides" should be --outside--.

Column 15, line 57, "keys partial" should be --keys, partial--.

Column 17, line 44, "time" should be --item--.

Column 17, line 37, "cost" should be --costs--.

Column 18, line 55, "distributes" should be --distribute--.

Column 18, line 56, "addresses" should be --addressees--

UNITED STATES PATENT AND TRADEMARK OFFICE
CERTIFICATE OF CORRECTION

PATENT NO. : 4,799,156

DATED : January 17, 1989

INVENTOR(S) : Eyal Shavit, et al.

It is certified that error appears in the above-identified patent and that said Letters Patent is hereby corrected as shown below:

Column 19, lines 38-39, "of LOG-IN" should be --of a LOG-IN--.

Column 19, line 40, "in" should be --is--.

Column 20, line 24, "195" should be --196--.

Column 20, line 34, "item" should be -- items --.

Column 22, line 12, "base immediately" should be --base is immediately--.

Column 22, line 43, "s" should be --as--.

Column 23, line 14, "Mail" should be --MAIL--.

Column 23, line 15, "level 2" should be --level-2--.

Column 23, lines 36-37, "transactions" should be --transaction--.

Column 23, line 48, "274" should be -- 264 --.

Column 23, line 51, "an" should be --can--.

Column 24, line 4, "Process" should be --process-.

Column 24, line 21, "282" should be --292--.

UNITED STATES PATENT AND TRADEMARK OFFICE
CERTIFICATE OF CORRECTION

PATENT NO. : 4,799,156

DATED : January 17, 1989

INVENTOR(S) : Eyal Shavit, et al.

It is certified that error appears in the above-identified patent and that said Letters Patent is hereby corrected as shown below:

Column 24, line 29, "INFORMATIONAL" should be --INFORMATION--.

Column 24, line 43, "logon" should be --log-on--.

Column 24, line 55, "a account" should be --an account--.

Column 24, line 66, "function" should be --functions--.

Column 25, line 17, "function" should be --functions--.

Column 26, line 20, "order" should be --orders--.

Column 26, line 31 "backorder" should be --back-orders--.

Column 26, line 33, "distributors'data" should be --distributor's data--.

Column 26, line 61, "logica" should be --logical--.

Column 28, line 45, "loads" should be --loans--.

Column 29, line 34, "a" should be --as--.

Column 30, line 10, "80" should be --480--.

Column 32, line 17, "482" should be --582--.

UNITED STATES PATENT AND TRADEMARK OFFICE
CERTIFICATE OF CORRECTION

PATENT NO. : 4,799,156

DATED : January 17, 1989

INVENTOR(S) : Eyal Shavit, et al.

It is certified that error appears in the above-identified patent and that said Letters Patent is hereby corrected as shown below:

Column 34, line 28, "describe" should be --described--.

Column 34, line 28, "of" should be --to--.

Column 36, line 4, "herein after" should be --hereinafter--.

Column 36, line 25, "functional" should be --function--.

Column 36, line 32, "function" should be --functional--.

Column 36, line 59, "logic" should be --logical--.

Column 36, line 60, "interragates" should be --integrates--.

Column 37, line 34, "online" should be --on-line--.

Column 37, line 46, "online" should be --on-line--.

Column 40, line 24, "users" should be --users.--.

Column 40, line 61, "users" should be --users.--.

Signed and Sealed this

Nineteenth Day of December, 1989

*Attest:*

JEFFREY M. SAMUELS

*Attesting Officer*     *Acting Commissioner of Patents and Trademarks*